(12) United States Patent
Nakata et al.

(10) Patent No.: US 10,058,075 B2
(45) Date of Patent: Aug. 28, 2018

(54) CONNECTOR FOR ANIMAL

(71) Applicant: EARTH PET CO., LTD., Tokyo (JP)

(72) Inventors: Tsuyoshi Nakata, Osaka (JP); Seiji Nonoguchi, Tokyo (JP)

(73) Assignee: EARTH PET CO., LTD., Tokyo (JP)

( * ) Notice: Subject to any disclaimer, the term of this patent is extended or adjusted under 35 U.S.C. 154(b) by 65 days.

(21) Appl. No.: 14/909,873

(22) PCT Filed: Jun. 3, 2014

(86) PCT No.: PCT/JP2014/002960
§ 371 (c)(1),
(2) Date: Feb. 3, 2016

(87) PCT Pub. No.: WO2015/019528
PCT Pub. Date: Feb. 12, 2015

(65) Prior Publication Data
US 2016/0165850 A1 Jun. 16, 2016

(30) Foreign Application Priority Data

Aug. 9, 2013 (JP) ................................. 2013-167143

(51) Int. Cl.
*F16B 45/04* (2006.01)
*A01K 27/00* (2006.01)
(52) U.S. Cl.
CPC ............ *A01K 27/005* (2013.01); *F16B 45/04* (2013.01)
(58) Field of Classification Search
CPC ....... F16B 45/04; A01K 27/005; A45C 13/30; A45C 13/1076; A45C 13/1084; Y10T 24/45403; Y10T 24/4534

(Continued)

(56) References Cited

U.S. PATENT DOCUMENTS 6,363,589 B1    4/2002  Calloway et al.
7,526,843 B2 *  5/2009  Lin ........................ F16B 45/04
                                                    24/600.2

(Continued)

FOREIGN PATENT DOCUMENTS

CN      101400921      9/2010
CN      201577400      9/2010

(Continued)

OTHER PUBLICATIONS

Office Action issued in China Counterpart Patent Appl. No. 201480044715.5, dated May 31, 2017.

(Continued)

*Primary Examiner* — Jack W Lavinder
(74) *Attorney, Agent, or Firm* — Greenblum & Bernstein, P.L.C.

(57) ABSTRACT

A connector for an animal has a stopper mechanism for enabling or disabling a slide bar to be pushed back. The connector for an animal includes a hook member; a stem portion extending from an end of the hook member in a first direction; a slide bar for being reciprocated in the first direction to open or close the hook member; a lock member for being installed around the stem portion to rotate therearound with the first direction as a rotation axis; and an operating member for being connected to the slide bar so as to protrude in a second direction perpendicular to the first direction, the lock member including a cylindrical member with a cylindrical space formed therein for housing the stem portion rotatably and projection extending from a part of the hook member side end of the cylindrical member toward the hook member by a predetermined length.

8 Claims, 39 Drawing Sheets

(58) Field of Classification Search
USPC .............. 24/374–375, 582.1, 582.11, 265 H
See application file for complete search history.

(56) References Cited

U.S. PATENT DOCUMENTS

| | | | | |
|---|---|---|---|---|
| 8,365,365 | B2 * | 2/2013 | Schlipper | ................ F16B 45/04 24/265 H |
| 2010/0031897 | A1 | 2/2010 | Moeller | |
| 2012/0311830 | A1 | 12/2012 | Schlipper | |
| 2015/0226254 | A1 | 8/2015 | Nonoguchi et al. | |

FOREIGN PATENT DOCUMENTS

| | | |
|---|---|---|
| CN | 202269269 | 6/2012 |
| CN | 202451582 | 9/2012 |
| EP | 2550861 | 1/2013 |
| JP | 2003-219750 | 8/2003 |
| JP | 2010-81902 A | 4/2010 |
| JP | 2011-223933 A | 11/2011 |
| JP | 2011-229459 A | 11/2011 |
| TW | 200612820 | 5/2006 |
| WO | 2009/037793 | 3/2009 |
| WO | WO2011/135739 A1 | 11/2011 |

OTHER PUBLICATIONS

International Search Report in PCT/JP2014/002960, dated Aug. 26, 2014.
Office Action issued in Taiwan Counterpart Patent Appl. No. 103120825, dated Dec. 20, 2017.

* cited by examiner (a)
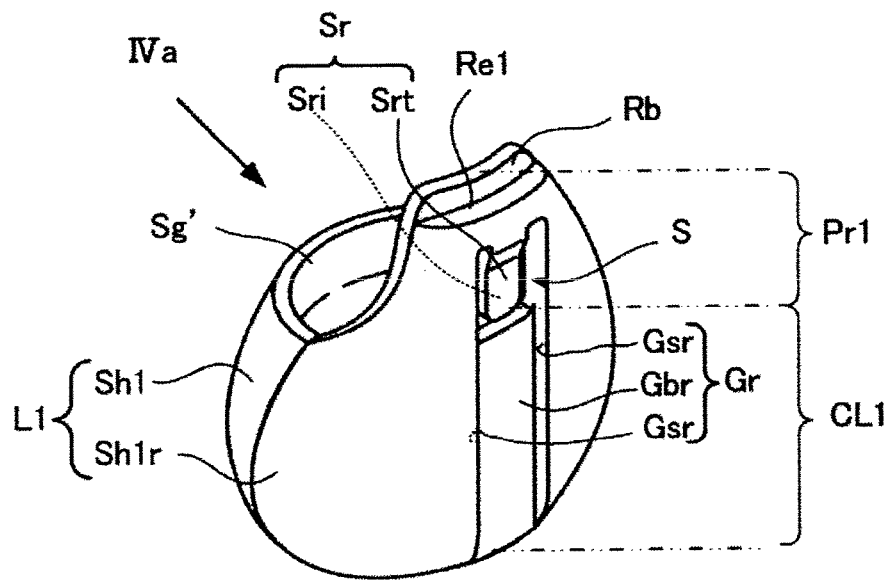
(b)
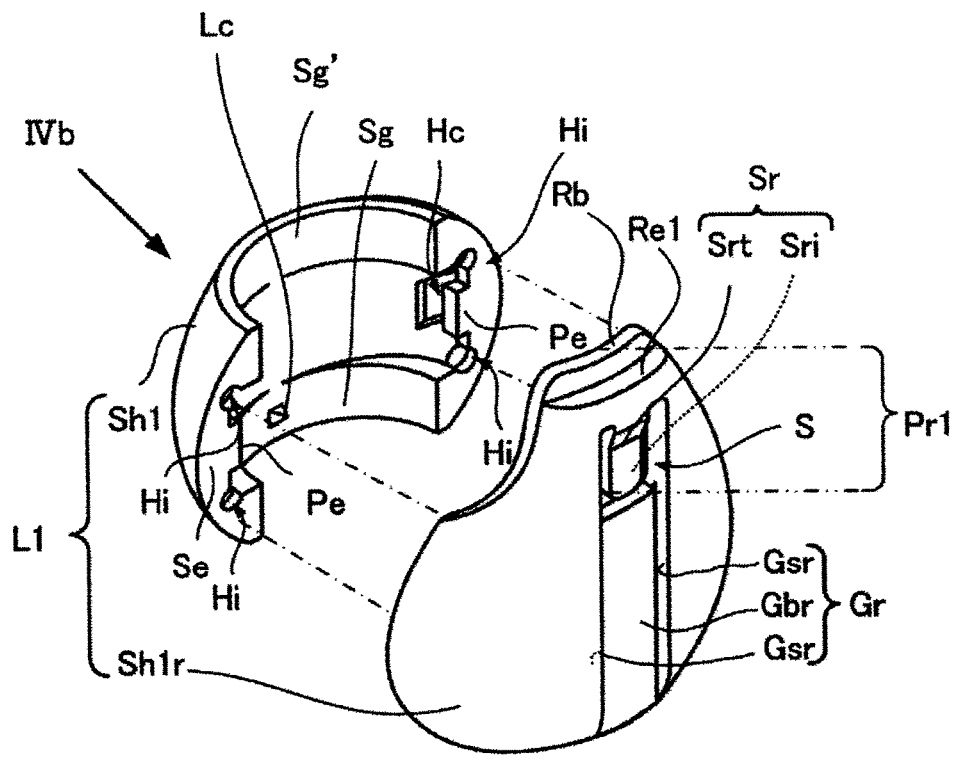
FIG. 3

(a)
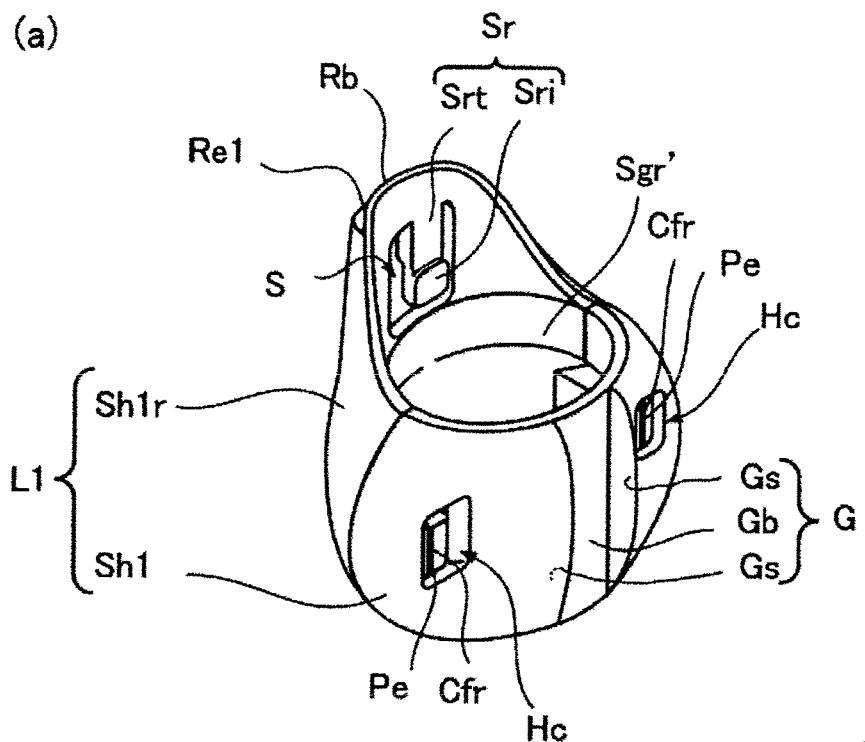
FIG. 4
(b)
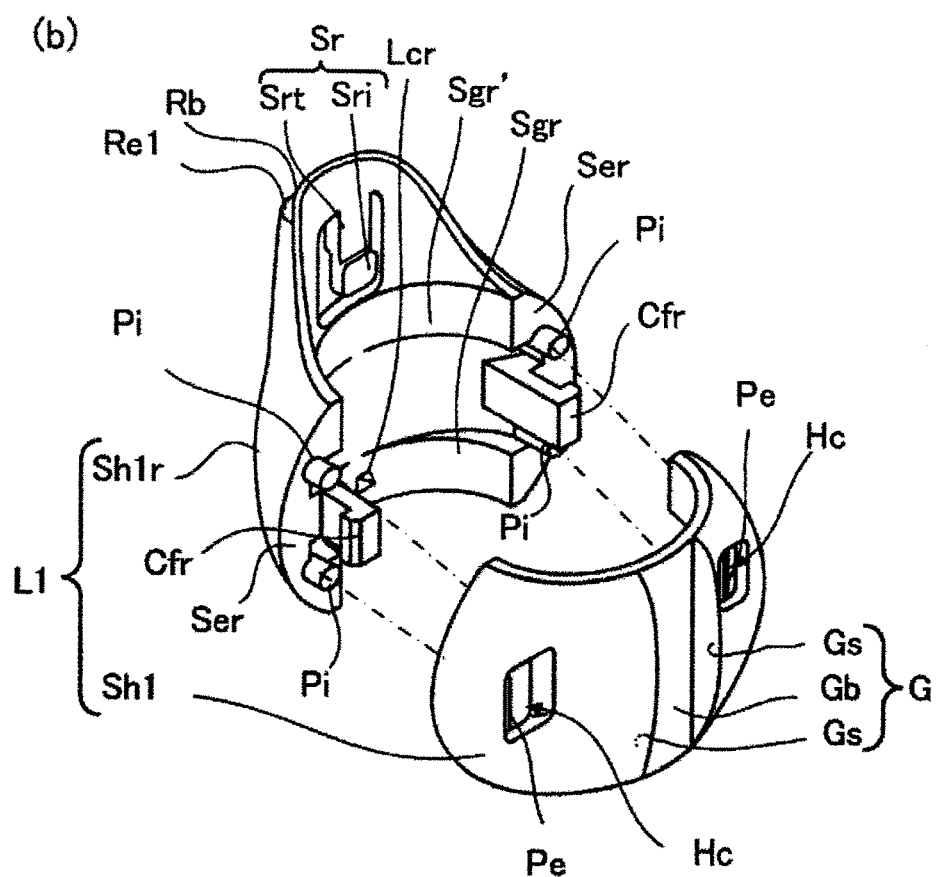

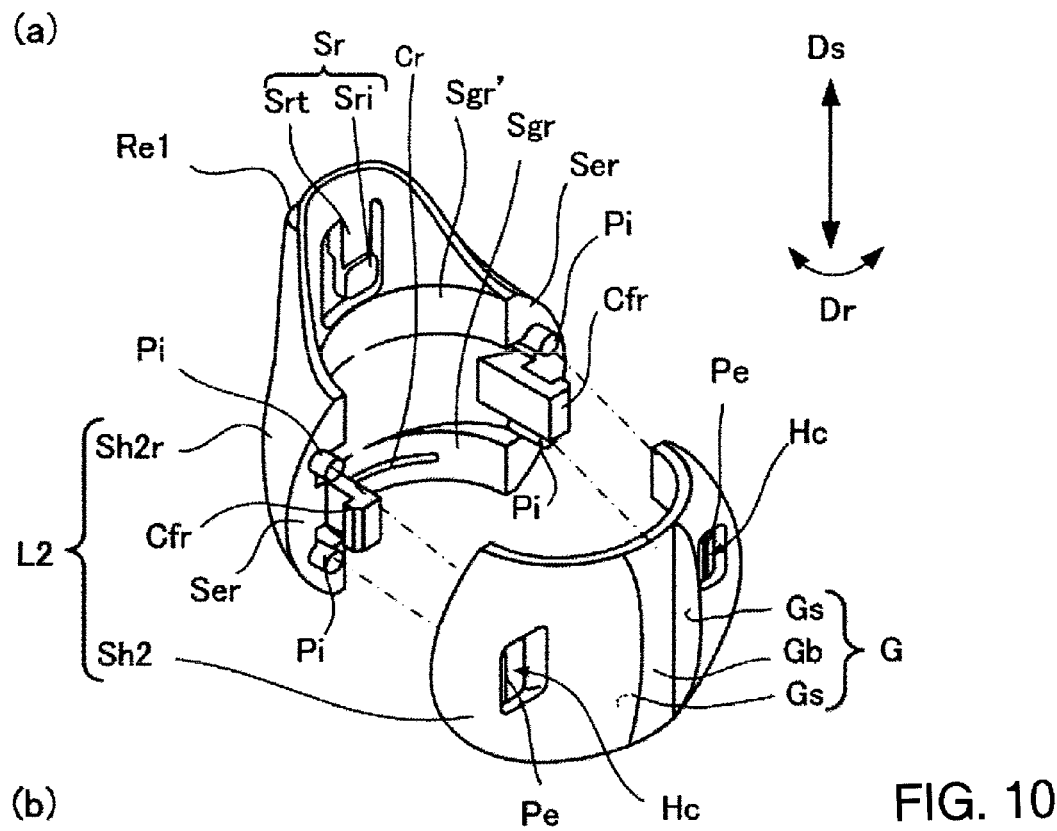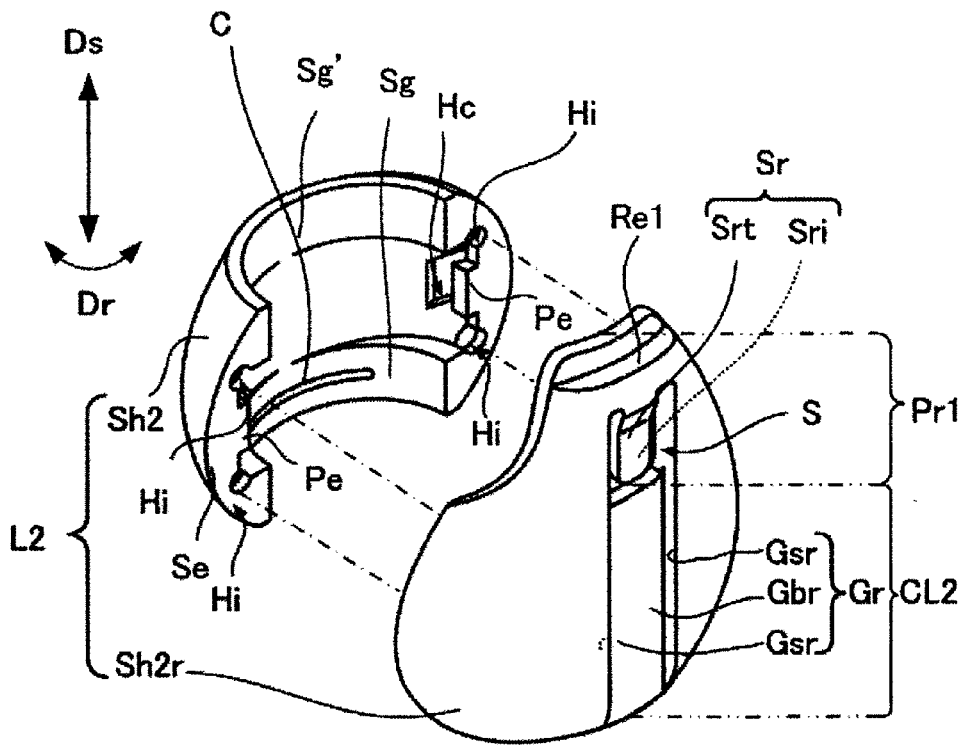
FIG. 10

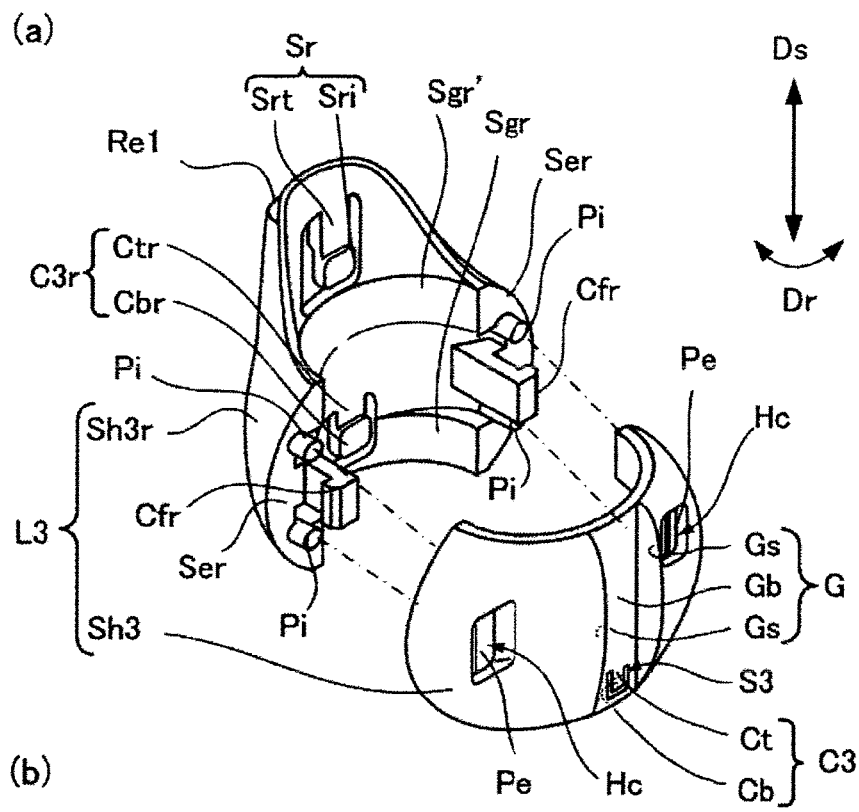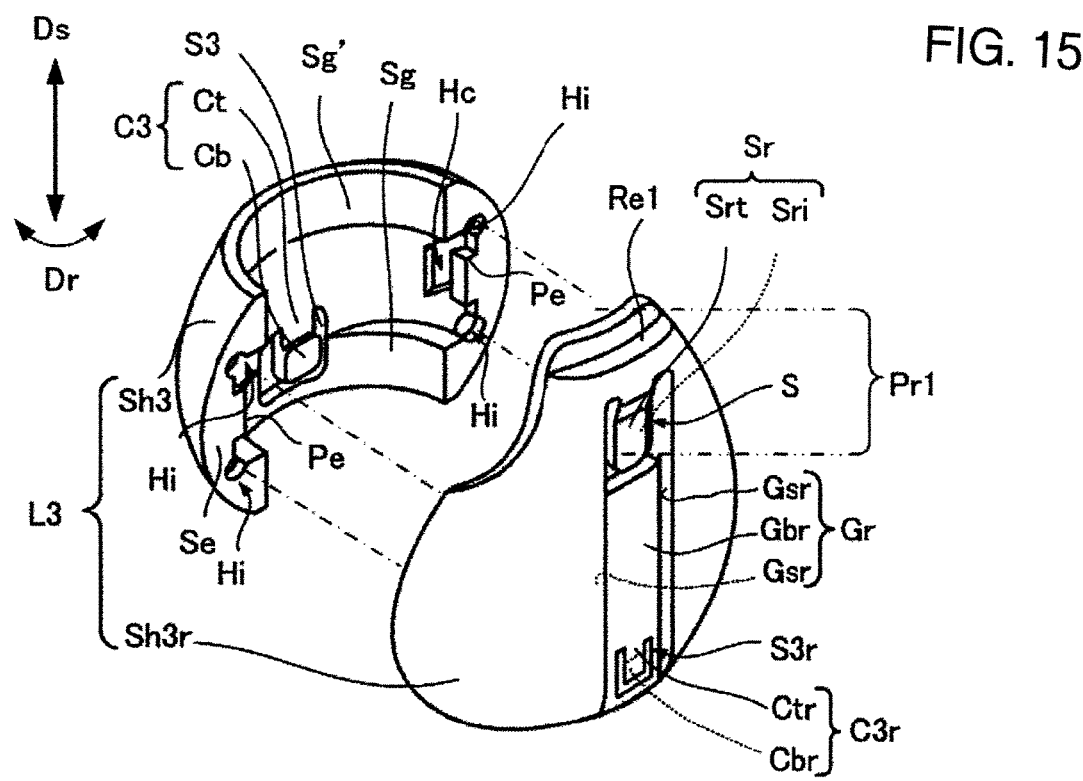
FIG. 15

(a)
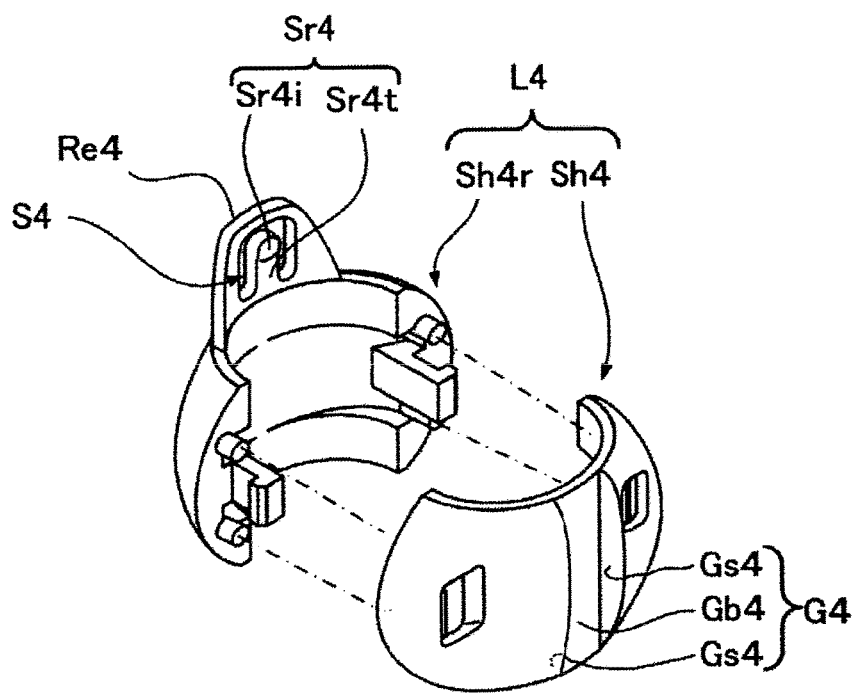
(b)
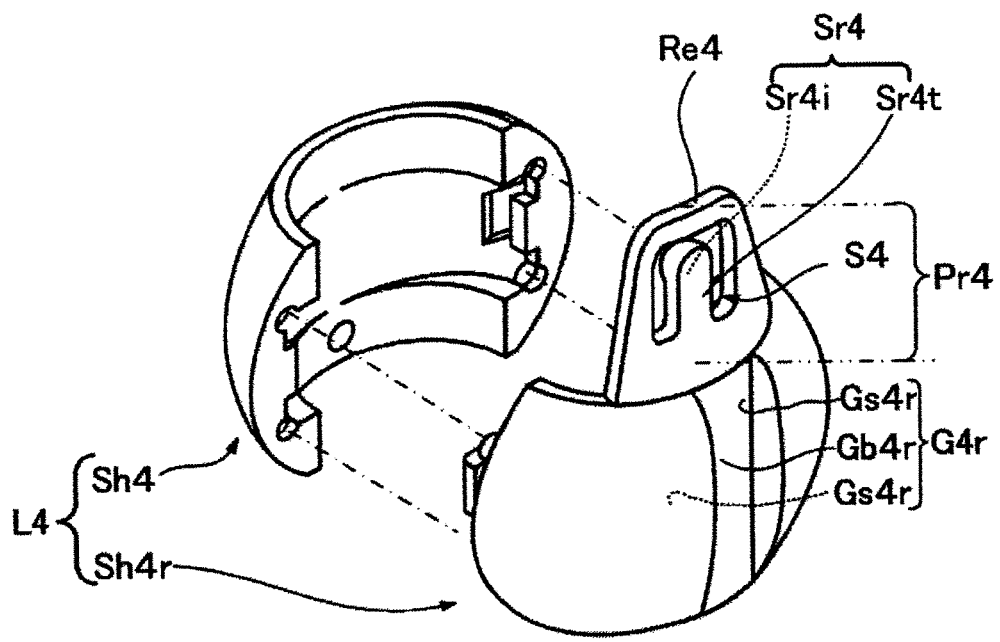
FIG. 21

(a)
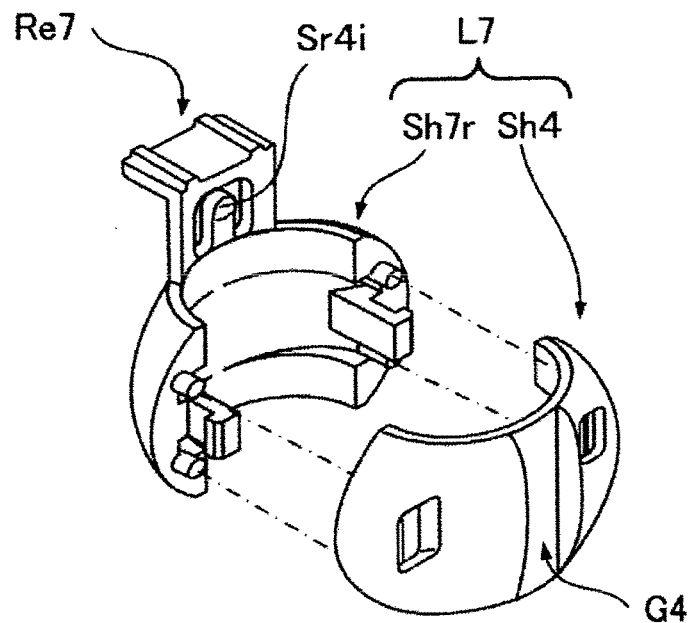
FIG. 34
(b)
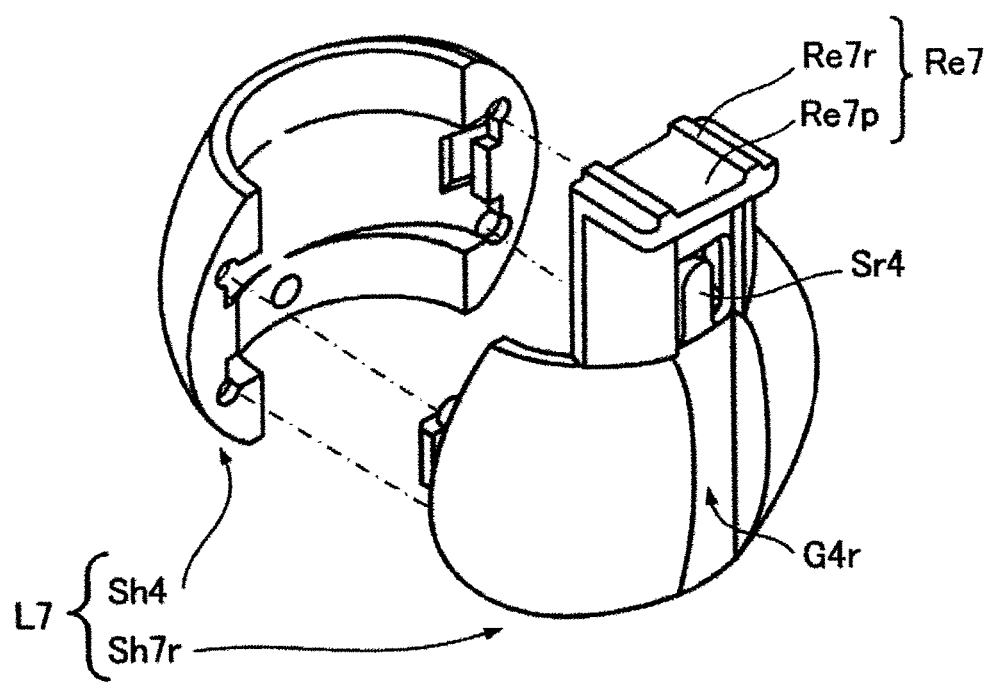

204

US 10,058,075 B2

CONNECTOR FOR ANIMAL

FIELD

The present invention relates to a connector for animal such as dog or cat, and more particularly relates to a connector for joining an animal leash to a connection ring provided on a collar or a cloth which an animal wears for controlling or mooring the animal.

BACKGROUND

With reference to FIG. 35, FIG. 36, FIG. 37, FIG. 38, and FIG. 39, a conventional connector for animal will be described below. In FIG. 35, shown is a state in which a leash 190 is joined to a collar 110 via a conventional connector 100. As shown in FIG. 36, the connector 100 includes a snap hook portion 104 constructed to be detachably connectable to a ring 108 fixed at the collar 110 (FIG. 35), and a connection ring 103 formed in a D character like shape to be engaged with the leash 190. The snap hook portion 104 is integrally formed with a hook portion 111 formed in a C character like shape and a stem portion 112. In the stem portion 112, a major diameter portion 116, a minor diameter portion 117, and a major diameter portion 115 are successively formed in an order from one end of the stem opposed to the hook portion 111 toward the hook portion 111. The connection ring 103 is provided with a through hole 114a formed in one line (straight portion) of D character shape. The connection ring 103 is rotatably engaged to the stem portion 112 (hook portion 111) in a manner such that the major diameter portion 116 and the major diameter portion 115 pinch one line (straight portion) of the connection ring 103.

Along a stem direction Ds, formed in the stem portion 112 is a bottomed hole 122 having an opening 121 disposed in an end face 112a near the hook portion 111. In the stem portion 112, along the stem direction Ds, formed is a guide groove 123. A coil spring 124 and a slide bar 125 slidable along the stem direction Ds are inserted in order in the hole 122 such that the coil spring 124 is compressed by the slide bar 125. The expansion force of the compressed coil spring 124 biases the slide bar 125 so that an apical surface of the slide bar 125 abuts on an apical surface 111a of the hook portion 111. The slide bar 125 is provided with a convexly shaped grip portion 126 integrally formed therewith, and is installed such that the grip portion 126 juts out from the hole 122 through the guide groove 123.

In the connector 100, the apical surface of the slide bar 125 is separated from the apical surface 111a of the hook portion 111 by sliding the grip portion 126 temporarily toward the connection ring 103, causing a gap therebetween. The grip portion 126 is an operation member used for making the slide bar 125 slide. In this sense, the grip portion 126 is referred to as an "operation member 126".

In a state in which the gap is formed, the ring 108 and the hook portion 111 (the snap hook portion 104) can be joined by catching the hook portion 111 on the ring 108 of the collar 110 (FIG. 35). Thereafter, the apical surface of the slide bar 125 is allowed to abut on the apical surface 111a of the hook portion 111 again to close the hook portion 111 by the slide bar 125.

The conventional connector 100, as mentioned in the above, is constructed so that the slide bar 125 works to close the hook portion 111 (snap hook) when joined to the other object. As long as the slide bar works normally, the joining condition is kept safety. However, the joining may be lost accidentally depending on the usage condition.

For example, the snap hook portion 104 may be accidentally detached from the ring 108 when an animal (dog a) is frightened or attracted by something while the animal is being led or held. Such an unexpected detachment results from abnormal actions of the animal. Specifically, the abnormal actions of the animal may induce a state in which the ring 108 of the collar 110 will press and move the operation member 126 of the hook portion 111. When the animal moves irregularly, the slide bar 125 (the operation member 126) may be moved back from the close position to the open position. Then, an opening portion of the snap hook portion 104 will be opened against a user's intention, releasing the ring 108 therefrom.

In FIG. 37, shown is one example of the connectors for animal which aim to prevent the slide bar from moving back against the user's intention, proposed by Patent Literature 1. A connector 200 has a construction basically similar to that of the connector 100 shown in FIG. 36, except that a stopper mechanism is added for preventing the slide bar 125 from moving back. Hereinafter, mainly described is the stopper mechanism particular to the connector 200. The same reference symbols are assigned to the parts having basically the same functions as those of parts of the connector 100 and the descriptions of those are omitted.

The stopper mechanism is composed of a stopper 6 and a wire rope 23. The wire rope 23 is attached to the stopper 6. The wire rope 23 is passed through the hook portion 111 of the connector 200, causing that the stopper 6 and the snap hook portion 104 are connected. The stopper 6 is made of an elastic material so as to be detachable/attachable opening 6a formed in a major arc cross section segment and to be attachable to and detachable from the stem portion 112 through the side thereof. The stopper 6 accepts the stem portion 112 through the opening 6a by being elastically widened and then is attached to the stem portion 112. In this attached state, the stopper 6 extends between the operation member 126 and a catch portion 3a of the connection ring 103 and prevents the slide bar 125 from moving back via the operation member 126. Thus, the opening portion of the snap hook portion 104 is prevented from being open against the user's intention, and then ring 108 (FIG. 35) is also prevented from removing therethrough.

Removal of the ring 108 from the connector 200 (snap hook portion 104) following the user's intention is achieved by detaching the stopper 6 from the stem portion 112 while being elastically opened again. The connection of the removed stopper 6 to the connector 200 (hook portion 111) is kept by the wire rope 23, and is prevented from being lost. In this state, the user can move the operation member 126 (slide bar 125) backward to open the snap hook portion 104.

Shown in FIGS. 38 and 39, other examples of the connectors for animal which aim to prevent the slide bar from moving back against the user's intention, proposed by Patent Literature 2. A connector 202 shown in FIG. 38 has a construction similar to that of the connector 200 (FIG. 37), except that the stopper 6 is replaced with a lock member 12 and a connection band 21 is added. The lock member has a construction basically similar to that of the stopper 6, except that no construction for attaching the wire rope 23 thereto is provided.

The lock member 12 has the connection band 21 extending from one side of a separation portion 11 so as to overlap the outer surface of the lock member 12 by being wound around the stem portion 112 over another side 11b of the separation portion 11a, and is provided with an engaging/ disengaging member which fix the connection band 21 and the lock member 12 overlapped each other. Thus, widening of the separation portion 11 is prevented even if a detaching force is applied to the lock member 12 which is locked, and removal of the lock member 12 as well as unlocking of the operation member 7 against the user's intention is prevented.

In a connector 204 shown in FIG. 39, the lock member 12 is constructed with a body 26 and an opening/closing member 24. The opening/closing member 24 has a separation portion for releasing 25 provided in a portion in a circumferential direction. The separation portion for releasing 25 is separated to right and left so as to open in the same circumferential position with the separation portion 11 of the body 26. The separation portion for releasing 25 is fitted in the body 26 and is moved in the circumferential direction from the separation portion 11 of the body 26, closing the separation portion 11 of the body 26. Thus, widening of the separation portion 11 is prevented even if a detaching force is applied to the lock member 12 which is locked, and removal of the lock member 12 as well as unlocking of the operation member 7 against the user's intention is prevented.

CITATION LIST

Patent Literature

Patent Literature 1: Japanese Patent Application Laid-Open No. 2010-81902
Patent Literature 2: Japanese Patent Application Laid-Open No. 2011-229459

SUMMARY

Technical Problem

In the stopper mechanism of the connector 200 proposed by Patent Literature 1, the separation portion of the stopper 6 shall be widen in the circumferential direction to attach to or detach from the stem portion 112 of the connector 200 for locking or unlocking of the operation member 126. That is, the user is required to greatly deform the stopper 6 in the circumferential direction every time to lock or unlock the operation member 126. The elastic deformation of the stopper 6 in the circumferential direction greater than the outer diameter of the stem portion 112 leads to degradation of material causing strength degradation, malfunction, and shorter service life.

The wire rope 23 connecting the stopper 6 to the hook portion 111 easily detaches from the hook portion 111 when the snap hook portion 104 opens, resulting in disconnection of the stopper 6 and the connector 200. In this case, loss prevention of the stopper 6 by the wire rope 23 becomes disabled. The stopper attached to the stem portion 112 for locking the operation member 126 easily separates from the stem portion 112 by external forces against the user's intention. The wire rope 23 does not prevent this separation of the stopper 6.

In the connector 202 proposed by Patent Literature 2, engagement of the connection band 21 with the engaging/disengaging member 22 inhibits the widening of separation portion 11, preventing the lock member 12 from being detached against the user's intention as well as the operation member 7 from being unlocked. However, every time the operation member 7 is locked or unlocked, the lock member 12 shall be attached to or detached from the stem portion 112 after detaching the connection band 21 from the engaging/disengaging member 22, and widening the lock member 12 much in the circumferential direction. The degradation of material causes strength degradation, malfunction, and shorter service life. No effort is made for loss prevention of the lock member 12 detached from the stem portion 112.

In the connector 204, in the state in which the separation portion 11 of the body 26 is closed by the opening/closing member 24, the lock member 12 is prevented from being detached against the user's intention as well as the operation member 7 is prevented from being unlocked. However, every time the operation member 7 is locked or unlocked, the body 26 and the opening/closing member 24 fitted with each other shall be simultaneously widened much in the circumferential direction, causing a load on the user larger that caused when only the body 26 is widened. The degradation of material of the lock member 12 (the body 26 and the opening/closing member 24) causes strength degradation, malfunction, and shorter service life. No effort is made for loss prevention of the lock member 12 detached from the stem portion 112.

In light of the above mentioned problems, it is an object of the present invention to provide a connector for animal having a stopper mechanism which prevents or allows a pushing back of a slide bar when is installed on a body.

Solution to Problem

In order to achieve the above object, a connector for animal according to the present invention comprises:
a hook member connectable to an object to be connected;
a stem portion extending from an end portion of the hook member in a first direction;
a slide bar closing and opening the hook member by reciprocating in the first direction;
a lock member rotatably installed around the stem portion with respect to the first direction as a rotation axis; and
an operating member joined to the slide bar and protruding in a second direction perpendicular to the first direction,
the lock member including
a cylindrical member with a cylindrical shaped space formed therein for accommodating the stem portion in a rotatable manner, and
a projection extending toward the hook member by a predetermined length from a part of end portion on the side of the hook member of the cylindrical member,
wherein the projection becomes opposite to at least a part of the operating member or not by rotating the lock member.

Advantageous Effects of Invention

A connector for animal according to the present invention can prevent a movement of object to be connected from transmitting to a slide bar as a push-back force.

BRIEF DESCRIPTION OF DRAWINGS

FIG. 3 is a perspective view showing a construction of a lock member shown in FIG. 1, wherein (a) shows a lock member taken out from the connector in a state of FIG. 1, and (b) shows the lock member in an exploded state.

FIG. 4 is a perspective view showing a construction of the lock member shown in FIG. 3, wherein (a) shows the lock member looked in an arrow direction IVa in FIGS. 3(a), and (b) shows the lock member looked in an arrow direction IVb in FIG. 3(b).

FIG. 10 is an exploded perspective view showing a construction of a lock member of a connector for animal according to a second embodiment of the present invention.

FIG. 15 is an exploded perspective view showing a construction of a lock member of a connector for animal according to a third embodiment of the present invention.

FIG. 21 is an exploded perspective view showing a construction of the lock member shown in FIG. 20.

FIG. 34 is an exploded perspective view showing a construction of a lock member shown in FIG. 33.

DESCRIPTION OF EMBODIMENTS

First Embodiment

With reference to FIG. 1, FIG. 2, FIG. 3, FIG. 4, FIG. 5, FIG. 6, FIG. 7, FIG. 8, and FIG. 9, described below is a connector for animal according to a first embodiment of the present invention.

Figure 1:
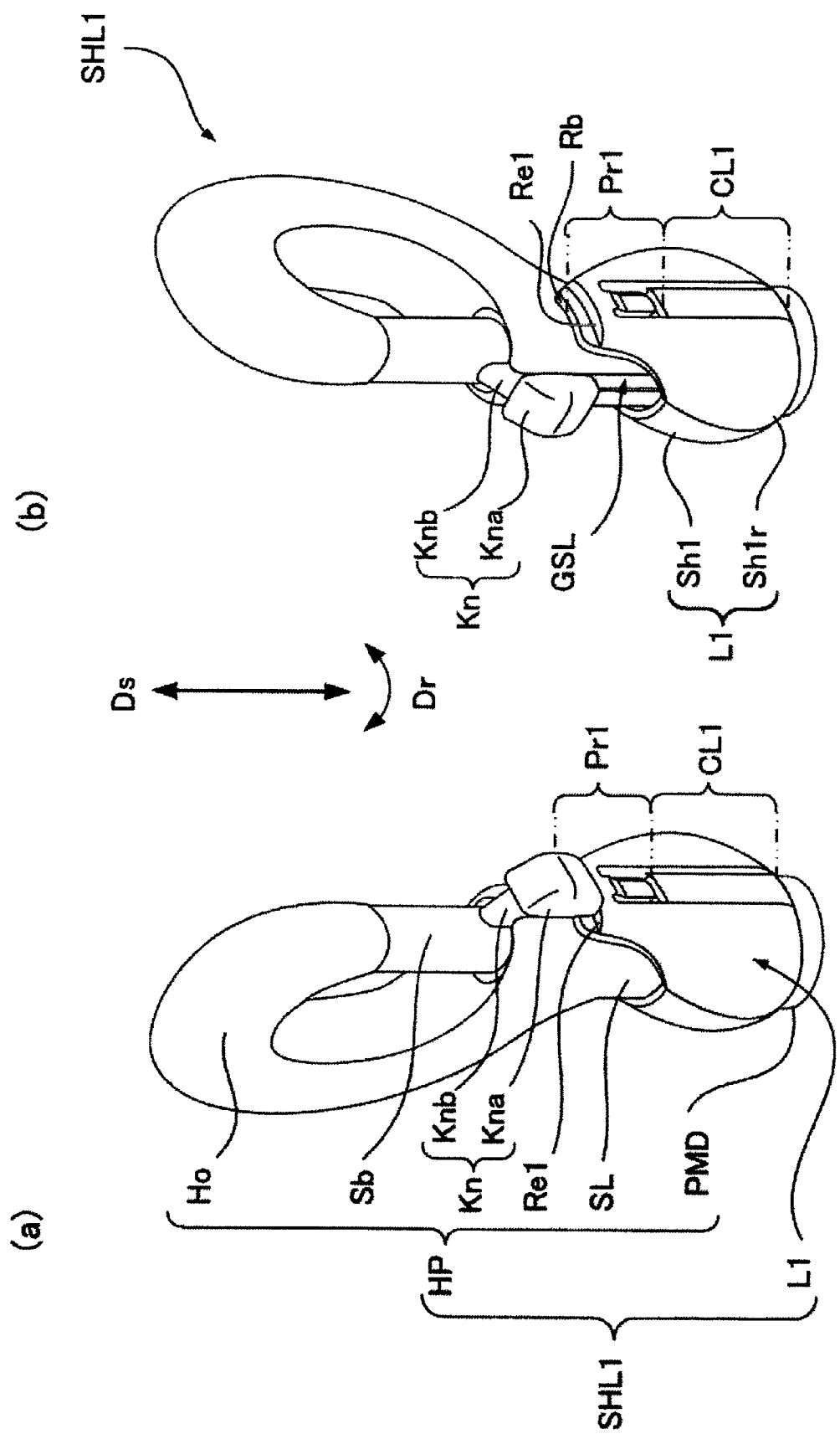
FIG. 1 is a perspective view showing a connector for animal according to a first embodiment of the present invention, wherein (a) shows a state in which an operation member is locked and (b) shows a state in which the operation member is unlocked.

As shown in FIG. 1, a connector for animal SHL1 (hereinafter referred to as "the connector" according to the present embodiment includes a snap hook member HP and a lock member L1. The snap hook member HP has a hook member Ho which can open, a stem portion SL, and a slide bar Sb. The lock member L1 is installed on the snap hook member HP in such a manner of being rotatable around the stem portion SL. The lock member L1 is a component of a stopper mechanism which prevent the slide bar Sb from moving against the user's intention.

In FIG. 1(a), shown is the connector SHL1 in a state in which the lock member L1 prevents the slide bar Sb from moving (backward), hereinafter referred to as "lock state".

In FIG. 1(b), shown is the connector SHL1 in a state in which the slide bar Sb can move (backward), hereinafter referred to as "unlock state". A position of the lock member L1 on the snap hook member HP when the slide bar Sb is in the lock state is referred to as a lock position, and a position of the lock member L1 on the snap hook member HP when the slide bar Sb is in the unlock state is referred to as an unlock position. That is, the slide bar Sb can be put into the lock state or the unlock state easily by rotating the lock member L1 to the lock position or the unlock position. First, described is a construction of the snap hook member HP.

Figure 2:
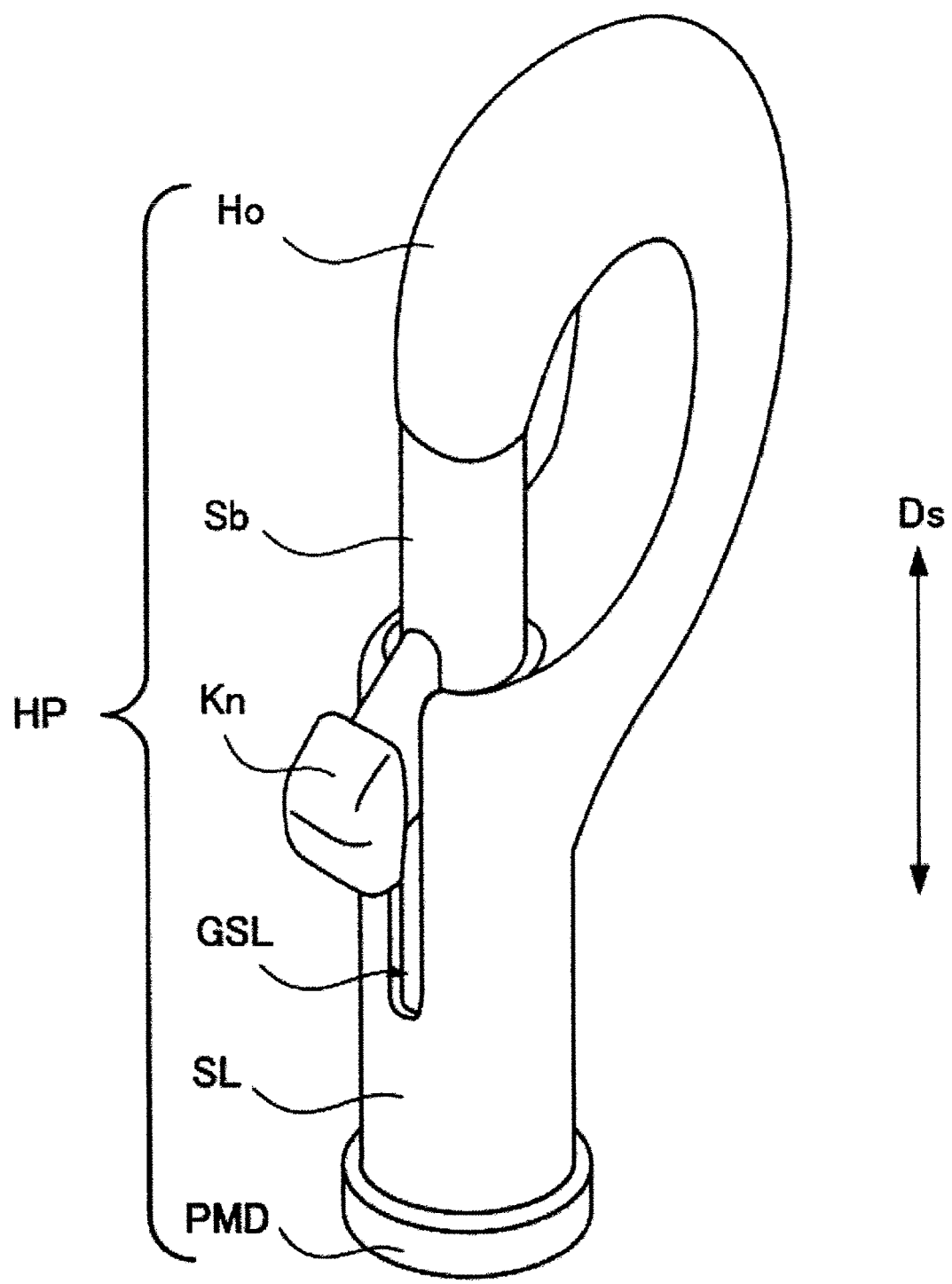
FIG. 2 is a perspective view showing a snap hook portion of the connector shown in FIG. 1.
Figure 36:
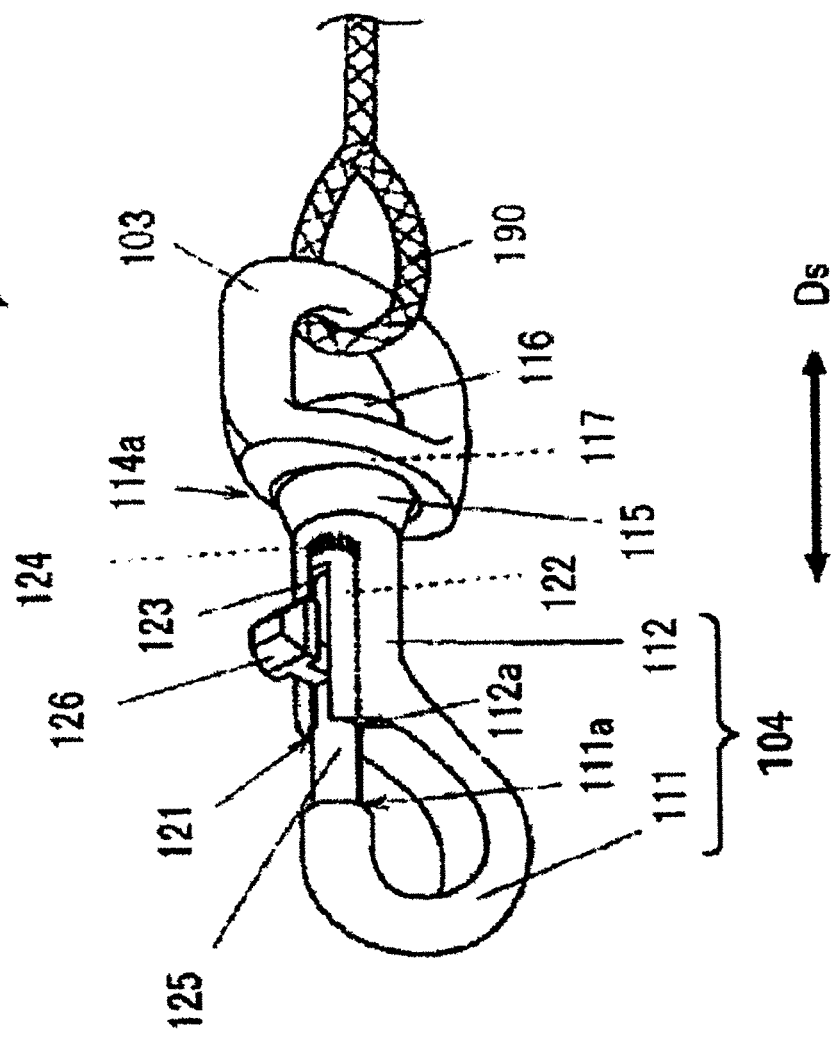
FIG. 36 is a perspective view showing the connector for animal shown in FIG. 35.
Figure 37:
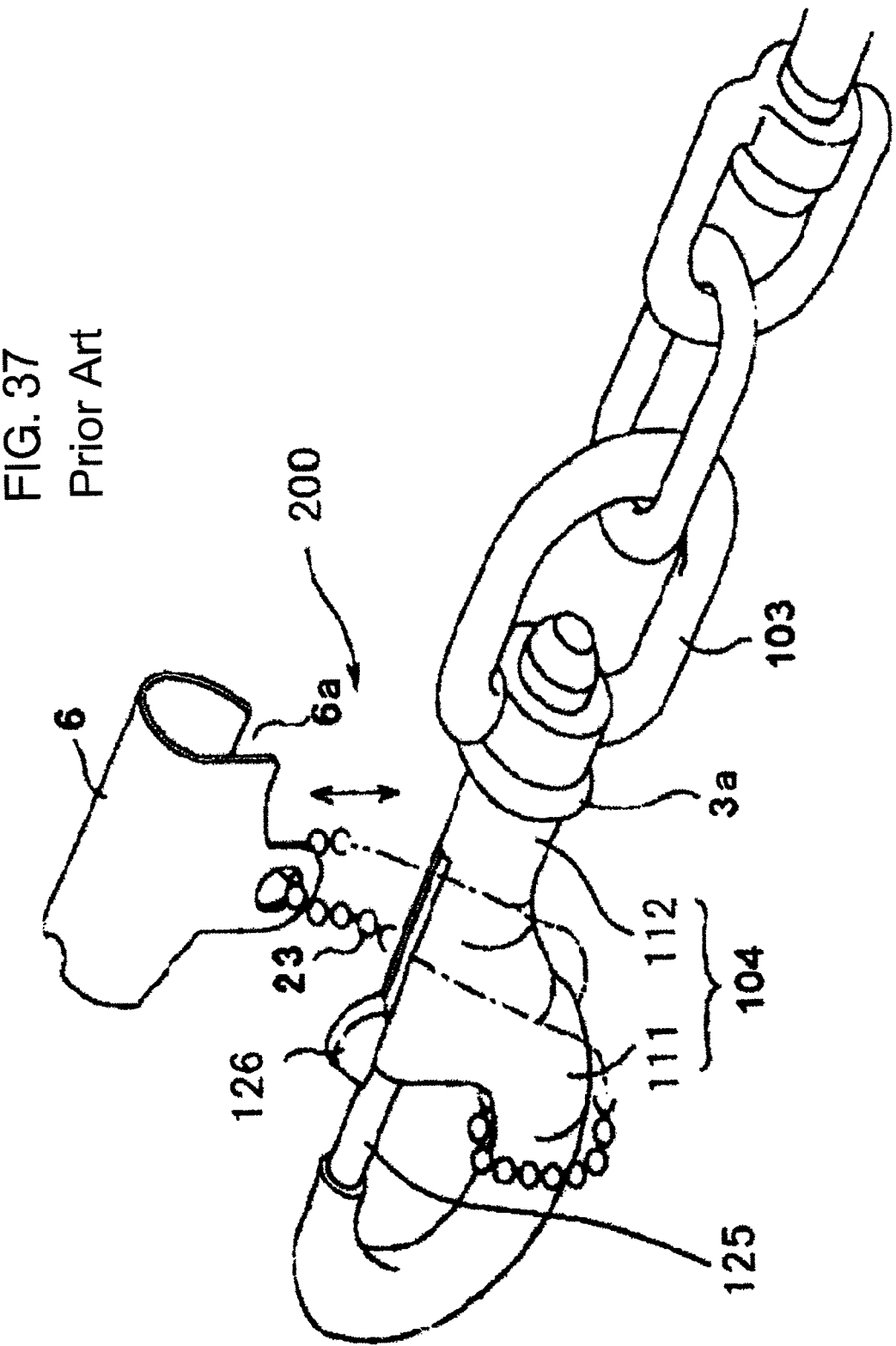
FIG. 37 is a perspective view showing a connector for animal proposed by Patent Literature 1.
Figure 38:
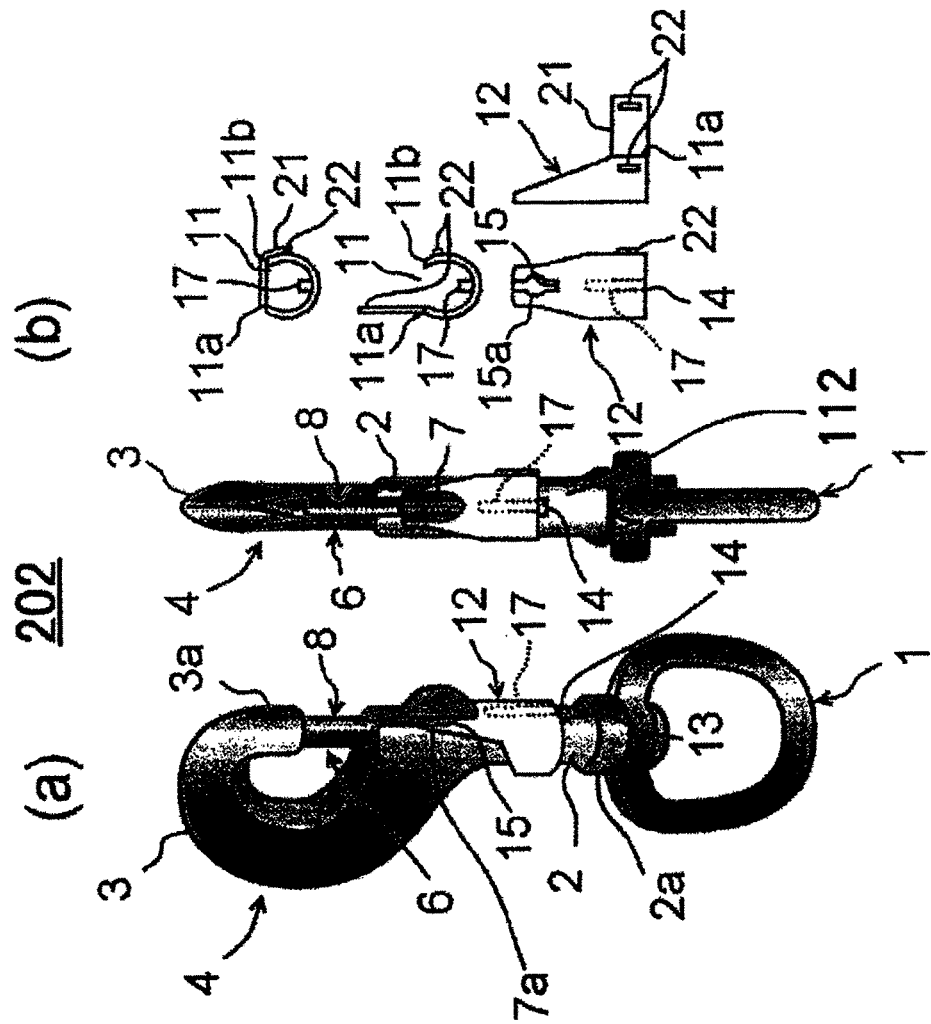
FIG. 38 is a diagram showing a connector for animal proposed by Patent Literature 2 looked at various angles.
Figure 39:
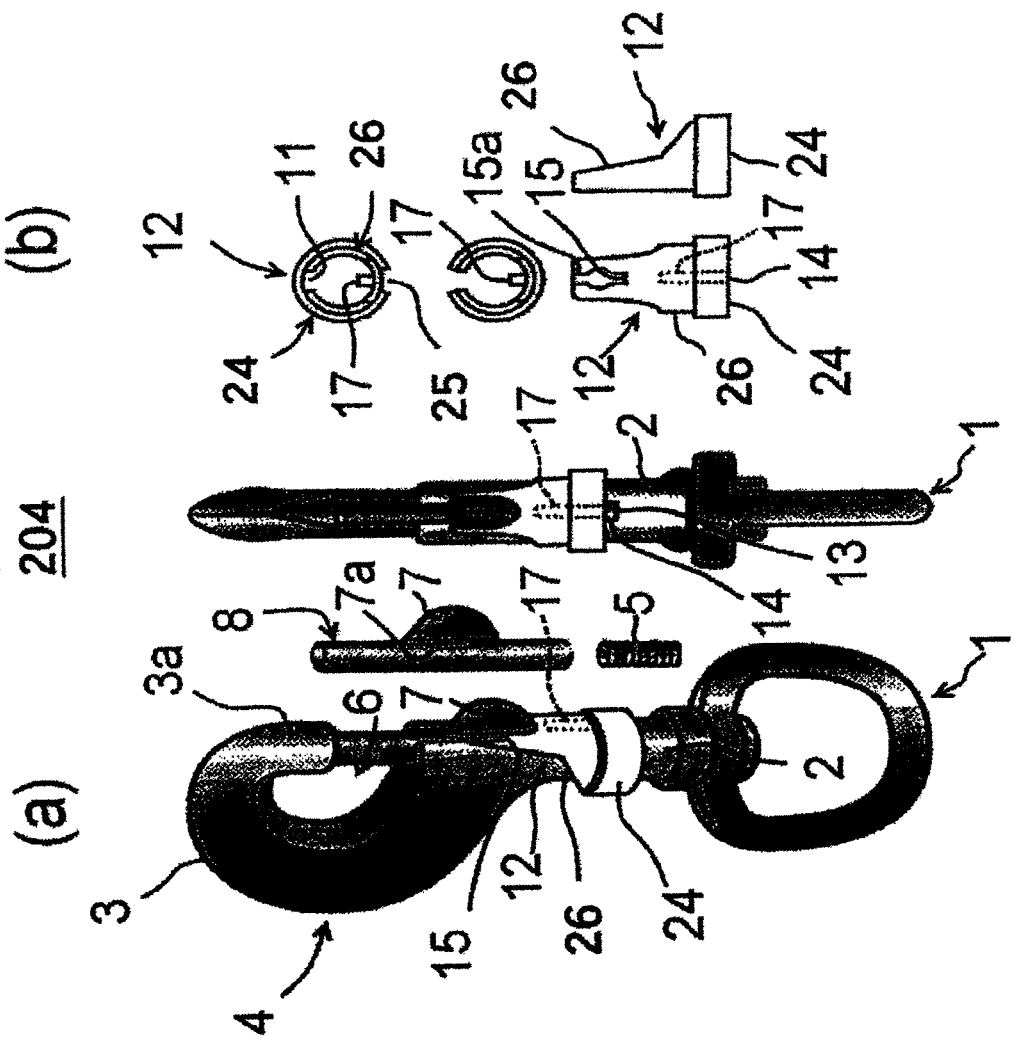
FIG. 39 is a diagram showing another connector for animal proposed by Patent Literature 2 looked at various angles.

As shown in FIG. 2, the snap hook member HP has a construction similar to that of the conventional snap hook member 104 described with reference to FIG. 36. Specifically, the snap hook member HP includes the hook member Ho formed in C character like shape, the stem portion SL integrally formed with the hook member Ho in a cylindrical shape, and the slide bar Sb incased inside the stem portion SL. An apical surface of the hook member Ho and an apical surface of the stem portion SL opposes to each other at a predetermined distance. The stem portion SL has a major diameter portion PMD formed in an end opposite to the hook member Ho. A connect ring (not shown) which is used for mooring something like a leash or connecting a towing means may join to the stem portion SL at the end in a rotatable manner.

A groove GSL is formed in the stem portion SL extending along the stem direction Ds. The slide bar Sb is biased by a spring (not shown) incased inside the stem portion SL so as to contact the hook member Ho at both the apical ends thereof. The slide bar Sb is provided with an operating member Kn integrally formed therein. The operating member Kn is exposed to the outside of the stem portion SL through the groove GSL. The operating member Kn, as shown in FIG. 1, can be divided into a knob Kna which the user can touch directly to manipulate and a joint member Knb for jointing the knob Kna and the slide bar Sb.

By moving the operating member Kn along the stem direction Ds in a direction (the side of major diameter portion PMD) so as to separate from the apical surface of the hook member Ho against the biasing force of the spring described in the above, the distal end face of the slide bar Sb is separated from the distal end face of the hook member Ho to form a gap therebetween. Hereinafter, the movement of the operating member Kn toward the major diameter portion PMD is referred to as "hook member opening operation by the operating member Kn."

Referring back to FIG. 1, described is the stopper mechanism in the connector SHL1. The stopper mechanism for preventing the slide bar Sb from moving (backward) against the user's intention is constructed with the lock member L1 rotatably attached to the stem portion SL. A direction in which the lock member L1 can rotate is referred to as a rotation direction Dr. Inhibition of movement (backward) of the slide bar Sb is made such that a portion of the lock member L1 contacts with the operating member Kn (the knob Kna or the joint member Knb) by which the hook member opening operation by the operating member Kn is inhibited.

As shown in FIGS. 1(a) and (b), the lock member L1 includes a cylindrical member CL1 and a projection Pr1 integrally formed with the cylindrical member CL1. A side wall of the lock member L1 is formed to have a middle portion thicker than an upper end and a lower end with respect to the stem direction Ds. The projection Pr1 is also formed in a shape becoming thinner from a portion connecting to the cylindrical member CL1 toward the upper end thereof. The cylindrical member CL1 is a component provided with a cylindrical shaped space formed therein for accommodating the stem portion SL in a rotatable manner. A central axis of the cylindrically formed space is referred to as a central axis Ac, and a rotation axis of the cylindrical member CL1 is referred to as a rotation axis Ar, and are respectively shown in FIG. 5, FIG. 6, and FIG. 7.

The projection Pr1 extends from the upper end of the cylindrical member CL1 with respect to the stem direction Ds toward the apical surface side of the hook member Ho. The projection Pr1 has a seat portion Re1 extending in a direction perpendicular to the stem direction Ds at a predetermined position from the upper end. A portion from the seat portion Re1 to the upper end portion of the projection Pr1 is referred to as a "rear member Rb". The movement (backward) of slide bar Sb is inhibited such that the seat portion Re1 contacts with the operating member Kn (mainly, the knob Kna). In the present embodiment, the lock member L1 is constructed such that two components of half-shells Sh1 and Sh1r are combined with each other. The projection Pr1 is integrally formed with the half-shell Sh1r. That is, the cylindrical member CL1 is the portion of the lock member L1 except the projection Pr1. The half shells Sh1 and Sh1r will be described later.

In the connector SHL1 in the lock state shown in FIG. 1(a), the lock member L1 opposes to the operating member Kn in the stem direction Ds. When the operating member Kn moves toward the side of the major diameter portion PMD against the user's intention, the operating member Kn becomes in contact with the seat portion Re1 of the lock member L1, preventing the operating member Kn or the slide bar Sb from moving (backward) against the user's intention. The seat portion Re1 receives the lower end portion of the operating member Kn so as to limit the movement of the slide bar Sb in the stem direction Ds. The moving distance which the operating member Kn passes until being in contact with the seat portion Re1 is set so that a separation distance between the apical surface of hook member Ho and the apical surface of the slide bar Sb becomes within such a range that the components connected to the hook member Ho can not pass therethrough.

The operating member Kn in the lock state can be unlocked such that the relative position of the seat portion Re1 and the operating member Kn is changed by rotating the lock member L1 in the rotation direction Dr. In the connector SHL1 in the unlock state shown in FIG. 1(b), the seat portion Re1 of the lock member L1 does not oppose to the operating member Kn in the stem direction Ds. Thus, the operating member Kn, or the slide bar Sb becomes able to move (backward). That is, in the connector SHL1, the operating member Kn can be locked or unlocked such that the seat portion Re1 is opposed to or not opposed to the operating member Kn by rotating the lock member L1 in the rotation direction Dr. Later described detailedly is the construction as well as the function of the lock member L1.

Figure 5:
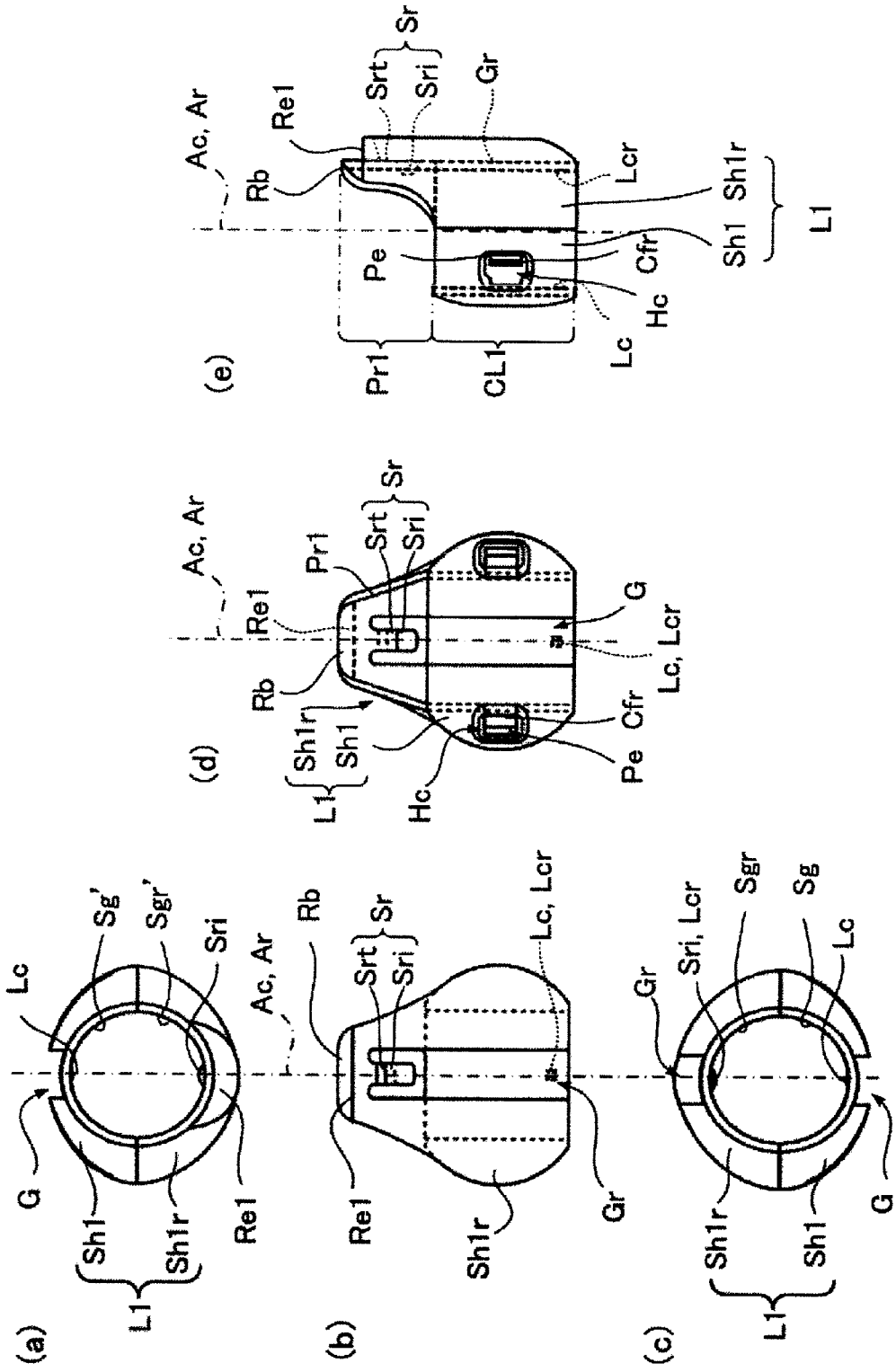
FIG. 5 is a diagram showing the lock member shown in FIG. 1 looked at various angles.
Figure 6:
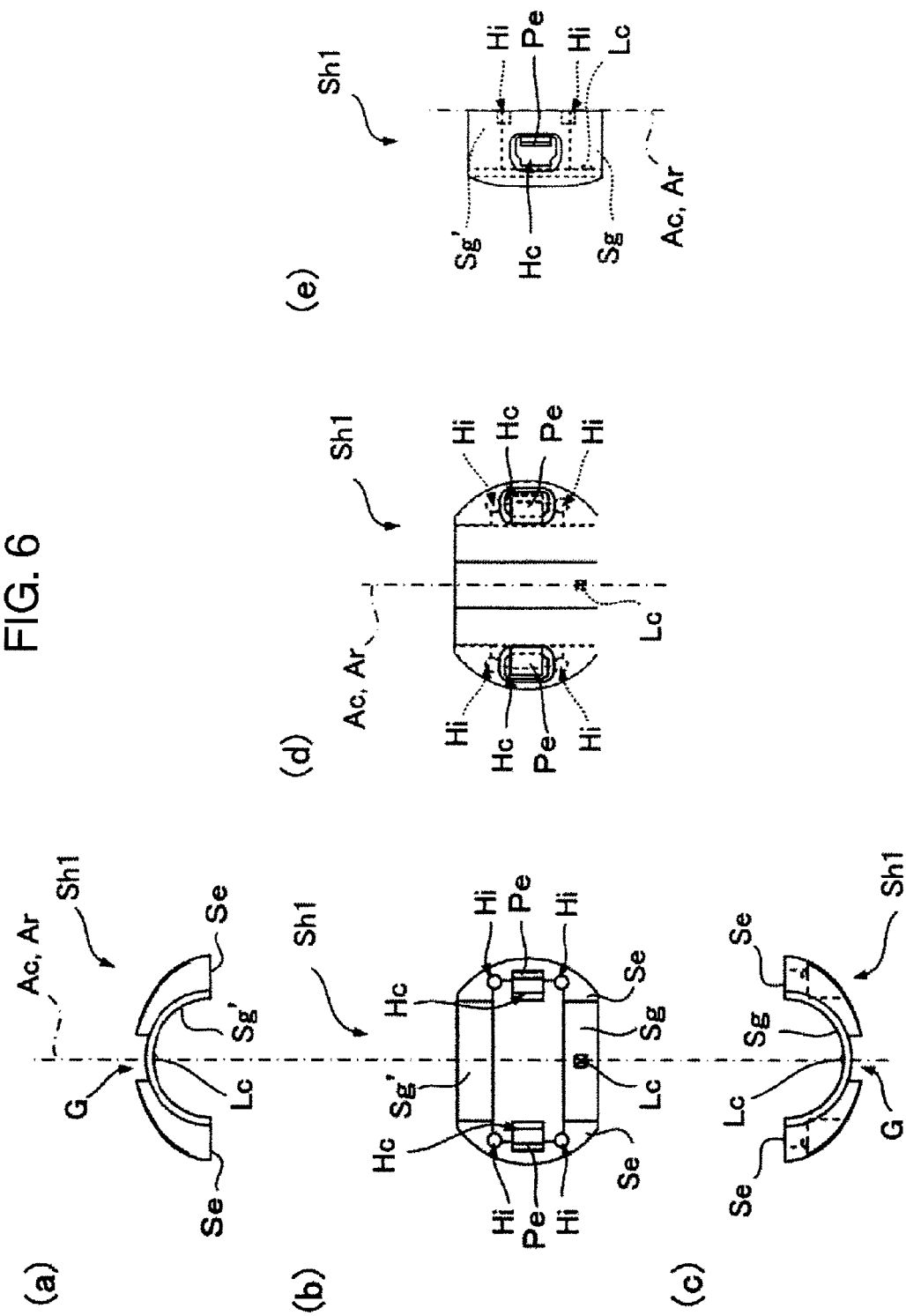
FIG. 6 is a diagram showing a half-shell which is a component of the lock member shown in FIG. 1 looked at various angles.
Figure 7:
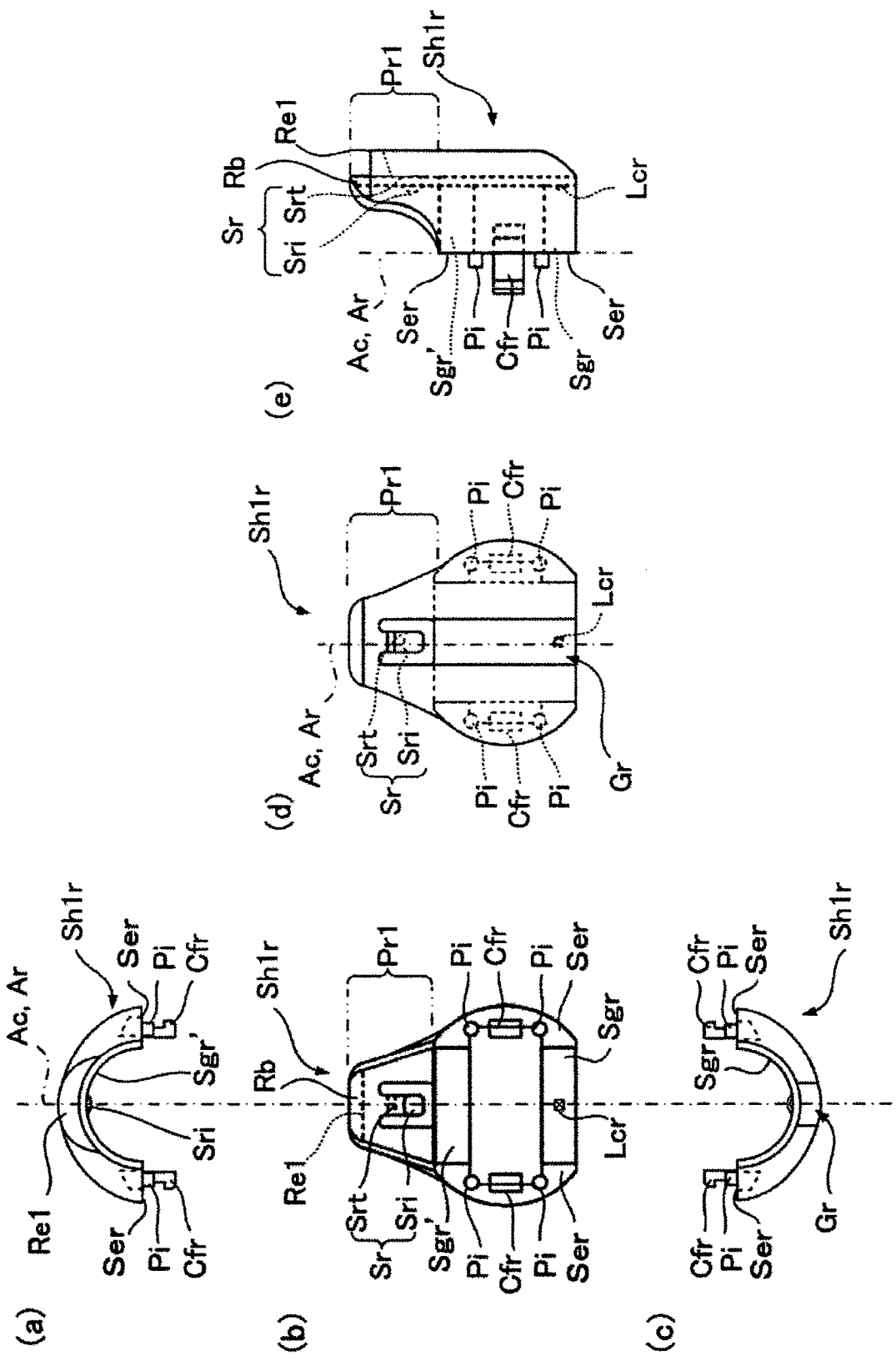
FIG. 7 is a diagram showing the half-shell which is a component of the lock member shown in FIG. 1 and has a projection continuously formed therein, looked at various angles.

With reference to FIG. 3, FIG. 4, FIG. 5, FIG. 6, and FIG. 7, the construction and the function of the lock member L1 will be described. Described with reference to FIG. 3 and FIG. 4 are constructions of the half-shells Sh1 and Sh1r which are components of the lock member L1 as well as the construction of the lock member L1. With reference to FIG. 5 to FIG. 7, the lock member L1, the half-shell Sh1, and the half-shell Sh1r are further described respectively.

In FIG. 3, shown is the lock member L1 looked from the side of the half-shell Sh1r. Specifically, FIG. 3(b) shows the half-shell Sh1 and the half-shell Sh1r before being joined. FIG. 3(a) shows the lock member L1 constructed with the half-shell Sh1 and the half-shell Sh1r being joined. FIG. 4(a) shows the lock member L1 looked from the side of half-shell Sh1 (in arrow direction IVa) in FIG. 3(a). FIG. 4(b) shows the lock member L1 looked from the side of half-shell Sh1 (in an arrow IVb) in FIG. 3(b).

As described in the above, the lock member L1 is a component formed in a cylindrical shape and includes the cylindrical member CL1 and the projection Pr1. In a state in which the lock member L1 is mounted on the stem portion SL of the connector SHL1, the inner surface of the cylindrical member CL1 opposes to the side face of the stem portion SL. A cross section perpendicular to the axis of the stem portion SL is almost circular. In the inner surface of the cylindrical member CL1, provided is a rotation guide means having a function for guiding the lock member L1 to rotate around the stem portion SL. From the point of view of rotation guide, preferable is that the inner surface of the cylindrical member CL1 is greater than the outer shape of the stem portion SL as well as at least a portion is in cylindrical shape. Preferable is that the cross-sectional shape of the inner surface of the cylindrical member CL1 is almost similar to the cross-sectional shape of the outer surface of the stem portion SL as well as the center axes thereof coincide. That is, the central axis Ac and the rotation axis Ar of the cylindrical member CL1 preferably coincide.

The lock member L1 shall withstand the repeated rotation around the stem portion SL and the load to receive the operating member Kn, for which hardness and strength is required. In the present embodiment, the lock member L1 is constructed with polyacetal, or Polyoxymethylene (abbreviated as POM). Polyacetal has crystalline portion and non-crystalline portion mixed therein and is an engineering plastic with excellent strength, elastic modulus, shock resistance, and sliding property.

As discernible from FIG. 3 and FIG. 4, the lock member L1 is combined the half-shell Sh1 and the half-shell Sh1r. The cylindrical shaped lock member L1 is constructed with a component divided into the half-shells Sh1 and Sh1r. As described in the above, the projection Pr1 is integrally formed with the half-shell Sh1r. The cylindrical member CL1 is a portion of the lock member L1 except the projection Pr1. That is, the cylindrical member CL1 is constructed with the half-shell Sh1 and the half-shell Sh1r. Below described are constructions of the half-shell Sh1 and Sh1r, respectively. Next described is joining of the half-shell Sh1 and the half-shell Sh1r.

Below described first with reference to FIG. 3 is the outer surface side construction of the half-shell Sh1r, and then the inner surface side construction of the half-shell Sh1r will be described with reference to FIG. 4(b). As shown in FIG. 3, in the outer surface of the half-shell Sh1r, provided is the seat portion Re1 formed at the upper end of the projection Pr1, where a groove Gr extending in the stem direction Ds is formed. The groove Gr is defined by a bottom face Gbr and a pair of side faces Gsr opposing to each other. A rotation stopper Sr having a tab Srt defined by a slit S in U-character like shape is formed between the groove Gr and the seat portion Re1. The upper end portion of the tab Srt is a fixed end integrally connected with the half-shell Sh1r, and the other portion is a free end cut away from the half-shell Sh1r. Between the surfaces of the tab Srt and the half-shell Sh1r, a level difference is formed. That is, the thickness of tab Srt is smaller than that of side wall of the seat portion Re1 and that of the lower portion of the seat portion Re1.

As discernible from FIG. 4, a bit Sri is protruding from the lower portion (free end) of the inner surface of the tab Srt in a centripetal direction. This protrusion makes the stem portion SL to press the bit Sri outward at the surface thereof when the lock member L1 is attached to the stem portion SL, causing the elastic deformation of the tab Srt to generate a centripetal force by which the bit Sri is biased toward the center portion of the stem portion SL. The tab Srt is connected to the thick lower portion of the seat portion Re1 at the level difference in the above, by which the elastic deformability of the seat portion Re1 is enhanced without degradation of the mechanical strength or with decreasing the thickness of free end.

When the lock member L1 being installed on the stem portion SL is rotated in the rotation direction Dr, the bit Sri (the rotation stopper Sr) will reach a position above the groove GSL (the lock position) of the stem portion SL and then is fit in the groove GSL by the bias force. By fitting of the bit Sri into the groove GSL, the lock member L1 is located on the lock position with respect to the operating member Kn. In this meaning, a locating means are constructed with the rotation stopper Sr and the groove GSL when the lock member L1 is located in the lock position. Further rotation of the lock member L1 in the rotation direction Dr makes the bit Sri to remove from the groove GSL, causing that the lock member L1 leave from the lock position with respect to the operating member Kn and the slide bar Sb becomes in the unlock state. The tab Srt is connected to the lower portion of the seat portion Re1 with enough mechanical strength, and is well secured against the force applied when the bit Sri leaves from the groove GSL according to the rotation.

As discernible from FIG. 4(b), a side wall of the half-shell Sh1r is formed thicker at the middle portion than at the upper end portion and the lower end portion with respect to the stem direction Ds. The half-shell Sh1r is provided with regions Sgr' and Sgr formed in a strip-like shape preferably similar to the outer shape of the stem portion SL extending in a circumferential direction at upper and lower portions in the inner surface thereof. As described later, the half-shell Sh1 is also provided with regions Sg' and Sg (FIG. 3(b)) formed in a strip-like shape similar to the outer shape of the stem portion SL extending in the circumferential direction in the same way. The regions Sgr' and Sgr as well as the region Sg' and the region Sg will oppose to or contact with the outer circumference of the stem portion SL when the half-shell Sh1r as well as the half-shell Sh1 as the lock member L1 are installed on the stem portion SL. That is, the above mentioned rotation guide means MG (FIG. 5(a) and FIG. 5(c)) for guiding the lock member L1 to rotate around the stem portion SL is constructed with the regions Sgr' and Sgr as well as the regions Sg' and Sg.

The region Sgr is provided with a projection Lcr at almost the center position with respect to the stem direction Ds and the circumferential direction. In the state in which the half-shell Sh1r and the half-shell Sh1 as the lock member L1 are installed on the stem portion SL, the projection Lcr is pressed against the outer circumference of the stem portion SL to be deformed elastically, causing that the projection Lcr to suppress the play of the lock member L1 arising from a gap between the inner surface of the cylindrical member CL1 and the outer circumference of the stem portion SL. Thus, coincidence of the central axis Ac of the cylindrical member CL and the rotation axis Ar is made.

The half-shell Sh1r is provided with end faces Ser and Ser formed at both end portions with respect to the circumferential direction. As described later, the half-shell Sh1 is also provided with end faces Se and Se (FIG. 3(b)) formed at both end portions with respect to the circumferential direction. The half-shell Sh1r and the half-shell Sh1 are joined to each other to construct the lock member L1 by the below described joining means in the state in which the end faces Ser and Ser and the end faces Se and Se are in contact with each other.

Each of the end faces Ser and Ser is provided with a pair of projections Pi and Pi and a claw member Cfr. Above and below the claw member Cfr, one projection Pi is arranged, respectively. Each of the claw members Cfr and Cfr is provided with a barb extending in a centrifugal direction at the apical portion thereof.

Continuously referring to FIG. 4, a construction of the half-shell Sh1 on the outside is mainly described first, and then a construction of the half-shell Sh1 on the inner side is described with reference to FIG. 3(b). As shown in FIG. 4, in the outer surface of the half-shell Sh1 is formed a groove G extending in the stem direction Ds. The groove G is defined by a bottom face Gb and a pair of side faces Gs opposing to each other. The half-shell Sh1 is provided with two openings He formed each in about a rectangular shape on the both sides of the groove G.

Referring back to FIG. 3, described is the construction of the half-shell Sh1, looked from inside of the lock member L1. As discernible from FIG. 3(b), the side wall of the half-shell Sh1 is formed thicker at the middle portion than at upper end portion and the lower end portion with respect to the stem direction Ds as the side wall (FIG. 4(b)) of the half-shell Sh1r is. As described in the above, the regions Sg' and Sg together with the regions Sgr' and Sgr (FIG. 4(b)) are opposed to and contacted with the outer circumference of the stem portion SL so as to construct the rotation guide means MG. The region Sg is provided with a projection Lc formed at a position almost center with respect to the stem direction Ds and the circumferential direction in a similar manner as the projection Lcr (FIG. 4(b)) in the region Sgr does. That is, in the state in which the half-shell Sh1 and the half-shell Sh1r as the lock member L1 are installed on the stem portion SL, the projection Lc is pressed against the outer circumference of the stem portion SL to be deformed elastically, causing that the projection Lc to suppress the play of the lock member L1 arising from a gap between the inner surface of the cylindrical member CL1 and the outer circumference of the stem portion SL. The positions of projections Lcr and Lc are appropriately determined from the point of view of play reduction and smooth rotation when the lock member L1 is mounted on the stem portion SL.

A joint member, corresponding to the joint means (projection Pi, claw member Cfr) provided in the side wall of the end faces Ser and Ser of the half-shell Sh1r, is provided in the side wall of the end faces Se and Se of the half-shell Sh1. Specifically, a fitting hole Hi and a platy member Pe corresponding to the projection Pi and the claw member Cfr, respectively, in the end face Ser of the half-shell Sh1r are provided. The platy member Pe is constructed not to overlap the opening He at an area on the side of the groove G but to contact with at least a portion of the barb of the claw member Cfr which will correspond thereto when the half-shell Sh1 is joined to the half-shell Sh1r.

Joining of the end face Se of the half-shell Sh1 and the end face Ser of the half-shell Sh1r is achieved such that the above mentioned projections Pi fit in the respectively corresponding fitting holes Hi and the claw member Cfr engage with the platy member Pe, as indicated by alternate long and short dashed lines in FIG. 3(b) and FIG. 4(b). The engagement of the claw member Cfr with the platy member Pe is achieved such that the barb engages with the platy member Pe when the barb gets over while the claw member Cfr moves toward the opening Hc. The opening He provide a space which can accommodate the apical portion of the claw member Cfr when the barb of the claw member Cfr climbs up the platy member Pe. From this point of view, the opening He is not necessarily a through hole, and is also allowed to be formed as a recess.

The projections Lc and Lcr are preferably provided at positions symmetric to each other with the rotation axis as the axis of symmetry in the state in which the half-shell Sh1 and the half-shell Sh1r are joined as the lock member L1 in the point of view of equalization (or, cancellation) of a gap between the inner surface of the cylindrical member CL1 and the outer circumference of the stem portion SL. The reason is that the equalization (or cancellation) of the gap, enabling a smooth rotation of the lock member L1 and an even biasing of the bit Sri to the stem portion SL. Furthermore, the movement of the bit Sri to be inserted in or to be pulled up from the groove GSL becomes stabilized. It is to be noted that the play of the lock member L1 can be suppressed even if either one, at least one of the projections Lc and Lcr, is provided.

With reference to FIG. 5, further described is the lock member L1 which is constructed by joining the half-shell Sh1 and the half-shell Sh1r. FIG. 5(a) shows a plan view of the lock member L1; FIG. 5(b) shows the lock member L1 looked from the side of half-shell Sh1r; FIG. 5(c) shows a bottom view of the lock member L1; FIG. 5(d) shows the lock member L1 looked from the side of the half-shell Sh1; and FIG. 5(e) shows a side view of the lock member L1.

From FIG. 5(a) and FIG. 5(c), discernible is that the lock member L1 is provided with the rotation guide means MG formed by the regions Sg' and Sgr' as well as the regions Sg and Sgr, respectively, in the upper and lower portions of the inner surface thereof. As shown in FIG. 5(b), two units of the rotation guide means MG are respectively formed in the upper and lower places of inner surface of the lock member L1.

As shown in FIG. 5(a), the bit Sri and the projection Lc extrude in the centripetal direction from the inner surface of the lock member rL1. The contour of the lock member L1 looked from above (in the stem direction Ds) is oval shape. This comes from that the joint means is devised over the end face Se and the end face Ser.

As shown in FIG. 5(b) and FIG. 5(d), the cylindrical member CL1 is constructed such that the middle portion bulges in the centrifugal direction, compared with the upper end portion and the lower end portion with respect to the stem direction Ds. At the both ends of the major axis, where the joint means is devised, of the lock member L1 formed in an oval shape, the bulge amount shows the maximum.

As discernible from FIG. 5(c), the bit Sri and the projection Lcr are provided at position symmetric to the projection Lc with respect to the rotation axis Ar (central axis Ac) as the axis of symmetry such that the bit Sri and the projection Lcr as well as the projection Lc extrude in the centripetal direction. The groove G and the groove Gr are provided so as to oppose to each other on the minor axis of oval contour of the lock member L1.

Shown in FIG. 5(d) and FIG. 5(e) are the claw members Cfr and the platy members Pe in a mutually joined state selected from means for joining the half-shell Sh1 and the half-shell Sh1r. From the same figure, the state in which the barb of the claw member Cfr is engaged with the platy member Pe is discernible. Both the barb of the claw member Cfr and the platy member Pe is partially exposed to the outer surface of the lock member L1 through the opening Hc. Thus, the barb of the claw member Cfr can be disengaged from the platy member Pe by external operation through the opening Hc, when it becomes necessary.

As described in the above, the cylindrical member CL1 is provided with a space formed inside in cylindrical shape defined by the rotation guide means MG and has such a contour that a distance from the central axis Ac in the circumferential direction and the radial direction varies at the location. To rotate the lock member L1 (the cylindrical member CL1), it is effective to use a portion whose distance from the central axis Ac is greater as a clue. For example, an effective clue is a portion neighboring the both ends of the major axis of the lock member L1 having an oval contour and symmetrically provided with respect to the central axis Ac (rotation axis Ar) of the cylindrical member CL1.

From this point of view, portion near both ends of the minor axis of the lock member L1 shaped in an oval contour is not effective as a clue for the rotation. However, with respect to the grooves Gr and G provided at both ends of the minor axis (symmetrical with the central axis Ac), the widths (corresponding to a difference between the radii at the surface and at the bottom faces Gbr and Gb) of the side faces Gsr and Gs is the maximum at the middle portion, where the bulge amount is the maximum, of the cylindrical member CL1. Therefore, the cylindrical member CL1 can be rotated effectively by using these portions of the side faces Gsr and Gs as clue. Thus, the cylindrical member CL1 is constructed to have an oval contour so that the end portions of the major axis as well as the minor axis can be used as a clue.

With reference to FIG. 6, the half-shell Sh1 is further described. FIG. 6(a) shows a plan view of the half-shell Sh1; FIG. 6(b) shows the half-shell Sh1 looked from the inside; FIG. 6(c) shows a bottom view of the half-shell Sh1; FIG. 6(d) shows the half-shell Sh1 looked from the outside; and FIG. 6(e) shows a side view of the half-shell Sh1.

Shown in FIG. 6(b) and FIG. 6(d) are the fitting hole Hi and the platy member Pe which are a means for joining the half-shell Sh1 and the half-shell Sh1r. It is discernible that the platy member Pe does not overlap with the opening He at place on the side of groove G of the opening Hc, as described with reference to FIG. 3(b) in the above.

With reference to FIG. 7, the half-shell Sh1r is further described. FIG. 7(a) shows a plan view of the half-shell Sh1r; FIG. 7(b) shows the half-shell Sh1r looked from the inside; FIG. 7(c) shows a bottom view of the half-shell Sh1r: FIG. 7(d) shows the half-shell Sh1r looked from the outside; and FIG. 7(e) shows a side view of the half-shell Sh1r.

As discernible from FIG. 7(a), FIG. 7(b), and FIG. 7(c), a set of the projections Pi and Pi and the claw member Cfr is arranged in each of end faces Ser so that the end faces of projections Pi and the barb of the claw member Cfr are aligned in the stem direction Ds. That is, each set of the projections Pi and Pi and the claw member Cfr are arranged in the left and right end faces Ser so as to be symmetric to each other with respect to the central axis Ac (preferably, the rotating axis Ar) as the axis of the symmetry.

Figure 8:
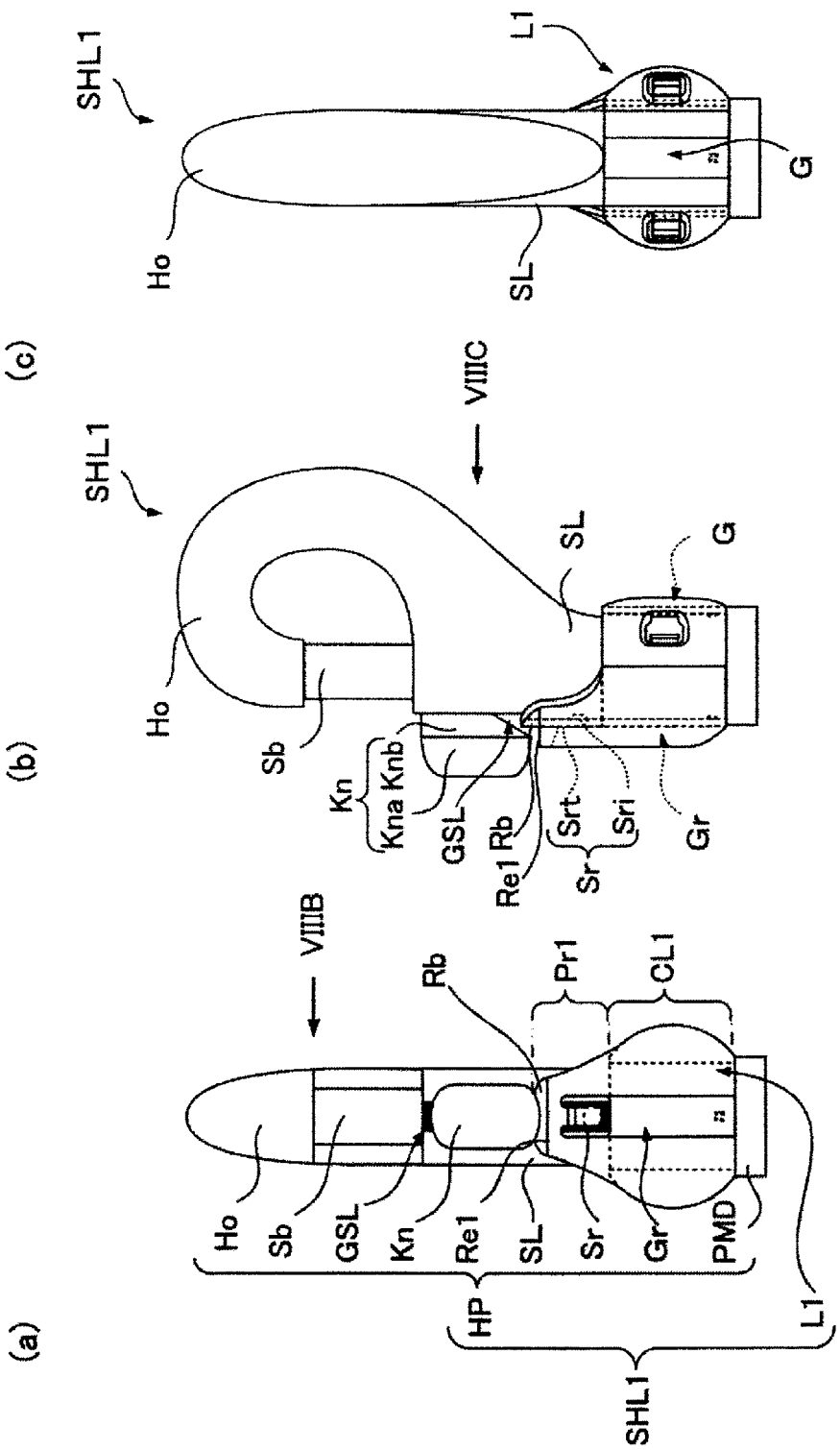
FIG. 8 is a diagram showing the connector shown in FIG. 1(a) looked at various angles.
Figure 9:
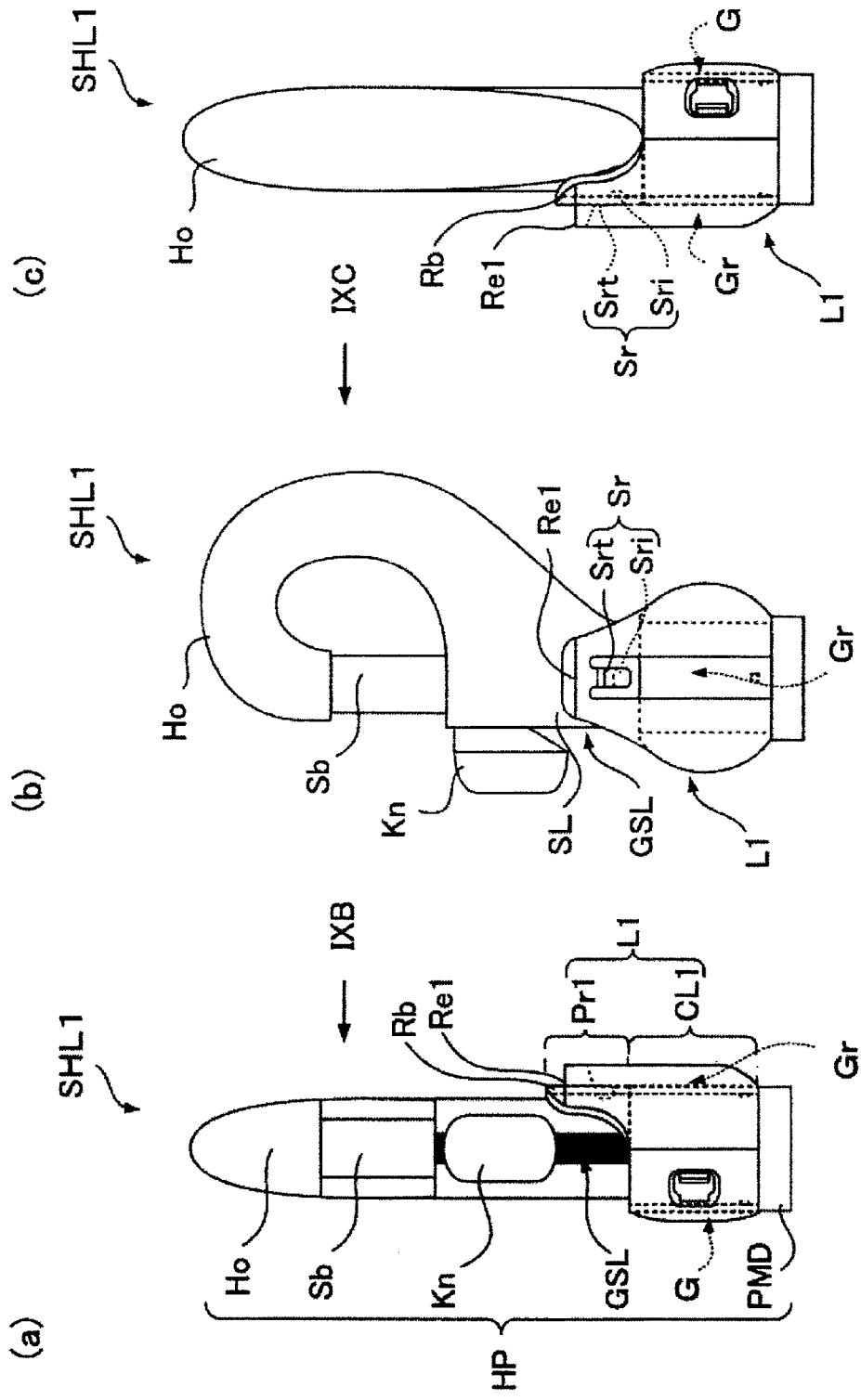
FIG. 9 is a diagram showing the connector shown in FIG. 1(b) looked at various angles.

Next, the position of the lock member L1 in the connector SHL1 is described with reference to FIG. 8, and thenafter the position of the lock member L1 in the connector SHL1 in the unlock state is further described with reference to FIG. 9.

FIG. 8(a) shows the connector SHL1 in the lock state looked from the side of the operating member Kn; FIG. 8(b) shows the connector SHL1 looked in an arrow direction VIIIB in FIG. 8(a); and FIG. 8(c) shows the connector SSH1 looked in an arrow direction VIIIC in FIG. 8(b).

As discernible from FIG. 8(a) and FIG. 8(b), in the connector SHL1 in the lock state, the lock member L1 is located in the rotation direction Dr such that the bit Sri fits in the groove GSL of the stem portion SL. Specifically, the lock member L1 is located at a position in the stem direction Ds such that the seat portion Re1 opposes to the operating member Kn. More specifically, the seat portion Re1 and the rear member Rb opposes to the knob Kna and the joint member Knb, respectively. When the operating member Kn is moved toward the side of the major diameter portion PMD against user's intention, the knob Kna of the operating member Kn becomes in contact with the seat portion Re1 of the lock member L1, preventing the operating member Kn or the slide bar Sb from moving (backward) against user's intention. In this instance, since the rear member Rb is located in a space between the knob Kna and the stem portion SL, it can be expected that the seat portion Re1 being contact with the joint member Knb is prevented from escaping and being deformed in centrifugal direction.

FIG. 9(a) shows the connector SHL1 in the unlock state looked from the side of the operating member Kn; FIG. 9(b) shows the connector SHL1 looked in an arrow direction IXB in FIG. 9(a); and FIG. 9(c) shows the connector SHL1 looked in an arrow direction IXC in FIG. 9(b).

As discernible from FIG. 9(a) to FIG. 9(c), in the connector SHL1 in the unlock state, the bit Sri is located not inside the groove GSL but on the surface of stem portion SL. The seat portion Re1 does not oppose to the operating member Kn in the stem direction Ds. The operating member Kn, or the slide bar Sb, can move (backward) a distance until the lower end portion thereof contacts with the upper end portion of the cylindrical member CL1. By moving the operating member Kn toward the side of the major diameter portion PMD, the hook member Ho can be opened.

Second Embodiment

Figure 11:
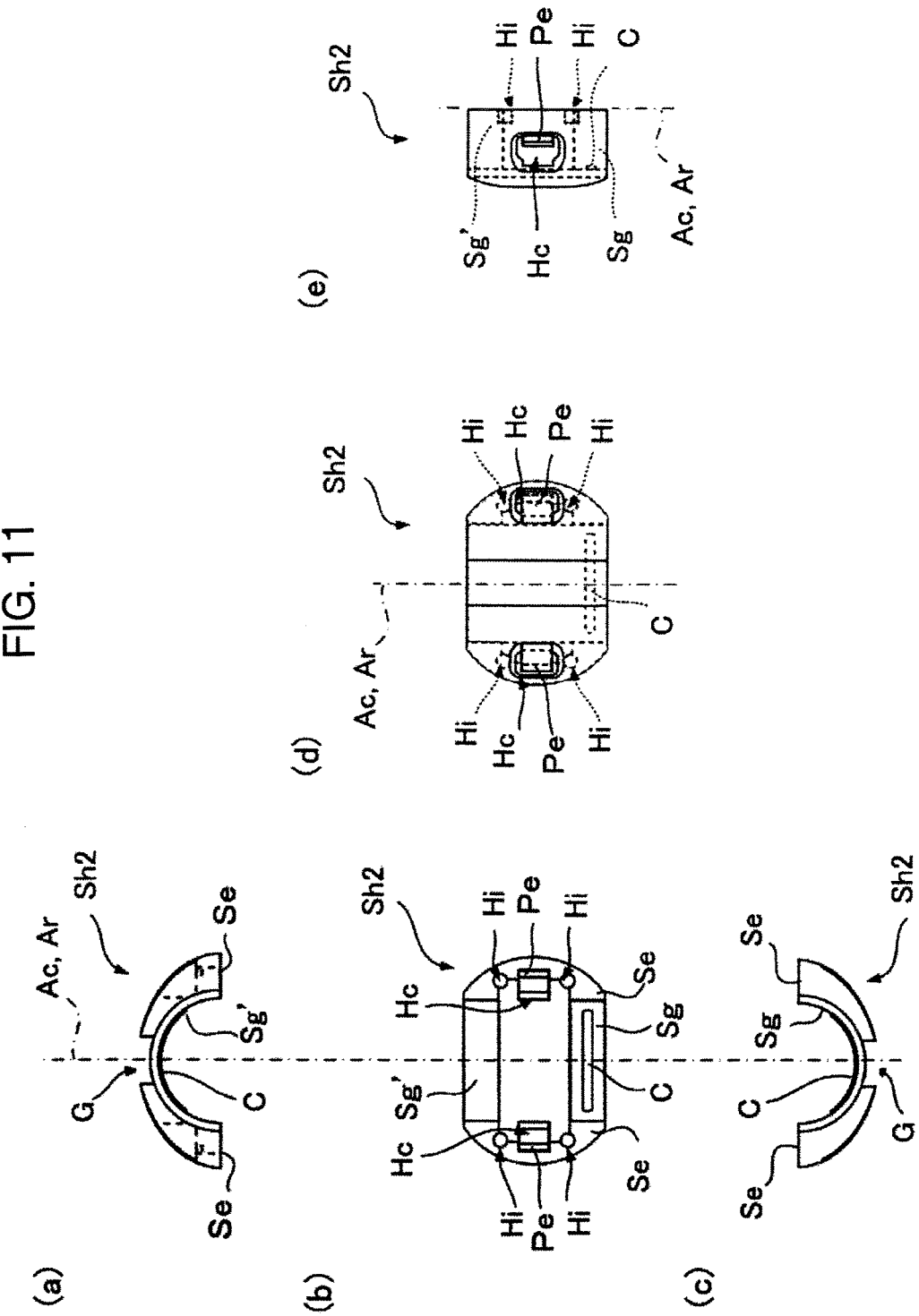
FIG. 11 is a diagram showing a half-shell which is a component of the lock member shown in FIG. 10, looked at various angles.
Figure 12:
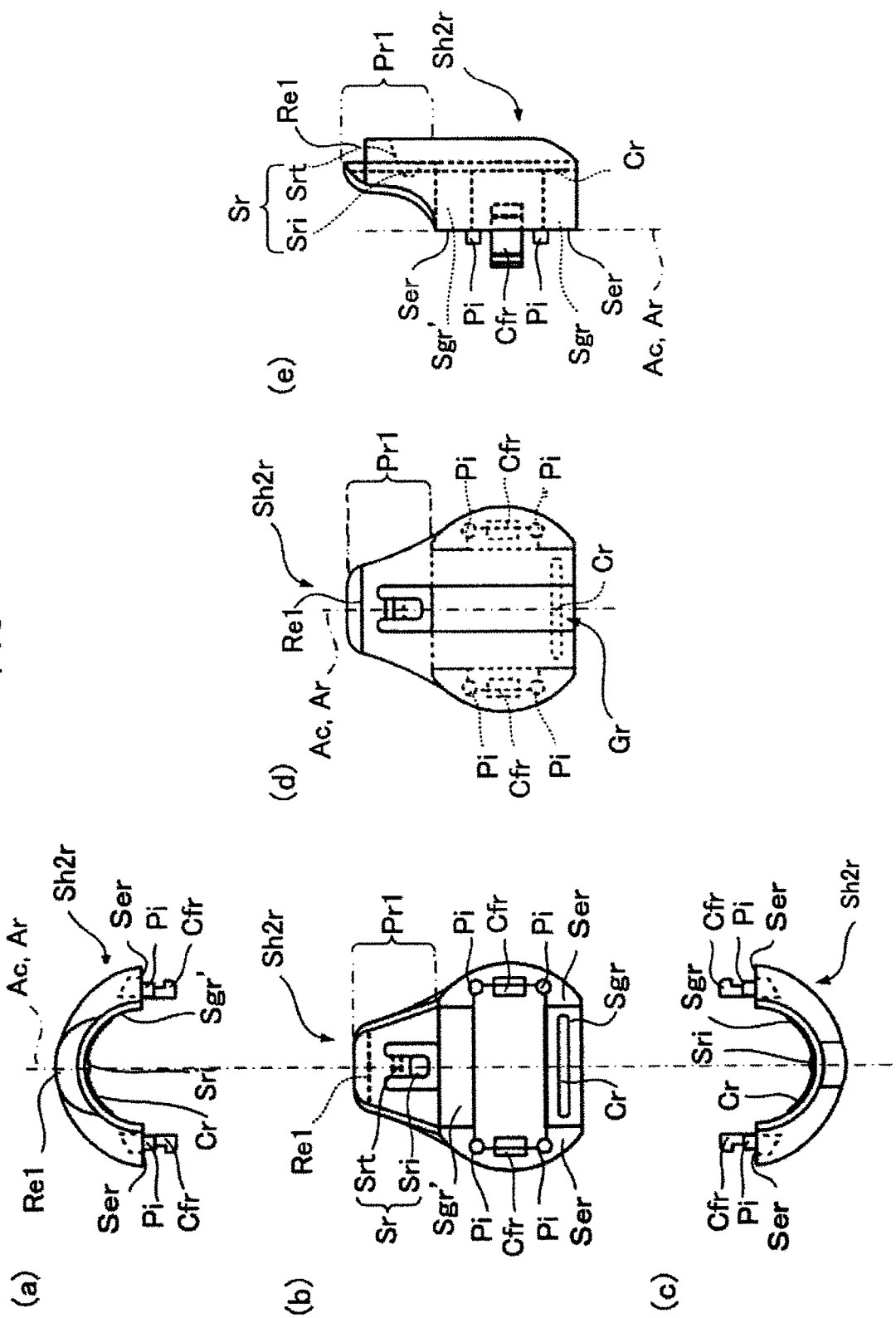
FIG. 12 is a diagram showing a half-shell which is a component of the lock member shown in FIG. 10 and has a projection continuously formed therein, looked at various angles.
Figure 13:
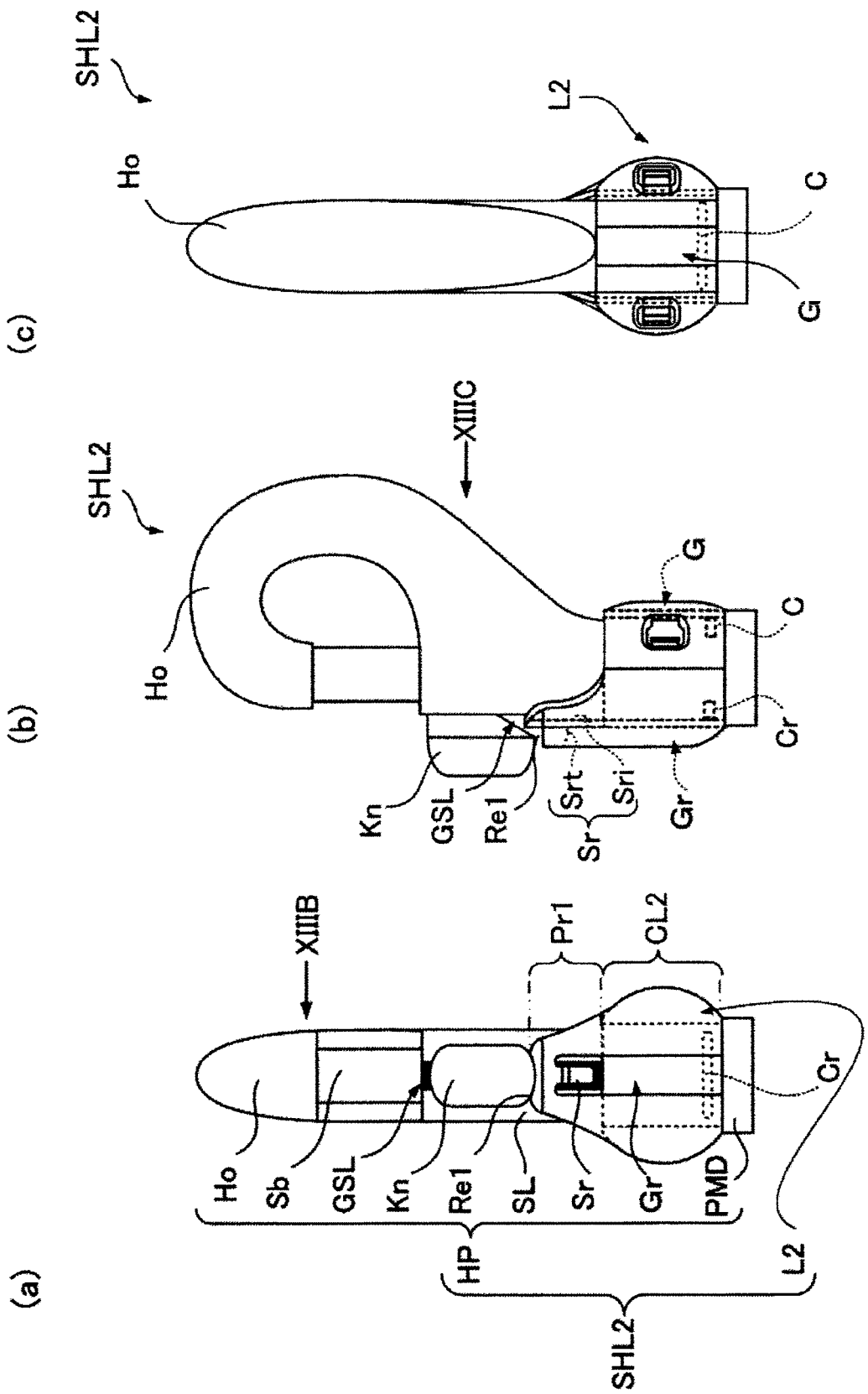
FIG. 13 is a diagram showing the connector in a state in which the operation member is locked by the lock member shown in FIG. 10, looked at various angles.
Figure 14:
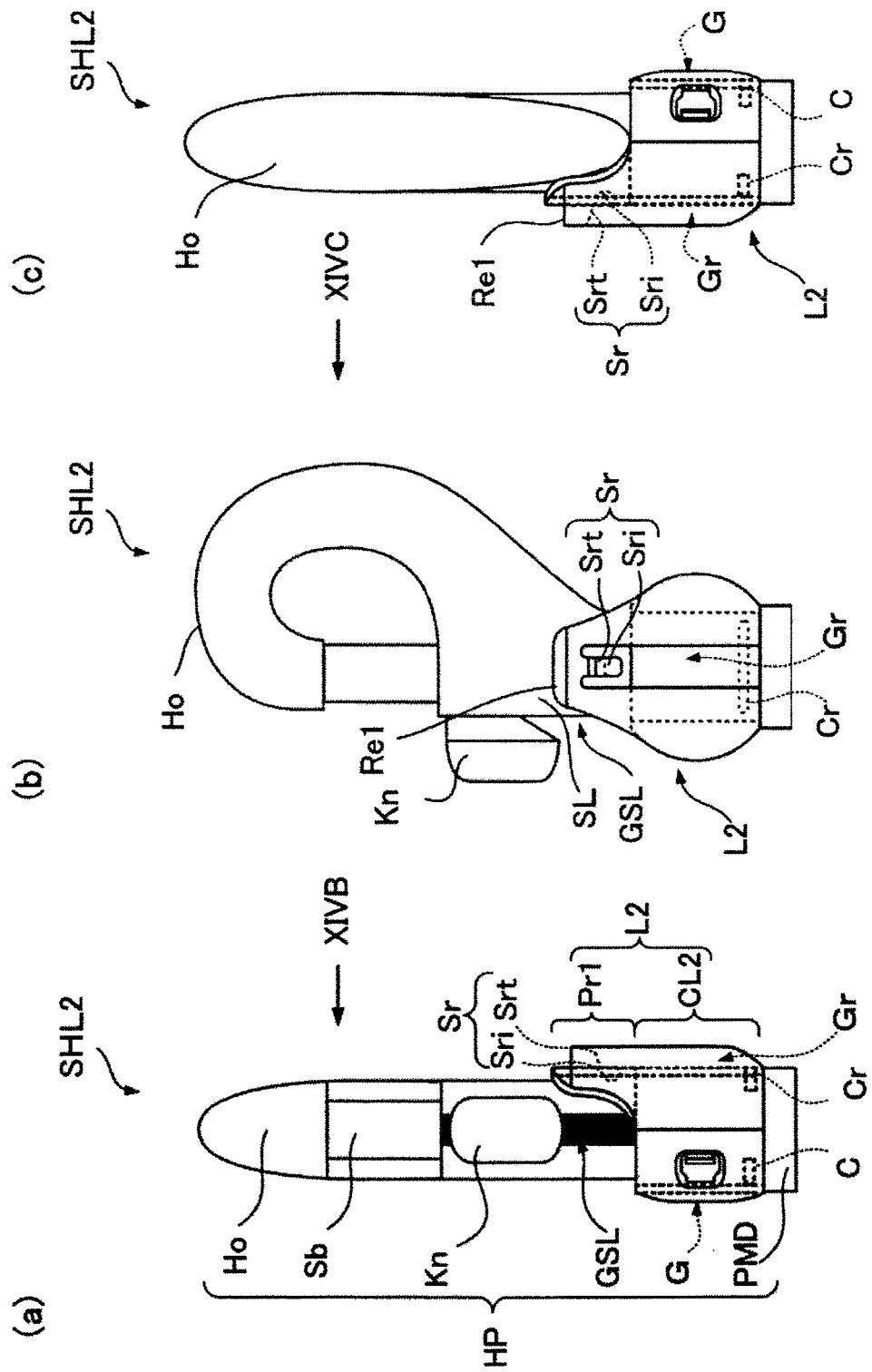
FIG. 14 is a diagram showing the connector in state in which the operation member is unlocked by the lock member shown in FIG. 10, looked at various angles.

With reference to FIG. 10, FIG. 11, FIG. 12, FIG. 13, and FIG. 14, a connector for animal according to a second embodiment of the present invention is described below. A connector SHL2 (FIG. 13, FIG. 14) has a construction similar to that of the connector SHL1 (FIG. 1) except that the lock member L1 (FIG. 1) is replaced with a lock member L2. The lock member L2 has a construction similar to that of the lock member L1 (FIG. 3) except that the cylindrical member CL1 (FIG. 3) is replaced with a cylindrical member CL2. Similarly, the half-shell Sh1r and the half-shell Sh1 (FIG. 3) are also replaced with a half-shell Sh2r and a half-shell Sh2, respectively. Herebelow, described with reference to FIG. 10 to FIG. 12 are constructions of the half-shell Sh2r and the half-shell Sh2 which are components of the lock member L2. Thenafter, described with reference to FIG. 13 to FIG. 14 is position of the lock member L2 in the connector SHL.

As shown in FIG. 10(a) and FIG. 10(b), the half-shell Sh2r and the half-shell Sh2 have constructions similar to those of the half-shell Sh1r and the half-shell Sh1 (FIG. 3, FIG. 4) except that provided in the region Sgr and the region Sg are cushion members Cr and C having a zonal shape instead of the bit-shaped projection Lcr (FIG. 4) and the projection Lc (FIG. 3).

As discernible from the same figure, the cushion member Cr is provided in the region Sgr at about the center with respect to the stem direction Ds and circumferential direction thereof, extending therefrom toward the end faces Ser and Ser in the circumferential direction by a predetermined length. In a similar manner, the cushion member C is provided in the region Sg at about a center thereof with respect to the stem direction Ds and circumferential direction, extending therefrom toward the end faces Se and Se in the circumferential direction by a predetermined length.

That is, the cushion members Cr and C partially extend along the rotation direction Dr at the regions Sgr and Sg.

The cushion members Cr and C, in the state in which the half-shell Sh2r and the half-shell Sh2 as the lock member L2 are installed on the stem portion SL, are pressed against the outer circumference of the stem portion SL to be deformed elastically, suppressing the play of the lock member L2 arising from a gap between the inner surface of the cylindrical member CL2 and the outer circumference of the stem portion SL. According to the present embodiment, the cushion members Cr and C are made of rubber and are adhered to the region Sgr or the region Sg.

With reference to FIG. 11, further described is the half-shell Sh2. FIG. 11(a) shows the half-shell Sh2 looked from above; FIG. 11(b) shows the half-shell Sh2 looked from the inside; FIG. 11(c) shows the half-shell Sh2 looked from the bottom; FIG. 11(d) shows the half-shell Sh2 looked from the outside; and FIG. 11(e) shows the half-shell Sh2 looked from the side.

As discernible from FIG. 11(a), FIG. 11(c), and FIG. 11(d), the cushion member C extends from the center of the bottom surface Gb (FIG. 10) of the groove G to the right and the left over the side faces Gs (FIG. 10) by about two-thirds of the length of the region Sg in the rotation direction Dr. The cushion member C contacts with the outer circumference of the stem portion SL at greater area compared with the projection Lc (FIG. 3), enabling the lock member L2 to rotate smoother and to bias the bit Sri to the stem portion SL evenly. The length of the cushion member C is appropriately determined in the point of view of reducing the play of the lock member L2 installed on the stem portion SL and of smooth rotation. That is, the length of the cushion member C can be less than two-thirds of the length of the region Sg in the rotation direction Dr or the same length at the maximum.

With reference to FIG. 12, the half-shell Sh2r is further described. FIG. 12(a) shows the half-shell Sh2r looked from above; FIG. 12(b) shows the half-shell Sh2r looked from the inside; FIG. 12(c) shows the half-shell Sh2r looked from the bottom; FIG. 12(d) shows the half-shell Sh2r looked from the outside; and FIG. 12(e) shows the half-shell Sh2r looked from the side.

As discernible from FIG. 12(c) and FIG. 12(d), the cushion member Cr extends from the center of the region Sgr to the right and the left by about two thirds of the length in the rotation direction Dr. Resultantly, the cushion member Cr contacts with the outer circumference of the stem portion SL at greater area compared with the projection Lcr (FIG. 4), enabling the lock member L2 to rotate smoother and to bias the bit Sri to the stem portion SL evenly. The length of the cushion member Cr is appropriately determined in the point of view of reducing the play of the lock member L2 installed on the stem portion SL and of smooth rotation. That is, the length of the cushion member Cr can be less than two thirds of the length of the region Sgr in the rotation direction Dr or the same length at the maximum.

It is to be noted that according to the present embodiment, the cushion member Cr extends from the center of the bottom face Gbr of the groove Gr to the left and the right over the side faces Gsr (FIG. 10). Thus, the cushion member Cr can stand forces much more between the region Sgr and the stem portion SL when the lock member L2 is rotated, enabling effective reduction of the play and smooth rotation.

As discernible from FIG. 11 and FIG. 12, the cushion members Cr and C are provided on positions symmetrically with respect to the rotation axis Ar (central axis Ac) of the lock member L2. The cushion members Cr and C extend by two thirds of the length of rotation guide means MG in the rotation direction Dr.

Next, shown in FIG. 13 and FIG. 14 are the connector SHL2 in the states in which the lock member L2 locks the operating member Kn (lock state) and the lock member L2 unlocks the operating member Kn (unlock state), respectively.

Specifically, FIG. 13(a) shows the connector SHL2 in the lock state, looked from the side of the operating member Kn; FIG. 13(b) shows the connector SHL2 looked in the arrow direction XIIIB in FIG. 13(a); and FIG. 13(c) shows the connector SHL2 looked in the arrow direction XIIIC in FIG. 13(b). From FIG. 13(a) to FIG. 13(c), discernible are the states in which the cushion members Cr and C of the lock member L2 contact with the surface of the stem portion SL, respectively.

FIG. 14(a) shows the connector SHL2 in the unlock state, looked from the side of the operating member Kn; FIG. 14(b) shows the connector SHL2 looked in the arrow direction XIVB in FIG. 14(a); FIG. 14(c) shows the connector SHL2 looked in the arrow direction XIVC in FIG. 14(b). From FIG. 14(a) to FIG. 14(c), discernible are the states in which the cushion members Cr and C of the lock member L2 contact with the surface of the stem portion SL, respectively.

Third Embodiment

Figure 16:
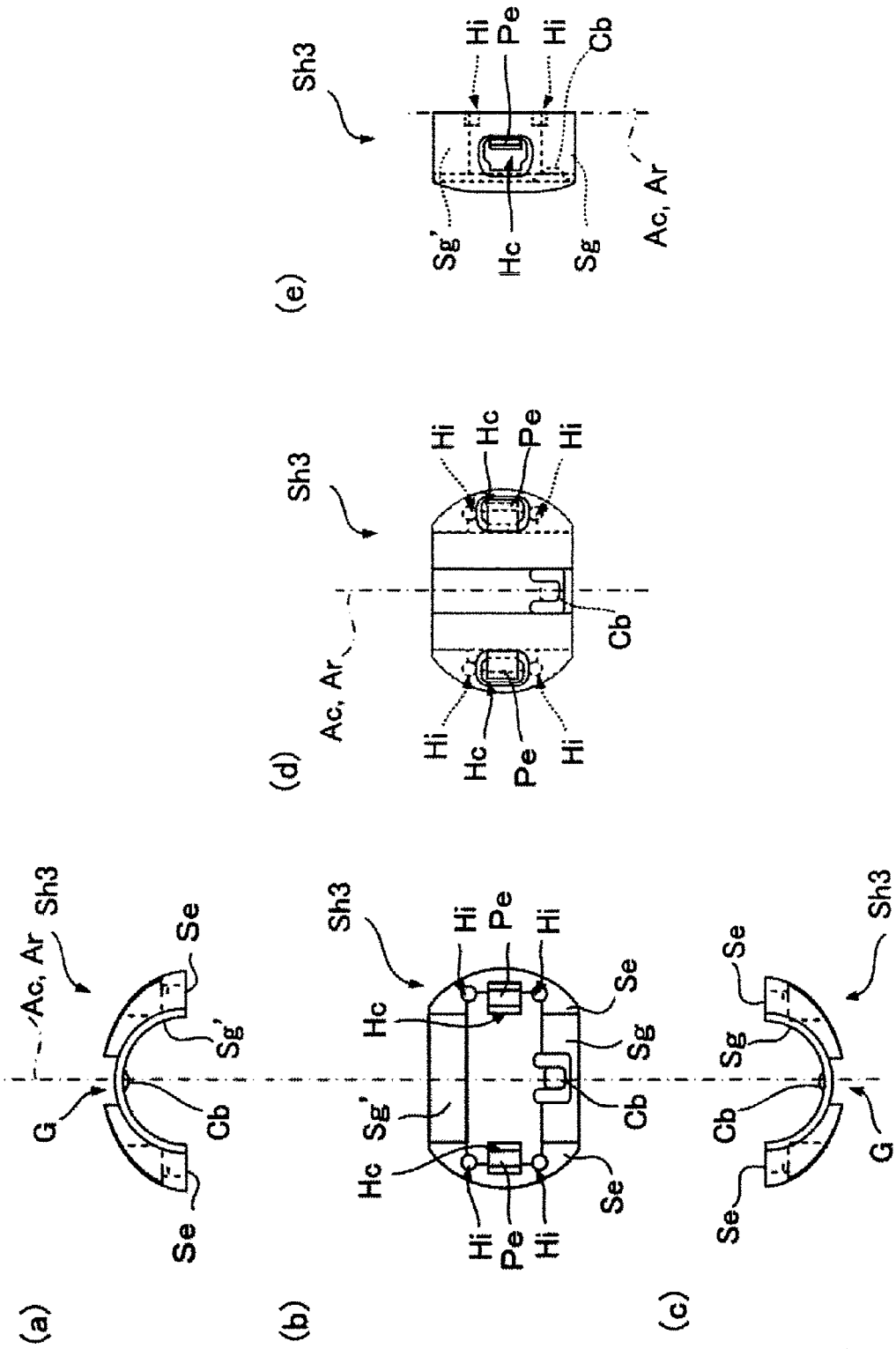
FIG. 16 is a diagram showing a half-shell which is a component the lock member shown in FIG. 15, looked at various angles.
Figure 17:
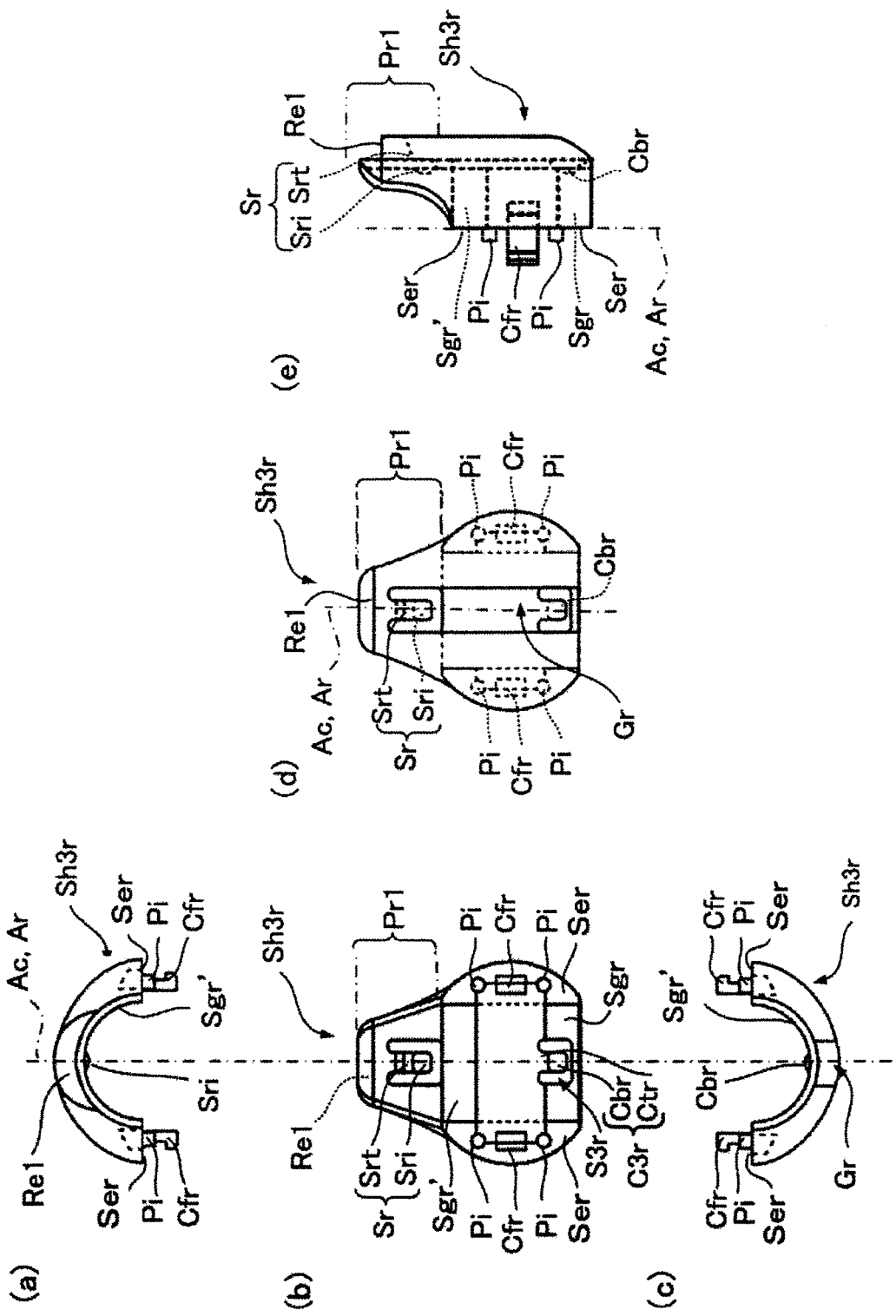
FIG. 17 is a diagram showing a half-shell which is a component of the lock member shown in FIG. 15 and has a projection continuously formed therein, looked at various angles.
Figure 18:
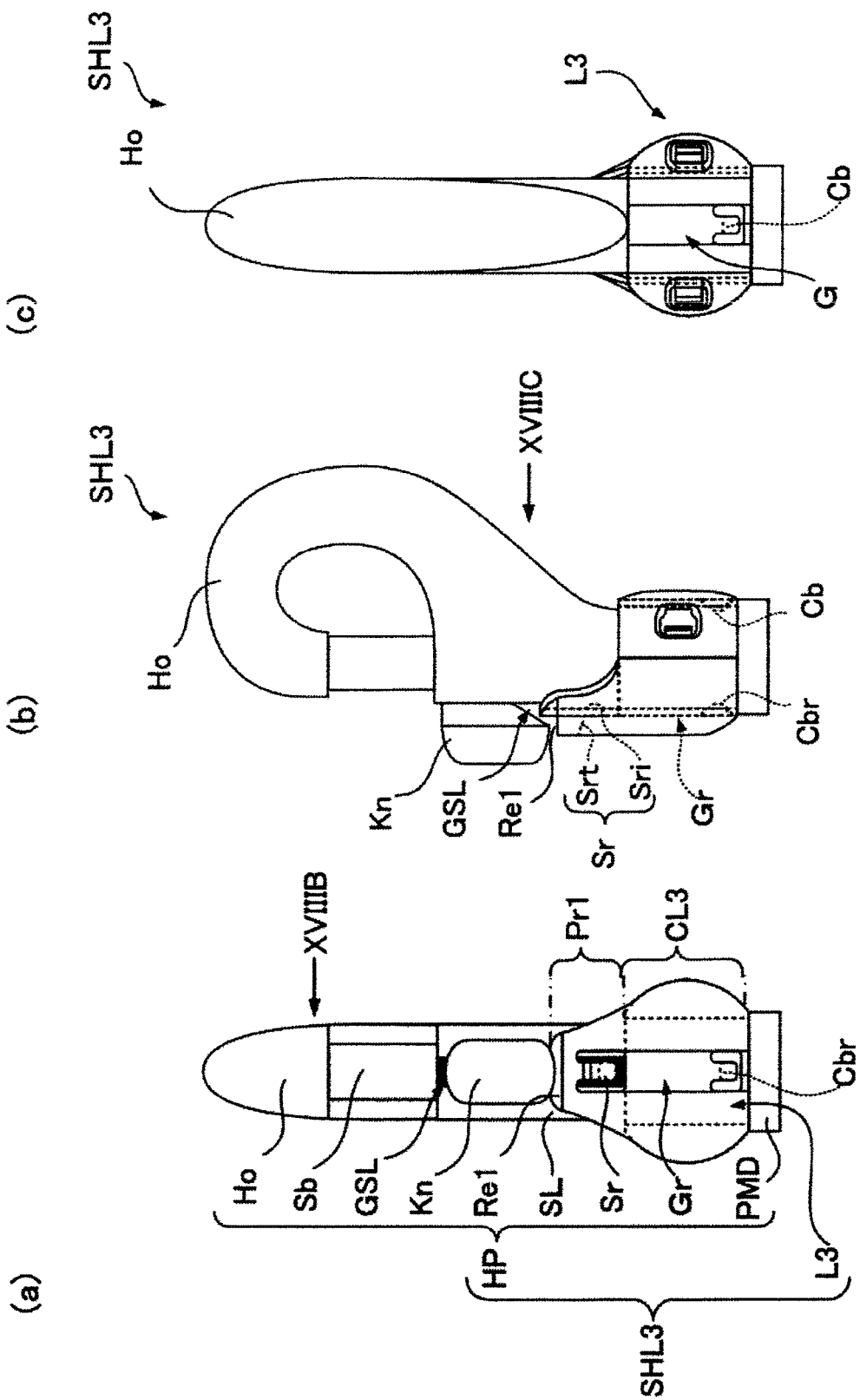
FIG. 18 is a diagram showing the connector in a state in which the operation member is locked by the lock member shown in FIG. 15, looked at various angles.
Figure 19:
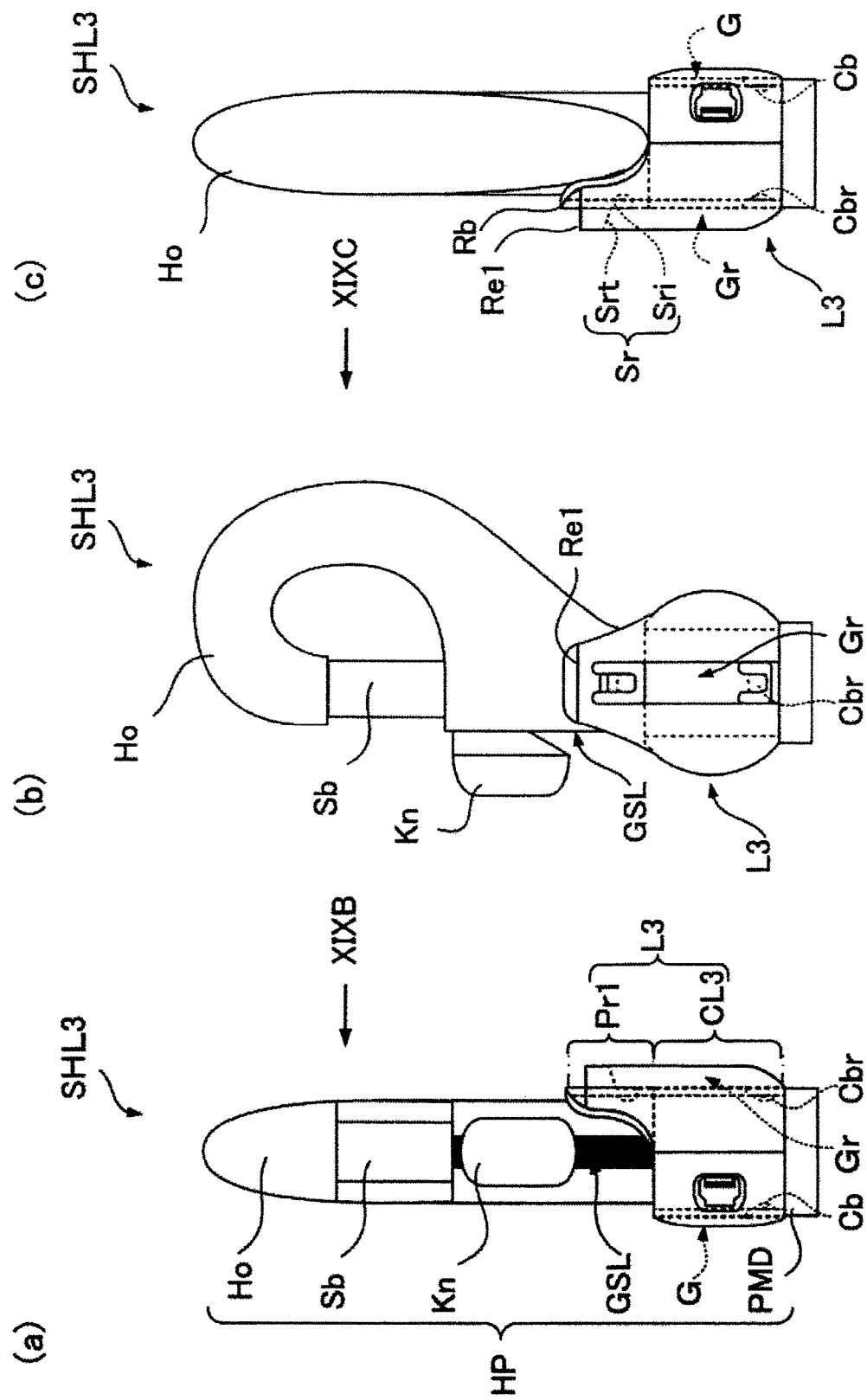
FIG. 19 is a diagram showing the connector in state in which the operation member is unlocked by the lock member shown in FIG. 15, looked at various angles.

With reference to FIG. 15, FIG. 16, FIG. 17, FIG. 18, and FIG. 19, a connector for animal according to a third embodiment of the present invention is described below. A connector SHL3 (FIG. 18, FIG. 19) has a construction similar to that of the connector SHL1 (FIG. 1) except that the lock member L1 (FIG. 1) is replaced with a lock member L3. The lock member L3 has a construction similar to that of the lock member L1 (FIG. 3) except that the cylindrical member CL1 (FIG. 3) is replaced with a cylindrical member CL3. Similarly, the half-shell Sh1r and the half-shell Sh1 (FIG. 3) are also replaced with a half-shell Sh3r and a half-shell Sh3, respectively. Herebelow, described with reference to FIG. 15 to FIG. 17 are constructions of the half-shell Sh3r and the half-shell Sh3 which are components of the lock member L3. Thenafter, described with reference to FIG. 18 to FIG. 19 is position of the lock member L3 in the connector SHL3.

As shown in FIG. 15(a) and FIG. 15(b), the half-shell Sh3r and the half-shell Sh3 have constructions similar to those of the half-shell Sh1r and the half-shell Sh1 (FIG. 3, FIG. 4) except that provided in the region Sgr and the region Sg are cushion means C3r and C3 having rectangular-shaped cushion bits Cbr and Cb instead of the projection Lcr (FIG. 4) and the projection Lc (FIG. 3).

As discernible from the same figure, the cushion means C3r includes a tab Ctr and the cushion bit Cbr. The tab Ctr is defined by a slit S3r of a U-like shape formed in the bottom face Gbr of the groove Gr of the half-shell Sh3r. The tab Ctr has a fixed end which is upper end portion thereof integrally connected to the bottom face Gbr (half-shell Sh3r) and a free end which is other portion than the fixed end portion separated from the half-shell Sh3r. The fixed end of the tab Ctr is connected to the bottom face Gbr thinner compared with the upper end portion of the projection Pr1 differently from the fixed end of the tab Srt. However, the fixed end of the tab Ctr is held with enough strength by the large middle portion of the bottom face Gbr even when elastically deformed due to being connected not to the lower end of the bottom face Gbr but to the middle/upper portion.

The cushion bit Cbr extrudes from the lower end portion of the inner surface of the tab Ctr in the centripetal direction.

Similarly, the cushion means C3 includes a tab Ct and the cushion bit Cb. The tab Ct is defined by a slit S3 of a U-like shape formed in the bottom face Gb of the groove G of the half-shell Sh3. The tab Ct has an upper end portion integrally connected to the bottom face Gb (half-shell Sh3) and the other portion is separated from the half-shell Sh3. The cushion bit Cb extrudes from the lower end portion of the inner surface of the tab Ct in the centripetal direction.

The cushion bits Cbr and Cb, in the state in which the half-shell Sh3r and the half-shell Sh3 as the lock member L3 are installed on the stem portion SL, suppress the play of the lock member L3 arising from a gap between the inner surface of the cylindrical member CL3 and the outer circumference of the stem portion SL, as the projection Lcr (FIG. 4) and the projection Lc (FIG. 3) do. The projection Lcr and Lc are pressed against the outer circumference of the stem portion SL to be deformed elastically, suppressing the play of the lock member L1. That is, the play suppressing ability depends on the volume of the projections Lcr and Lc whose shape are variable in the gap between the stem portion SL and the region Sgr or the region Sg. This also applies to the cushion member Cr and the cushion member C according to the above described second embodiment.

Specifically, the cushion bits Cbr and Cb extrude from the lower end portion of the inner surface of the tab Ctr and the tab Ct in the centripetal direction, respectively. Due to this extrusion, the cushion bits Cbr and Cb when installed on the stem portion SL are pressed outward by the outer surface of the stem portion SL, causing the tabs Ctr and Ct to become deformed, a centripetal force, and the cushion bits Cbr and Cb to be biased toward the center of the stem portion SL. The cushion bits Cbr and Cb, being biased toward the center of stem portion SL, contact with the outer circumference of the stem portion SL stronger. The tabs Ctr and Ct become deformed free from being limited by the gap between the stem portion SL and the region Sgr or the region Sg and can suppress the play of the lock member L3 more flexibly. The shape and size of cushion bits Cbr and Cb are appropriately determined from the view point of the play reduction and smooth rotation of the lock member L3 being installed on the stem portion SL.

With reference to FIG. 16, the half-shell Sh3 is further described. FIG. 16(a) shows the half-shell Sh3 looked from above; FIG. 16(b) shows the half-shell Sh3 looked from the inside; FIG. 16(c) shows the half-shell Sh3 looked from the bottom; FIG. 16(d) shows the half-shell Sh3 looked from the outside; and FIG. 16(e) shows the half-shell Sh3 looked from the side.

As discernible from FIG. 16(a), FIG. 16(c), and FIG. 16(d), the cushion bit Cb is provided from the center of the bottom face Gb (FIG. 15) to the right and left in a predetermined shape and size. The cushion bit Cb contacts with the outer circumference of the stem portion SL at greater area compared with the projection Lc (FIG. 3), enabling the lock member L3 to rotate smoother and to bias the bit Sri (FIG. 15) to the stem portion SL evenly.

With reference to FIG. 17, the half-shell Sh3r is further described. FIG. 17(a) shows the half-shell Sh3r looked from above; FIG. 17(b) shows the half-shell Sh3r looked from the inside; FIG. 17(c) shows the half-shell Sh3r looked from the bottom; FIG. 17(d) shows the half-shell Sh3r looked from the outside; and FIG. 17(e) shows the half-shell Sh3r from the side.

As discernible from FIG. 17(c) and FIG. 17(d), the cushion bit Cbr is provided from the center of the bottom face Gbr (FIG. 15) of the groove Gr to the right and left in a predetermined shape and size. The cushion bit Cbr contacts with the outer circumference of the stem portion SL at greater area compared with the projection Lcr (FIG. 4), enabling the lock member L3 to rotate smoother and to bias the bit Sri (FIG. 15) to the stem portion SL evenly. As further discernible from FIG. 16 and FIG. 17, the cushion bits Cbr and Cb are provided on positions symmetrically with respect to the rotation axis Ar (central axis Ac) of the lock member L3.

Shown in FIG. 18 and FIG. 19 are the connector SHL3 in the state in which the operating member Kn is locked by the lock member L3 (lock state) and the state in which the operating member Kn is unlocked by the lock member L3 (unlock state), respectively. More specifically, FIG. 18(a) shows the connector SHL3 in the lock state looked from the side of the operating member Kn; FIG. 18(b) shows the connector SHL3 looked in the arrow direction XVIIIB in FIG. 18(a); and FIG. 18(c) shows the connector SHL3 looked in the direction XVIIIC in FIG. 18(b). From FIG. 18(a) to FIG. 18(c), discernible are the states in which the cushion bits Cbr and Cb of the lock member L3 contact with the surface of the stem portion SL, respectively.

FIG. 19(a) shows the connector SHL3 in the unlock state looked from the side of the operating member Kn; FIG. 19(b) shows the connector SHL3 in the arrow direction XIXB in FIG. 19(a); and FIG. 19(c) shows the arrow direction XIXC in FIG. 19(b). From FIG. 19(a) to FIG. 19(c), discernible are the states in which the cushion bits Cbr and Cb of the lock member L3 contact with the surface of the stem portion SL, respectively.

Fourth Embodiment

With reference to FIG. 20, FIG. 21, FIG. 22, FIG. 23, FIG. 24, and FIG. 25, a connector for animal according to a fourth embodiment of the present invention is described below. A connector SHL4 has a construction similar to that of the connector SHL1 (FIG. 1) except that the lock member L1 (FIG. 1) is replaced with a lock member L4. FIG. 20(a) and FIG. 20(b) show the connector SHL4 in the states in which the operation member Kn is locked by the lock member L4 (lock state) and the operating member Kn is unlocked by the lock member L4 (unlock state), respectively.

With the lock member L4, like the above described lock member L1 (first embodiment), the lock member L2 (second embodiment), and the lock member L3 (third embodiment), the movement (backward) of slide bar Sb is inhibited such that a portion (projection) of the lock member contacts with the operating member Kn, and the slide bar Sb becomes lock state or unlock state by rotating the lock member around the stem portion SL. The lock member L4 is constructed such that the projection Pr1 and the cylindrical member CL1 (FIG. 3) is replaced with a projection Pr4 and a cylindrical member CL4, respectively, in the above described lock member L1 (FIG. 3). Similarly, the half-shell Sh1r and the half-shell Sh1 (FIG. 3) are replaced with a hall-shell Sh4r and a half-shell Sh4, respectively.

In simple, the projection Pr4 is constructed such that the seat portion Re1 is removed from the above described projection Pr1 to leave the rear member (Rb) as well as that the rotation stopper Sr is replaced with a rotation stopper Sr4. In the upper end portion of the projection Pr4 is provided with a seat portion Re4 corresponding to the seat portion Re1. The rotation stopper Sr4 has a tab Sr4t defined by a slit S4 in inverted U-character like shape near the upper end portion (the seat portion Re4) of the projection Pr4. The lower end portion of the tab Sr4t is a fixed end connected to the middle portion of the projection Pr4, and the other portion is a free end cut away from the projection Pr4. The fixed end of the tab Sr4t is held with enough strength due to being connected to the middle portion of the projection Pr4 connected to the cylindrical member CL4 even when elastically deformed. The seat portion Re4 will be described later with reference to FIG. 23 and FIG. 24.

Figure 22:
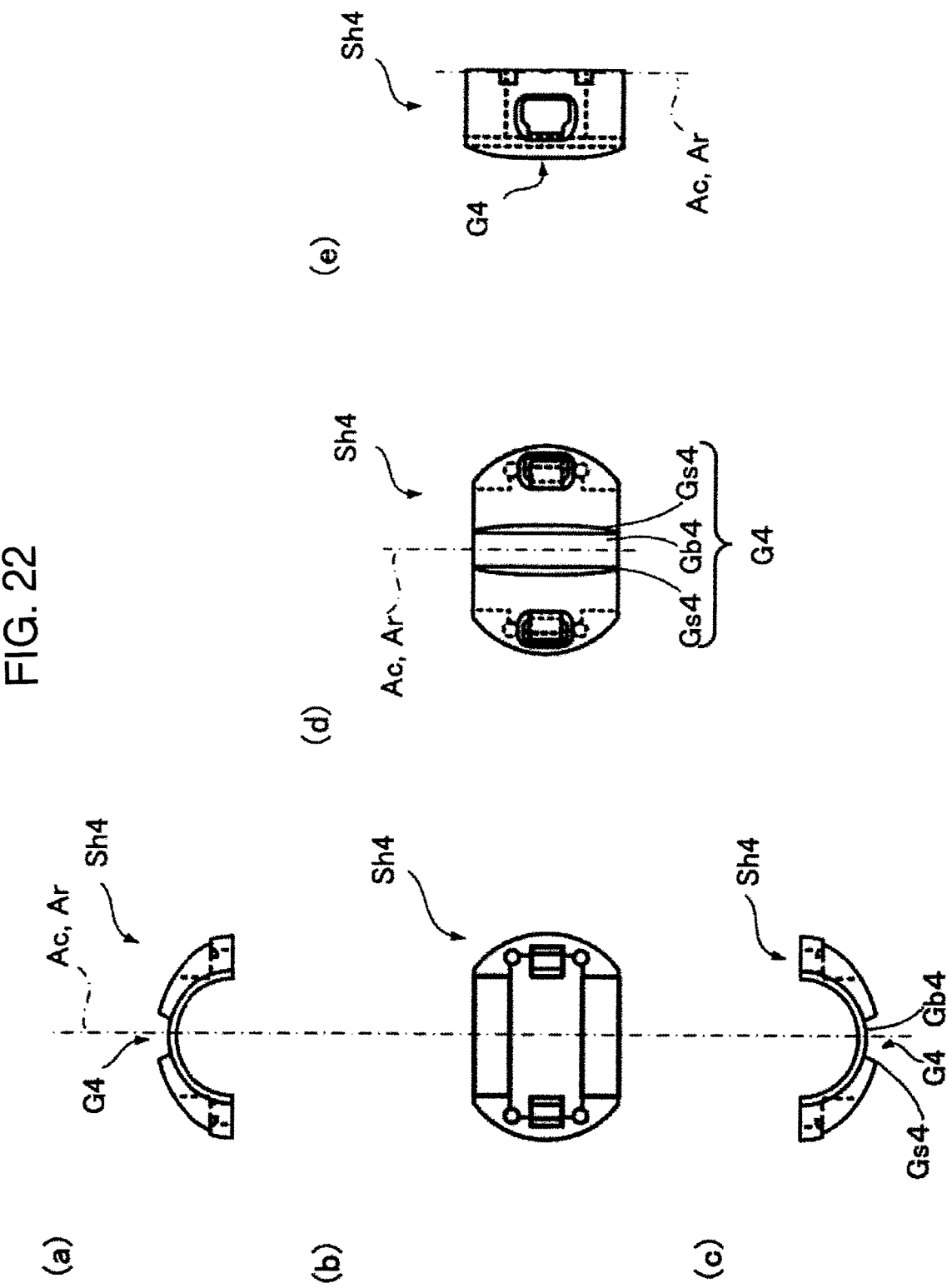
FIG. 22 is a diagram showing a half-shell which is a component of the lock member shown in FIG. 20 looked at various angles.
Figure 23:
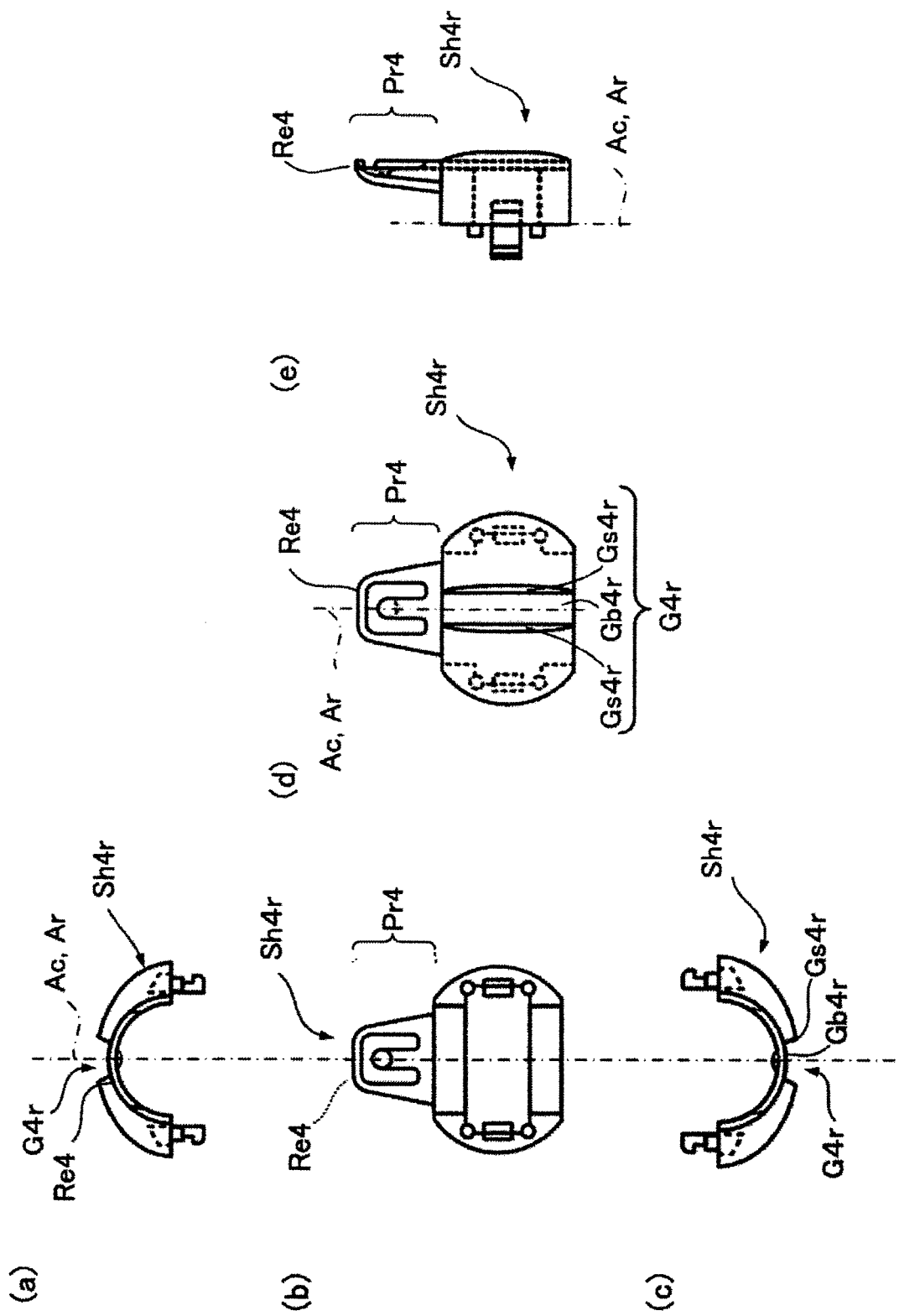
FIG. 23 is a diagram showing a half-shell which is a component of the lock member shown in FIG. 20 and has a projection continuously formed therein, looked at various angles.

With reference to FIG. 21 to FIG. 23, described below are construction of the half-shell Sh4r and the half-shell Sh4 which are components of the lock member L4. Thenafter, with reference to FIG. 24 to FIG. 25, the connector SHL4 in the lock state and in the unlock state are described.

As discernible from FIG. 21, the half-shell Sh4 is provided with a groove G4 defined by a bottom surface Gb4 and a pair of side faces Gs4 opposing to each other formed in the outer surface thereof. In the outer surface of the half-shell Sh4r, formed is a groove G4r defined by a bottom face Gb4r and a pair of side faces Gs4r opposing to each other.

In the projection Pr4 of the half-shell Sh4r, the rotation stopper Sr4 having the tab Sr4t defined by the slit S4 in inverted U-character like shape formed between the seat portion Re4 and the bottom face Gb4r of the groove G4r. The lower end portion of the tab Sr4t is integrally connected with the projection Pr4, and the other portion is cut away from the projection Pr4. A bit Sr4i is protruding from the upper end portion of the inner surface of the tab Sr4t in a centripetal direction. The bit Sr4i is biased toward the center of the stem portion SL when the lock member L4 is installed on the stem portion SL, as the above bit Sri (FIG. 4) is. When the lock member L4 reaches the lock position, the bit Sr4i is fit in the groove GSL by the biasing force, resulting that the lock member L4 is located on the lock position with respect to the operating member Kn.

With reference to FIG. 22, the half-shell Sh4 is further described. FIG. 22(a) shows the half-shell Sh4 looked from above; FIG. 22(b) shows the half-shell Sh4 looked from the inside; FIG. 22(c) shows the half-shell Sh4 looked from the bottom; FIG. 22(d) shows the half-shell Sh4 looked from the outside; and FIG. 22(e) shows the half-shell Sh4 looked from the side.

As discernible from FIG. 22(a) and FIG. 22(c), the groove G4 is formed to have the side faces Gs4 and Gs4 whose interval becomes greater from the bottom face Gb4 toward the outer peripheral face of the half-shell Sh4. Thus, even if something will contact with the side face of the lock member L4, such contact is easily removed, reducing the possibility of incidental rotation of the lock member L4. More specifically, since the contact angle with respect to the side face Gs4, looked from the bottom face Gb4, is apt to be acute, the force to make the lock member L4 rotate becomes not big enough to make the bit Sr4i to remove from the groove GSL. Therefore, the object in contact with the groove G4 easily moves in a centrifugal direction on the surface of the side face Gs4. Since the user adjust the contact angle of the pad of his/her finger with respect to the side face Gs4 as well as contact areas of finger pad with the bottom face Gb4 and the side face Gs4 of the groove G4 are greater than the object in contact, the lock member L4 can be rotated easily.

With reference to FIG. 23, the half-shell Sh4r is described further. FIG. 23(a) shows the half-shell Sh4r looked from above; FIG. 23(b) shows the half-shell Sh4r looked from the inside; FIG. 23(c) shows the half-shell Sh4r looked from the bottom; FIG. 23(d) shows the half-shell Sh4r looked from the outside; and FIG. 23E shows the half-shell Sh4r looked from the side.

As discernible from FIG. 23(a) and FIG. 23(c), the groove G4r is provided to have the side faces Gs4r and Gs4r such that the distance therebetween becomes larger in a direction from the bottom face Gb4r toward the outer peripheral face of the half-shell Sh4r. As discernible from FIG. 23(e), the upper end portion of the projection Pr4 which is a component of the seat portion Re4 is bent in a direction separating from the outer peripheral face of the stem portion SL when installed on the stem portion SL together with the half-shell Sh4.

Figure 24:
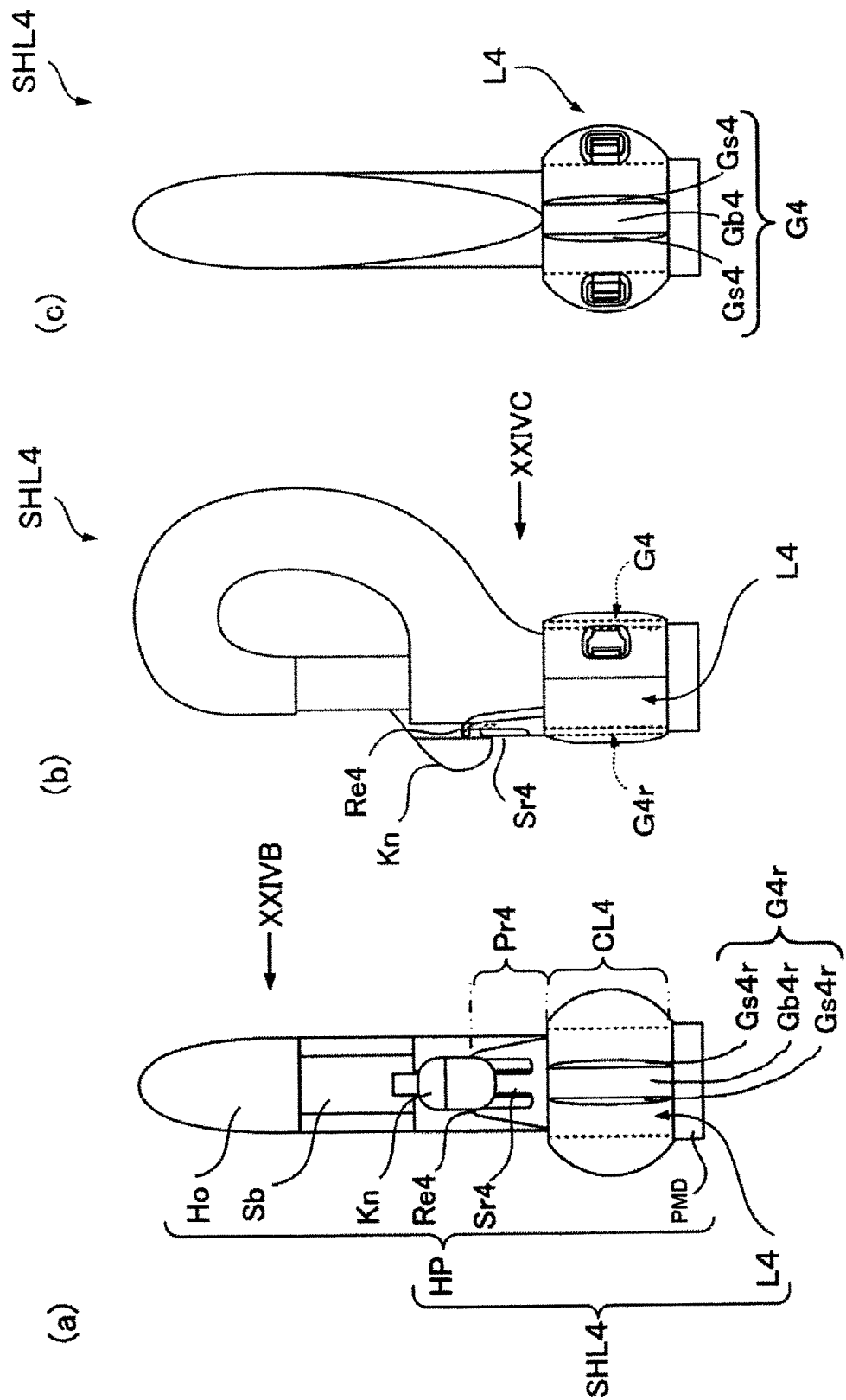
FIG. 24 is a diagram showing the connector shown in FIG. 20(a) looked at various angles.
Figure 25:
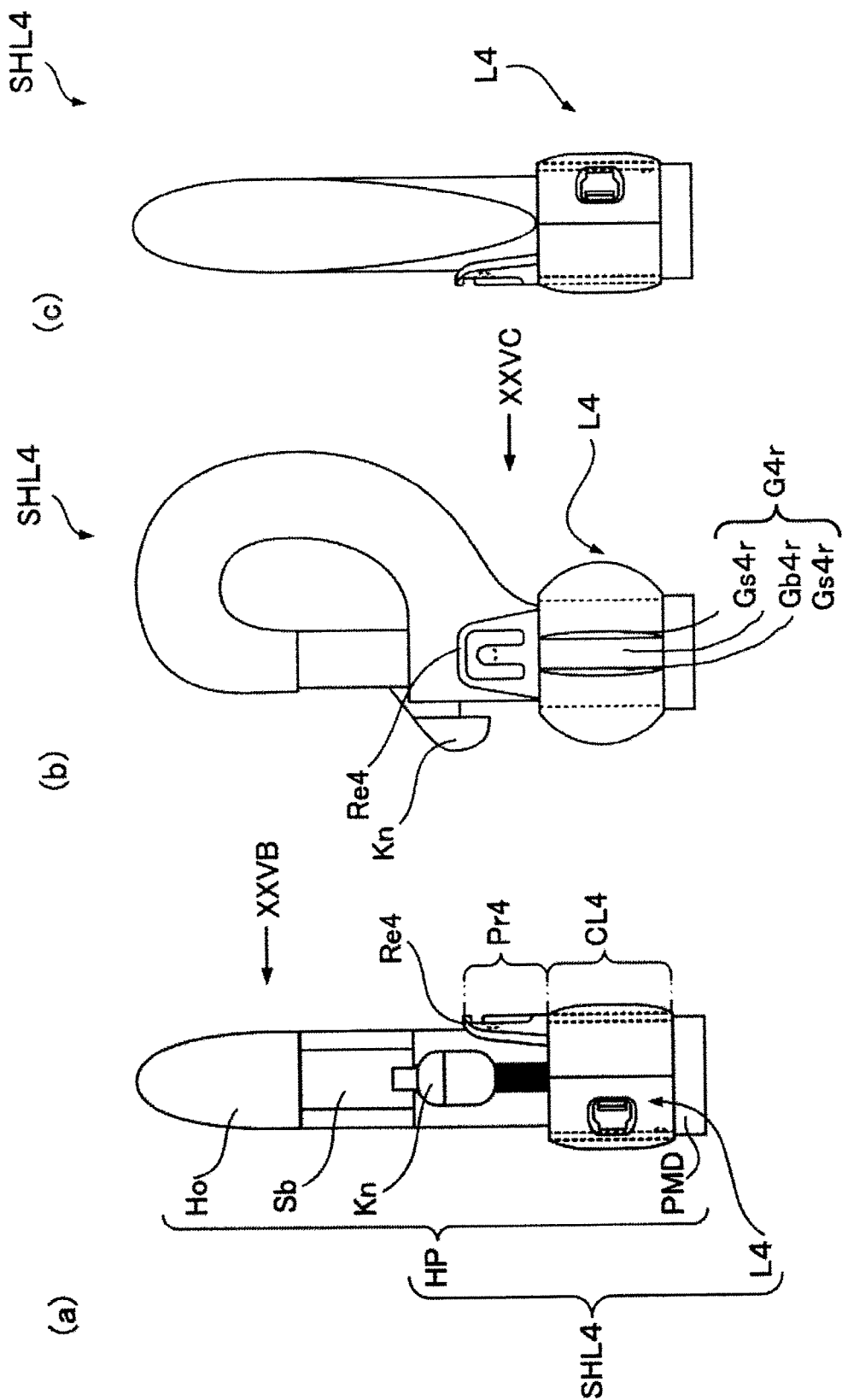
FIG. 25 is a diagram showing the connector shown in FIG. 20(b) looked at various angles.

In FIG. 24 and FIG. 25, shown are the connector SHL4 in the lock state and the unlock state, respectively. More specifically, FIG. 24(a) shows the connector SHL4 in the lock state looked from the side of the operating member Kn; FIG. 24(b) shows the connector SHL4 looked in the arrow direction XXIVB in FIG. 24(a); and FIG. 24(c) show the connector SHL4 looked in the arrow direction XXIVC in FIG. 24(b). From FIG. 24(b), discernible is that the joint member Knb of the operating member Kn is in contact with the upper end portion of the projection Pr4 being bent in a direction separating from the outer peripheral face of the stem portion SL, or the seat portion Re4. That is, the projection Pr4 is located between the knob Kna and the stem portion SL so that the seat portion Re4 receives the joint member Knb with the upper face of bent portion and contact with the knob Kna with the apical end thereof. Thus, it is expected that contact with the joint member Knb prevents the projection Pr4 (seat portion Re4) from being deformed escaping in the centrifugal direction.

FIG. 25(a) shows the connector SHL4 in the unlock state looked from the side of the operating member Kn; FIG. 25(b) shows the connector SHL4 looked in the arrow direction XXVB in FIG. 25(a); and FIG. 25(c) shows the connector SHL4 looked in the arrow direction XXVC in FIG. 25(b).

Fifth Embodiment

Figure 26:
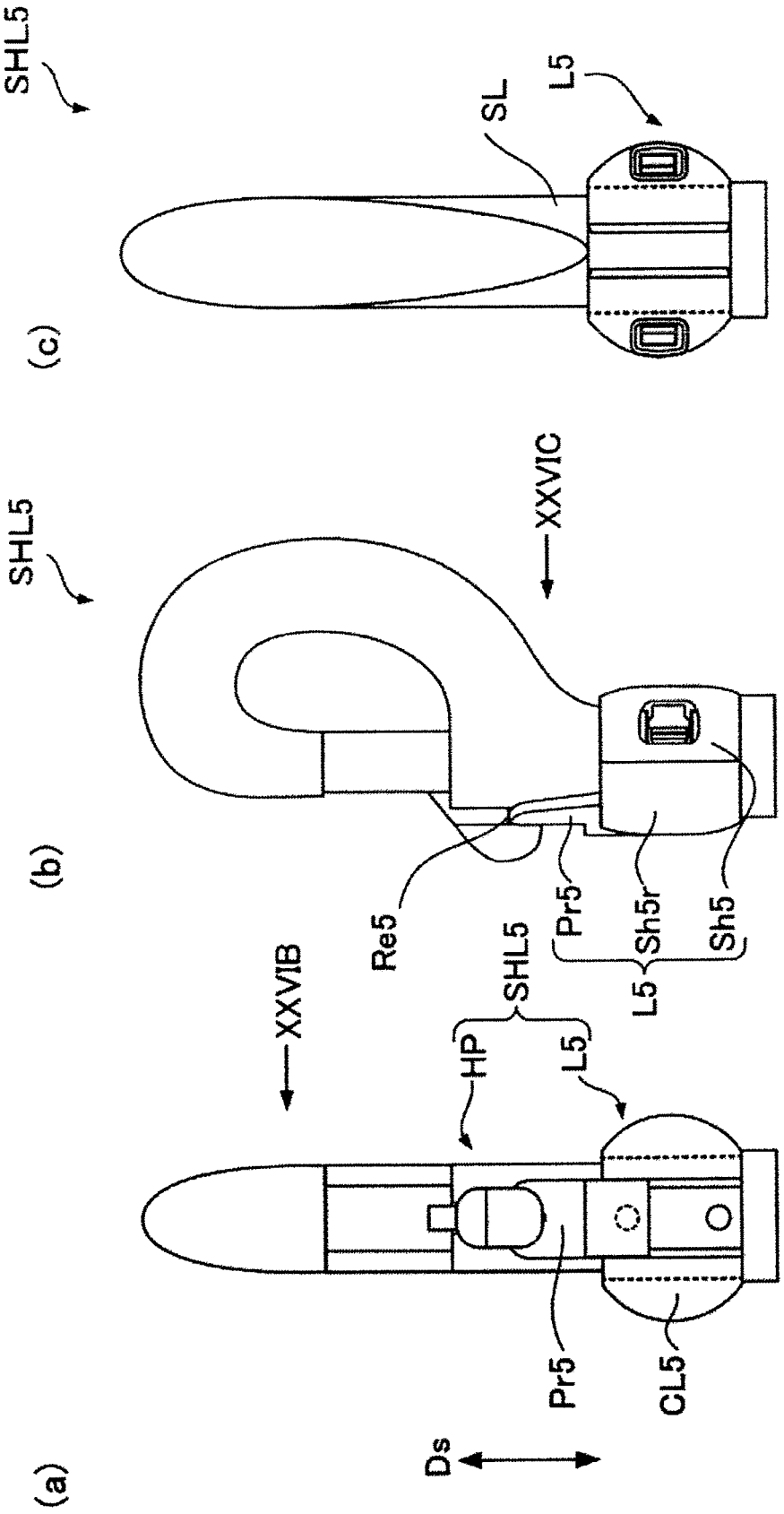
FIG. 26 is a diagram showing a connector for animal according to a fifth embodiment of the present invention, wherein an operation member is locked, looked at various angles.
Figure 27:
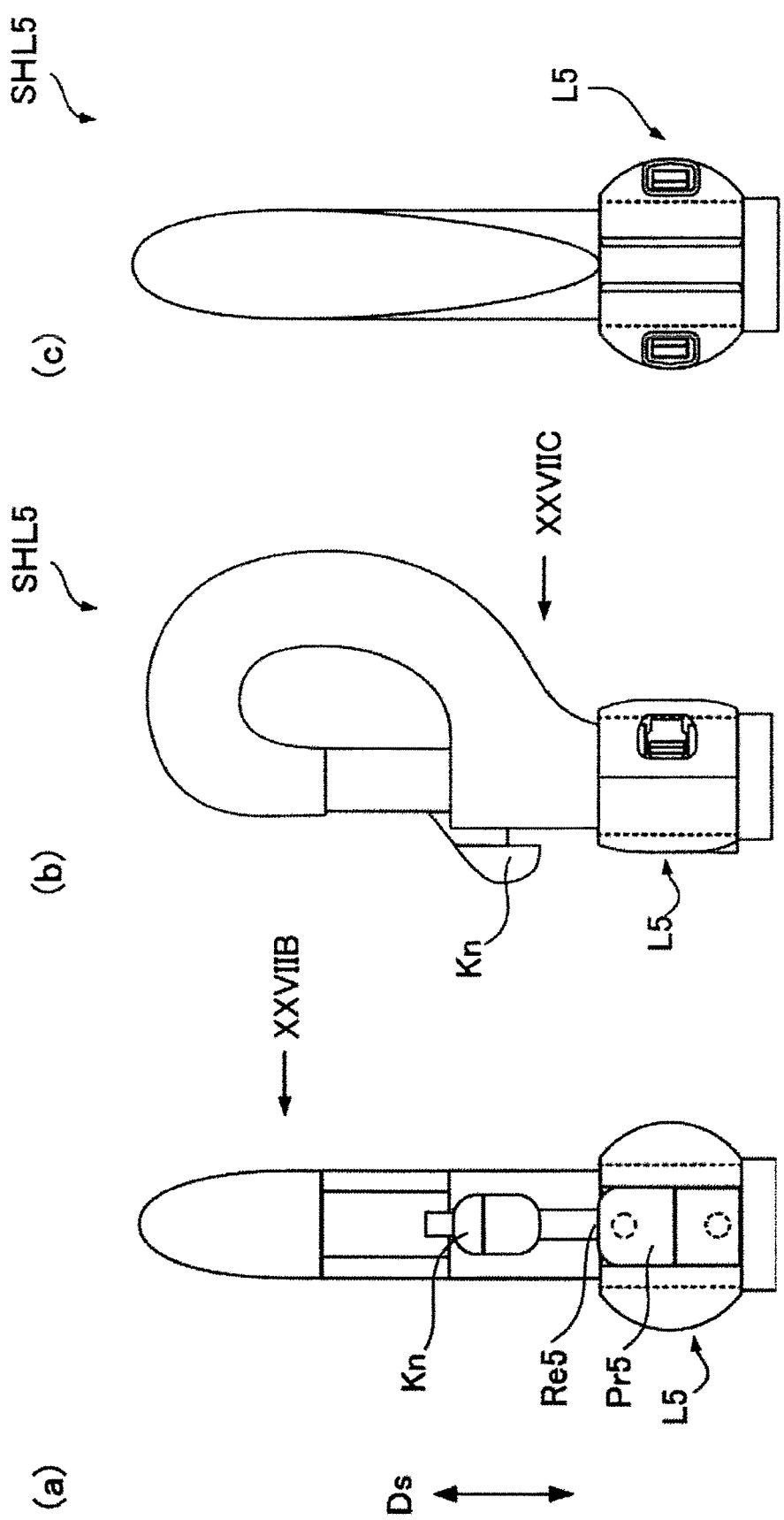
FIG. 27 is a diagram the connector according to the fifth embodiment of the present invention, wherein the operation member is unlocked, looked at various angles.

With reference to FIG. 26, FIG. 27, FIG. 28, and FIG. 29, a connector for animal according to a fifth embodiment of the present invention is described below. A connector SHL5 has a construction similar to that of the connector SHL4 (FIG. 20) except that the lock member L4 (FIG. 20) is replaced with a lock member L5. FIG. 26 shows the connector SHL5 in the state in which the operating member Kn is locked by the lock member L5 (lock state); and FIG. 27 shows the connector SHL5 in the state in which the operating member Kn is unlocked by the lock member L5 (unlock state).

Below described briefly is the feature of the lock member L5 in comparison with those of the lock member L1 (first embodiment), the lock member L2 (second embodiment), the lock member L3 (third embodiment), and the lock member L4 (fourth embodiment). The lock member L5 inhibits the slide bar Sb from moving (backward) by contacting a portion thereof with the operating member Kn as the lock members L1 to L4 do. Whereas each the lock members L1 to L4 shall be rotated around the stem portion SL in order to put the slide bar Sb in the lock state or the unlock state, the lock member L5 dose not need to be rotated around the stem portion SL in order to lock or unlock the slide bar Sb. As discernible from FIG. 26 and FIG. 27, locking or unlocking of the slide bar Sb by the lock member L5 is achieved such that a portion of the lock member L5 being in contact with operating member Kn (a projection Pr5 which will be described later) is moved (shifted with respect to a cylindrical member CL5 which will be descried later) along the stem direction Ds.

Figure 20:
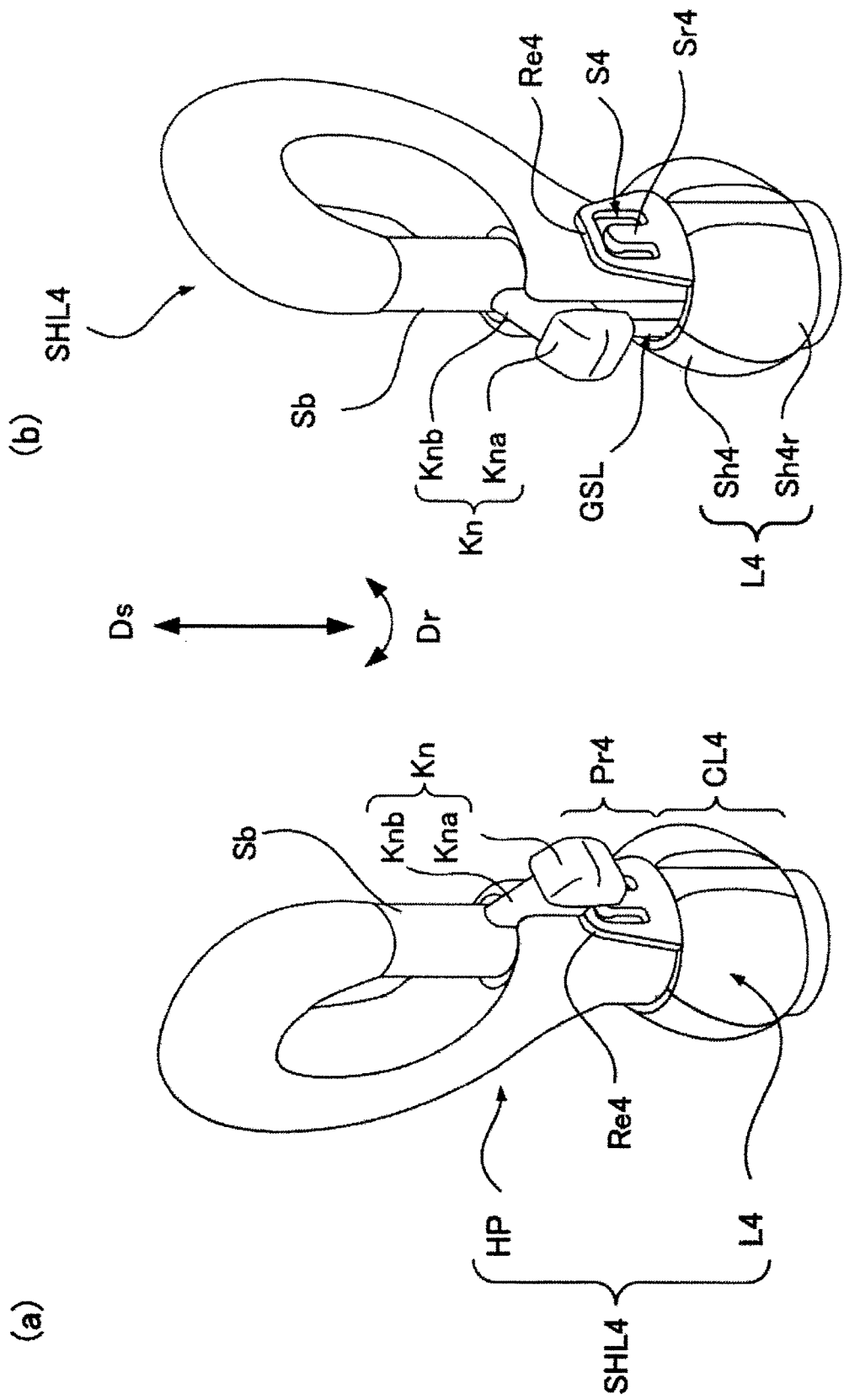
FIG. 20 is a perspective view showing a connector for animal according to a fourth embodiment of the present invention, wherein (a) shows a state in which an operation member is locked and (b) shows a state in which the operation member is unlocked.

The lock member L5 is constructed such that the projection Pr4 and the cylindrical member CL4 (FIG. 20) are replaced with the projection Pr5 and the cylindrical member CL5, respectively, in the above described lock member L4 (FIG. 20). Similarly, the half-shell Sh4r and the half-shell Sh4 (FIG. 20) are also replaced with a half-shell Sh5r and a half-shell Sh5. Note that in the above described lock member L4, the projection Pr4 is formed continuously to the cylindrical member CL4 as well as integrally with the half-shell Sh4r. The projection Pr5 is distinct from the cylindrical member CL5 and the half-shell Sh5r. The projection Pr5 is installed on the hall-shell Sh5r in a manner movable in the stem direction Ds.

The projection Pr5 is provided with a seat portion Re5 corresponding to the seat portion Re4 (FIG. 20) formed in the upper end portion. As discernible from FIG. 26(b), the projection Pr5 is located between the knob Kna and the stem portion SL so that the lower end portion of the joint member Knb of the operating member Kn contacts with the upper end portion of the projection Pr5 which is the seat portion Re5.

Figure 28:
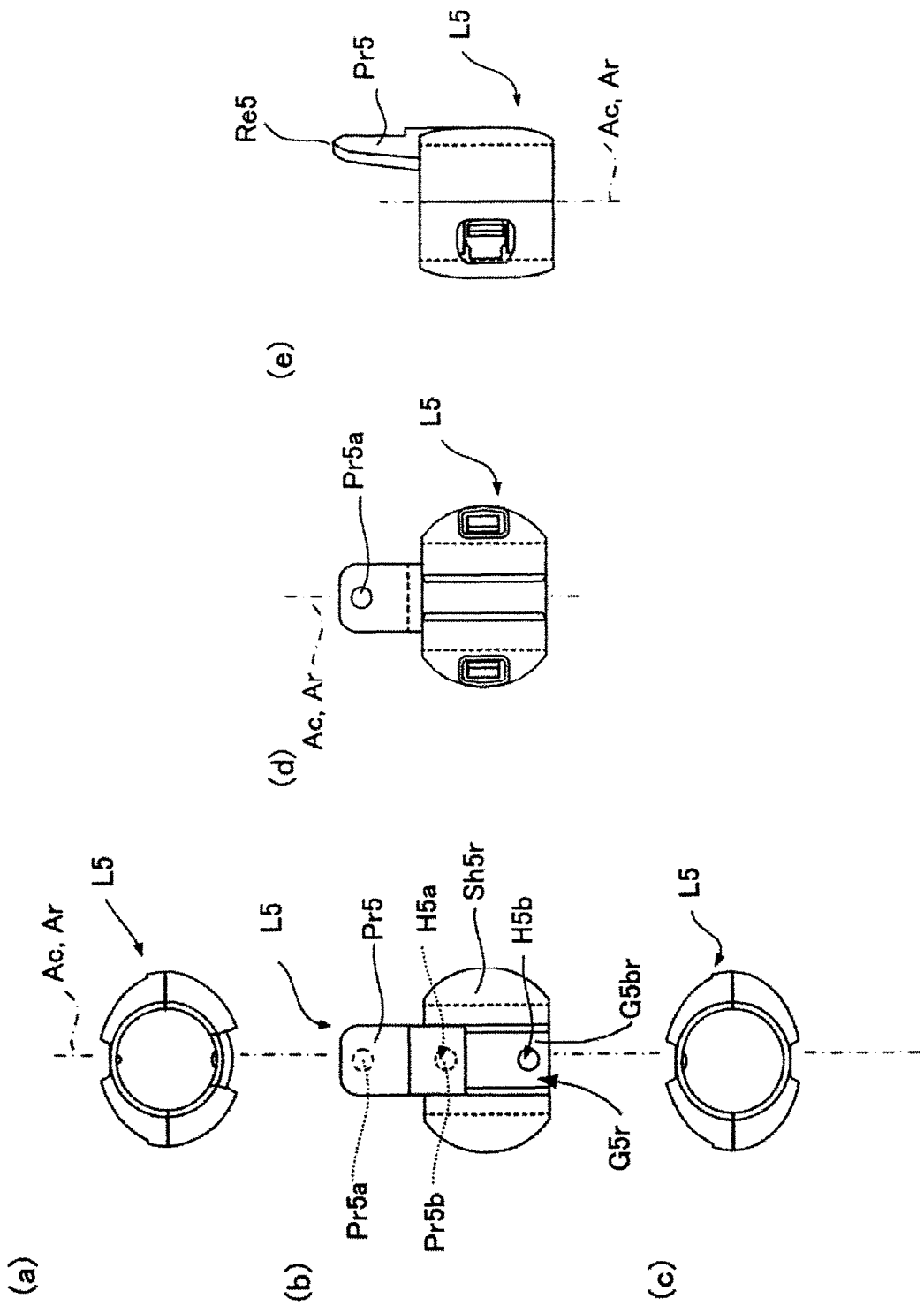
FIG. 28 is a diagram showing the lock member shown in FIG. 26 looked at various angles.
Figure 29:
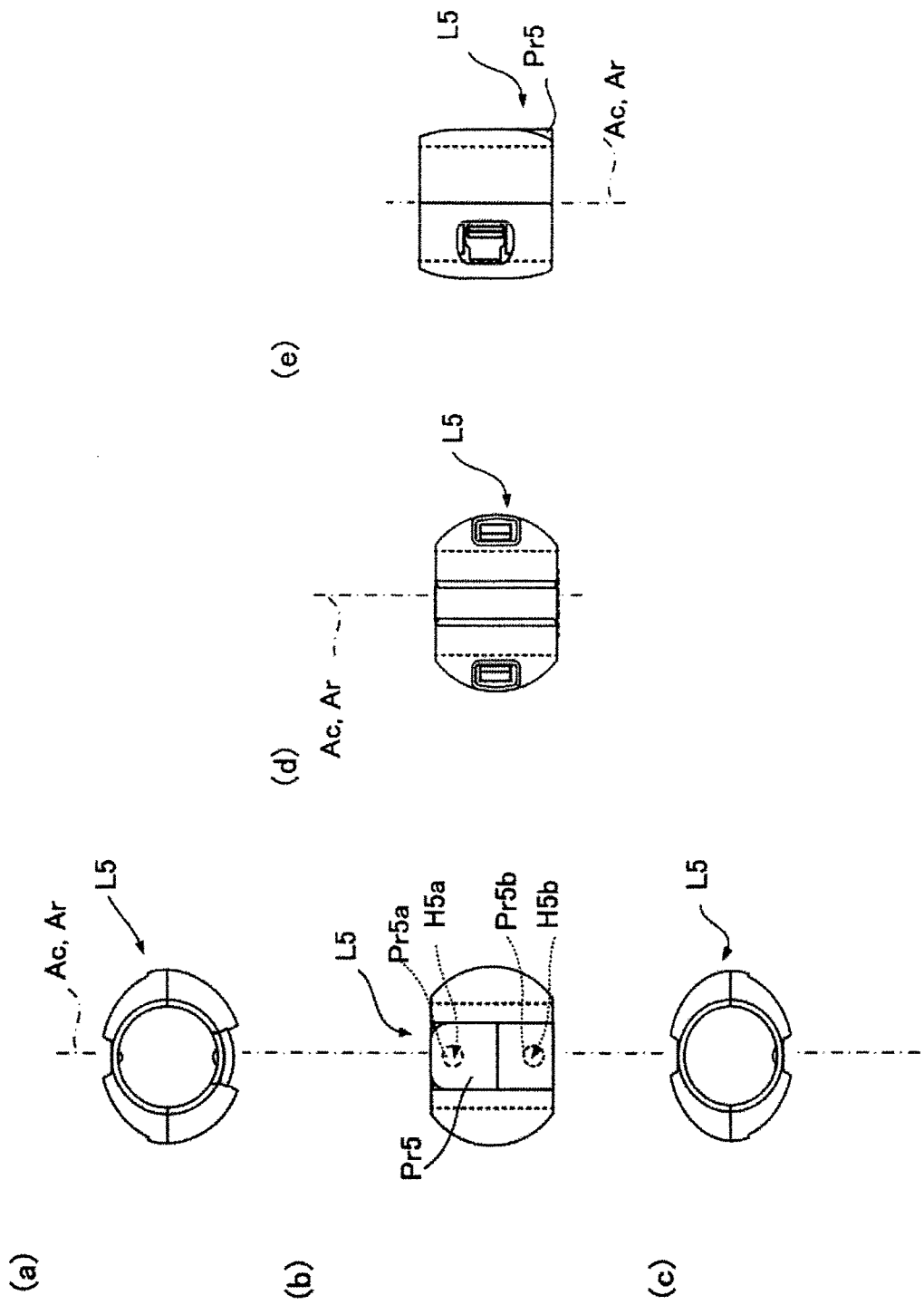
FIG. 29 is a diagram showing the lock member shown in FIG. 27 looked at various angles.

Next shown in FIG. 28 and FIG. 29 is the lock member L5 in the lock state and the unlock state, respectively. FIG. 28(a) shows the lock member L5 in the lock state looked from above; FIG. 28(b) shows the lock member L5 looked from the side of the half-shell Sh5r; FIG. 28(c) shows the lock member L5 looked from the bottom; FIG. 28(d) shows the lock member L5 looked from the side of the half-shell Sh5; and FIG. 28(e) shows the lock member L5 looked from the side.

As discernible from FIG. 28(b) and FIG. 28(d), in the inner face side of the projection Pr5, provided with projections Pr5a and Pr5b at the upper end portion and the lower end portion, respectively, with respect to the stem direction Ds. In a bottom face G5br defining the groove G5r of the half-shell Sh5r, a hole H5a and a hole H5b for fitting in the projections Pr5a and Pr5b, respectively, are formed in the upper end portion and the lower end portion with respect to the stem direction Ds. That is, when the projection Pr5b fits in either of holes H5a and H5b, the projection Pr5 is located in a position upper or lower than the cylindrical member CL5 with respect to the stem direction Ds. Note that the projections Pr5a and Pr5b can be formed in a hole-shape instead of the projection-shape, and the holes H5a and H5b can be formed in a projection-shape.

In the lock member L5 of the lock state, the projection Pr5 is located in a higher position with respect to the cylindrical member CL5 by the projection Pr5b and the hole H5a. Thus, the projection Pr5 being installed on the stem portion SL is held on the half-shell Sh5r in a position where the upper end portion protrudes from the upper end portion of the cylindrical member CL5, and the seat portion Re5 contacts with the lower end of the joint member Knb.

FIG. 29(a) shows the lock member L5 in the unlock state looked from above; FIG. 29(b) shows the lock member L5 looked from the side of the half-shell Sh5r; FIG. 29(c) shows the lock member L5 looked from the bottom; FIG. 29(d) shows the lock member L5 looked from the side of the half-shell Sh5; and FIG. 29(e) shows the lock member L5 looked from the side.

As discernible from FIG. 29(b), in the lock member L5 in the unlock state, the projection Pr5a fit in the hole H5a and the projection Pr5b fits in the hole H5b. The projection Pr5 is located in a lower position with respect to the cylindrical member CL5.

Sixth Embodiment

Figure 30:
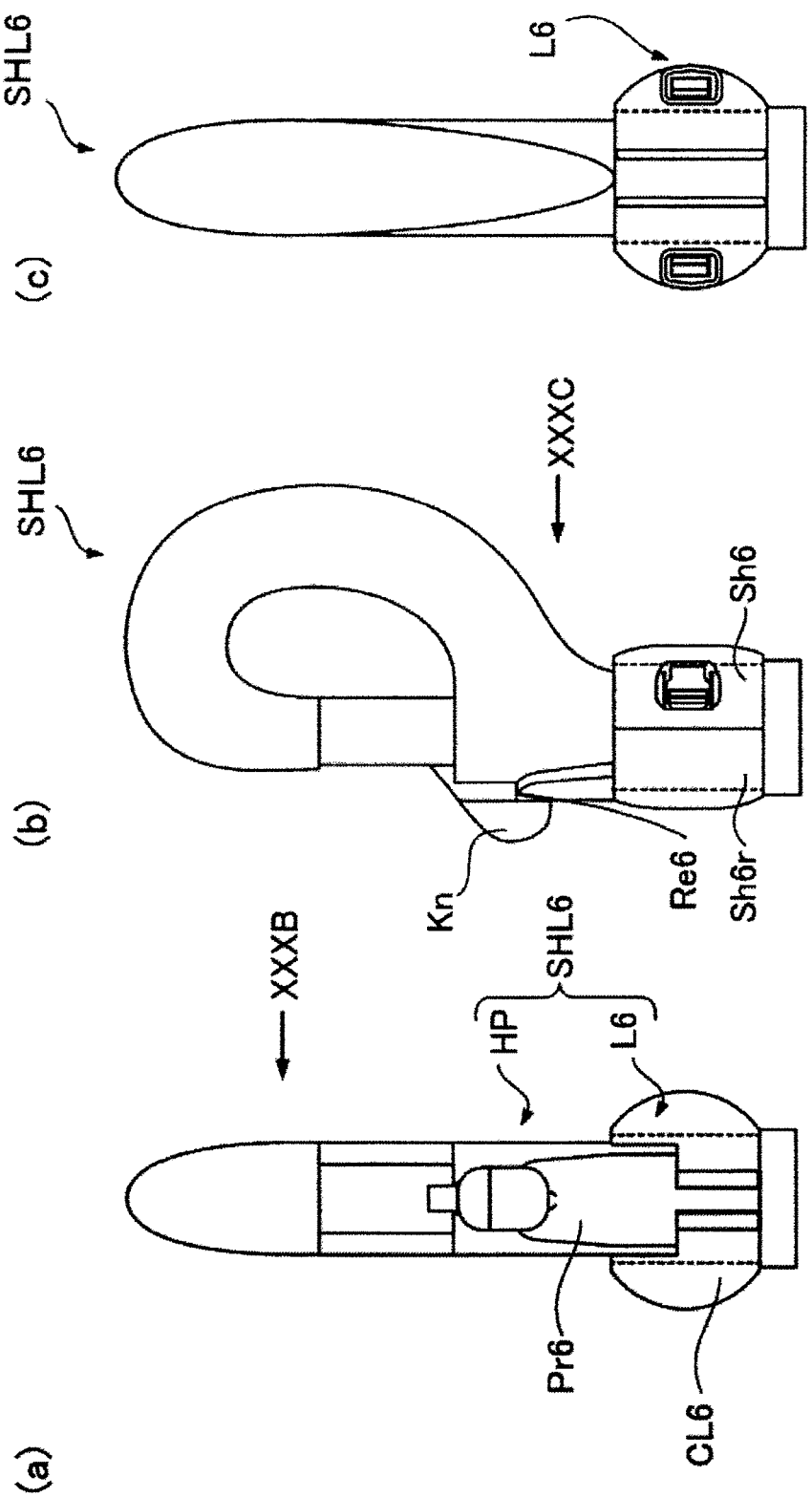
FIG. 30 is a diagram showing a connector according to a sixth embodiment of the present invention, wherein an operation member is locked, looked at various angles.
Figure 31:
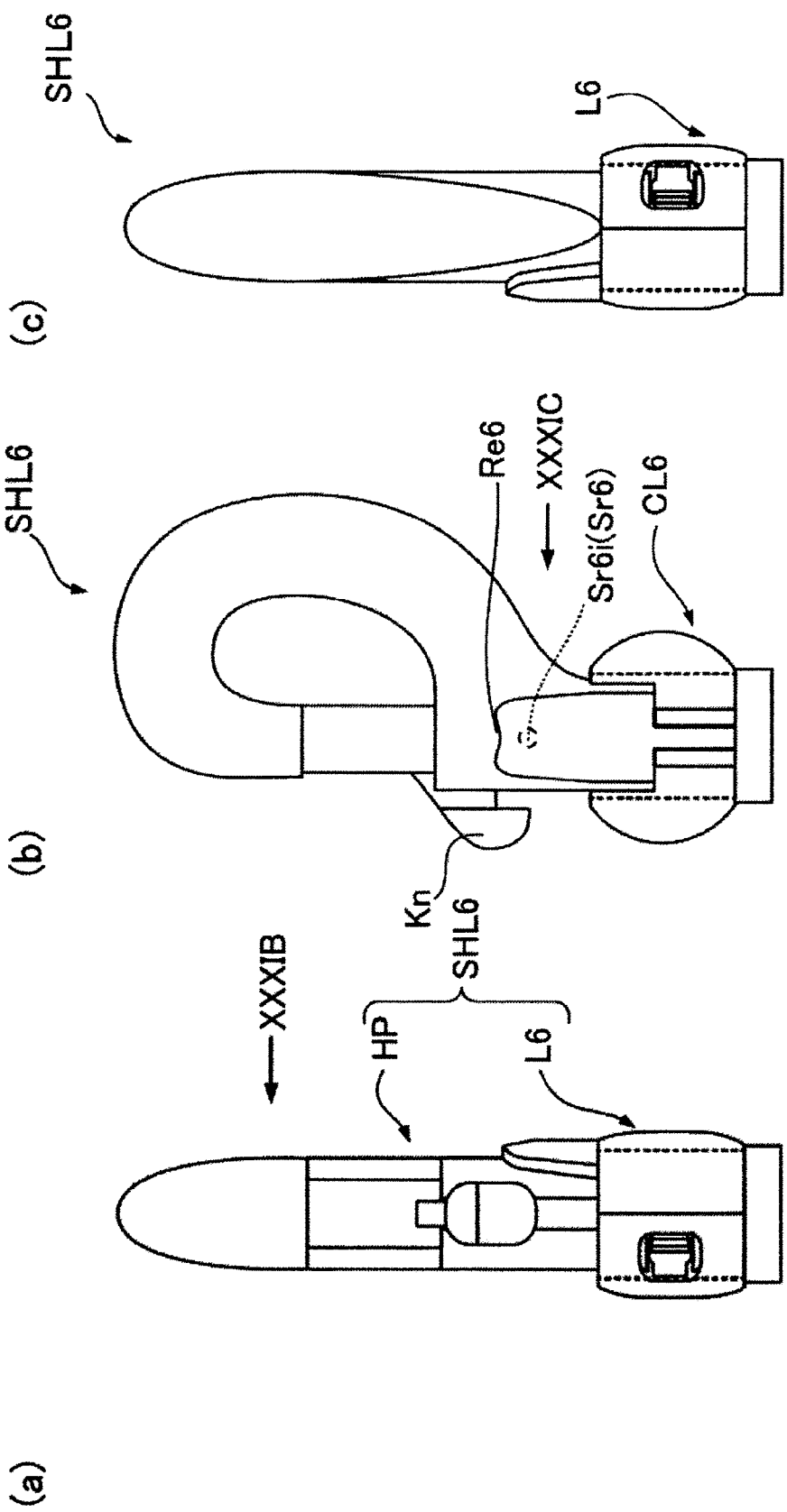
FIG. 31 is a diagram showing the connector according to the sixth embodiment of the present invention, wherein the operation member is unlocked, looked at various angles.
Figure 32:
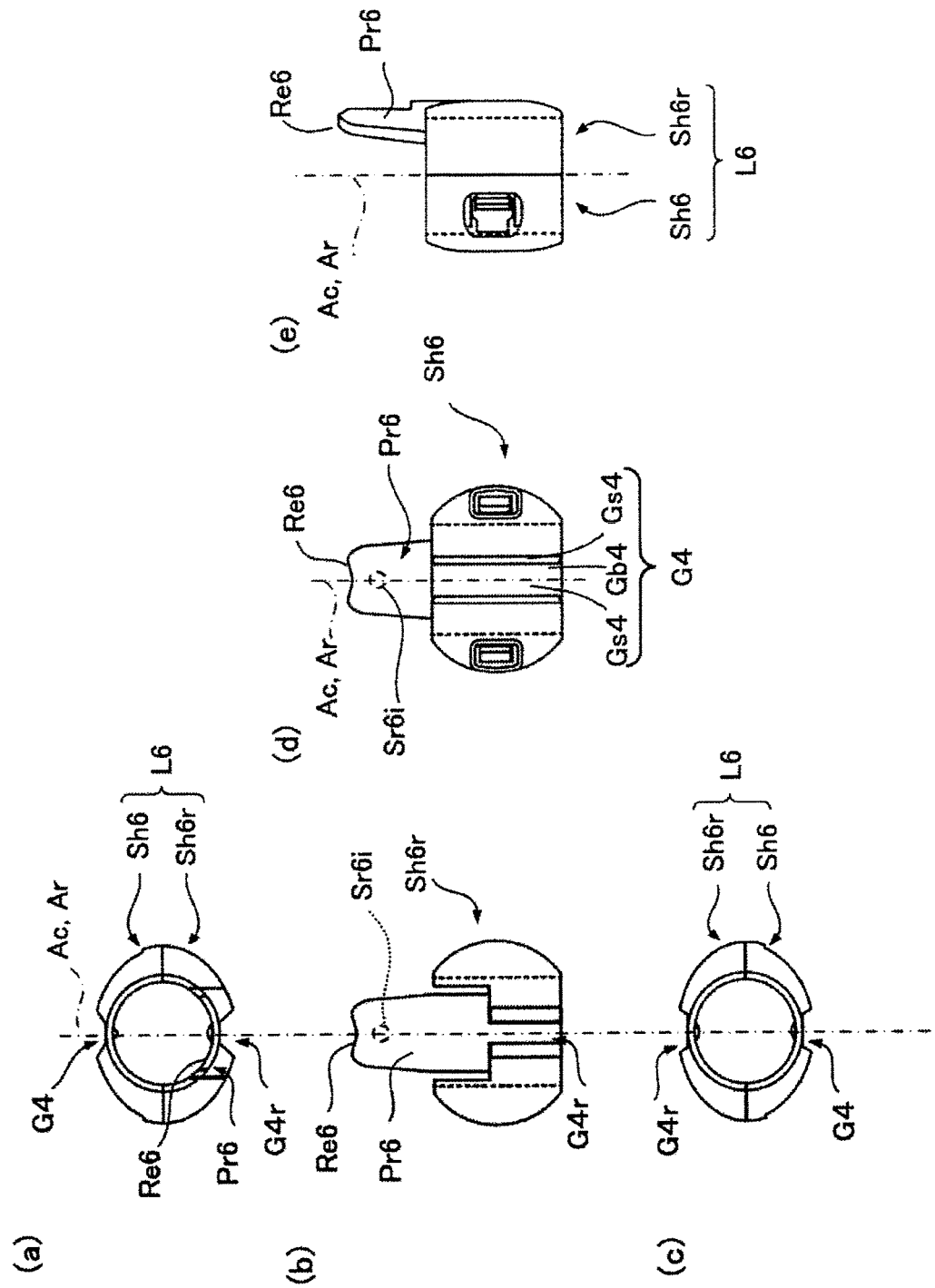
FIG. 32 is a diagram showing the lock member shown in FIG. 30, looked at various angles.

Below described with reference to FIG. 30, FIG. 31, and FIG. 32 are a connector for animal according to a sixth embodiment of the present invention. A connector SHL6 has a construction similar to that of the above described connector SHL4 (FIG. 20) except that the lock member L4 (FIG. 20) is replaced with a lock member L6. FIG. 30 shows the connector SHL6 in a state in which the operating member Kn is locked by the lock member L6 (lock state) and FIG. 31 shows the connector SHL6 in a state in which the operating member Kn is unlocked by the lock member L6 (unlock state).

The lock member L6 is constructed to put the slide bar Sb in the lock state in which the movement (backward) of slide bar Sb is inhibited or in the unlock state in which the movement is not inhibited by the rotation around the stem portion SL to a position where a portion (the projection) thereof can contact with the operating member Kn, like the lock members L1 to L4 (the first to fourth embodiments) are. The lock member L6 is constructed such that the projection Pr4 and the cylindrical member CL4 (FIG. 20) are replaced with a projection Pr6 and a cylindrical member CL6, respectively, in the above described lock member L4 (FIG. 20). Similarly, the half-shell Sh4r and the half-shell Sh4 (FIG. 20) are replaced with a half-shell Sh6r and a half-shell Sh6, respectively.

In simple, the projection Pr6 is constructed such that the seat portion Re4 is replaced with a seat portion Re6 as well as that the rotation stopper Sr4 is replaced with a rotation stopper Sr6 in the above described projection Pr4. As discernible from FIG. 31(b), the seat portion Re6 extends in a direction almost perpendicular to the stem direction Ds and has a recess formed at the center area to be concave toward the upper end portion of the cylindrical member CL6. The rotation stopper Sr6 has a bit Sr6i formed near the upper end portion (seat portion Re6) of the projection Pr6.

From FIG. 30(b), it is discernible that the projection Pr6 is located between the knob Kna and the stem portion SL so that the lower end portion of the joint member Knb of the operating member Kn contact with the upper end portion of the projection Pr6, or the seat portion Re6. As discernible from FIG. 30(a), the bit Sr6i fits in the groove GSL. Thus, the lock member L6 is located in the lock position with respect to the operating member Kn.

FIG. 32(a) shows the lock member L6 looked from above; FIG. 32(b) shows the lock member L6 looked from the side of the half-shell Sh6r; FIG. 32(c) shows the lock member L6 looked from the bottom; FIG. 32(d) shows the lock member L6 looked from the side of the half-shell Sh6; and FIG. 32(e) shows the lock member L6 looked from the side.

Seventh Embodiment

Figure 33:
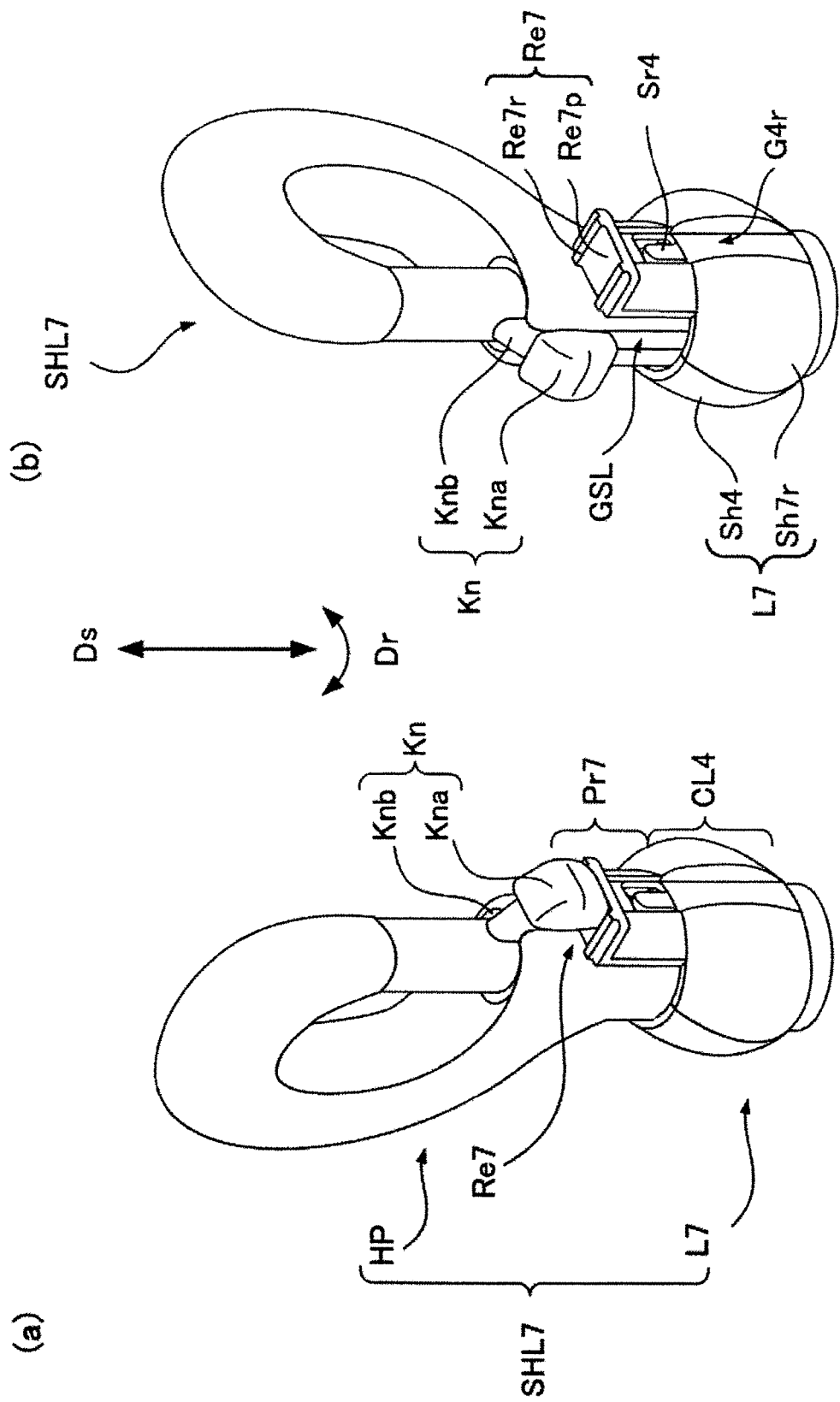
FIG. 33 is a perspective view showing a connector for animal according to a seventh embodiment of the present invention, wherein (a) shows a state in which an operation member is locked and (b) shows a state in which the operation member is unlocked.
Figure 35:
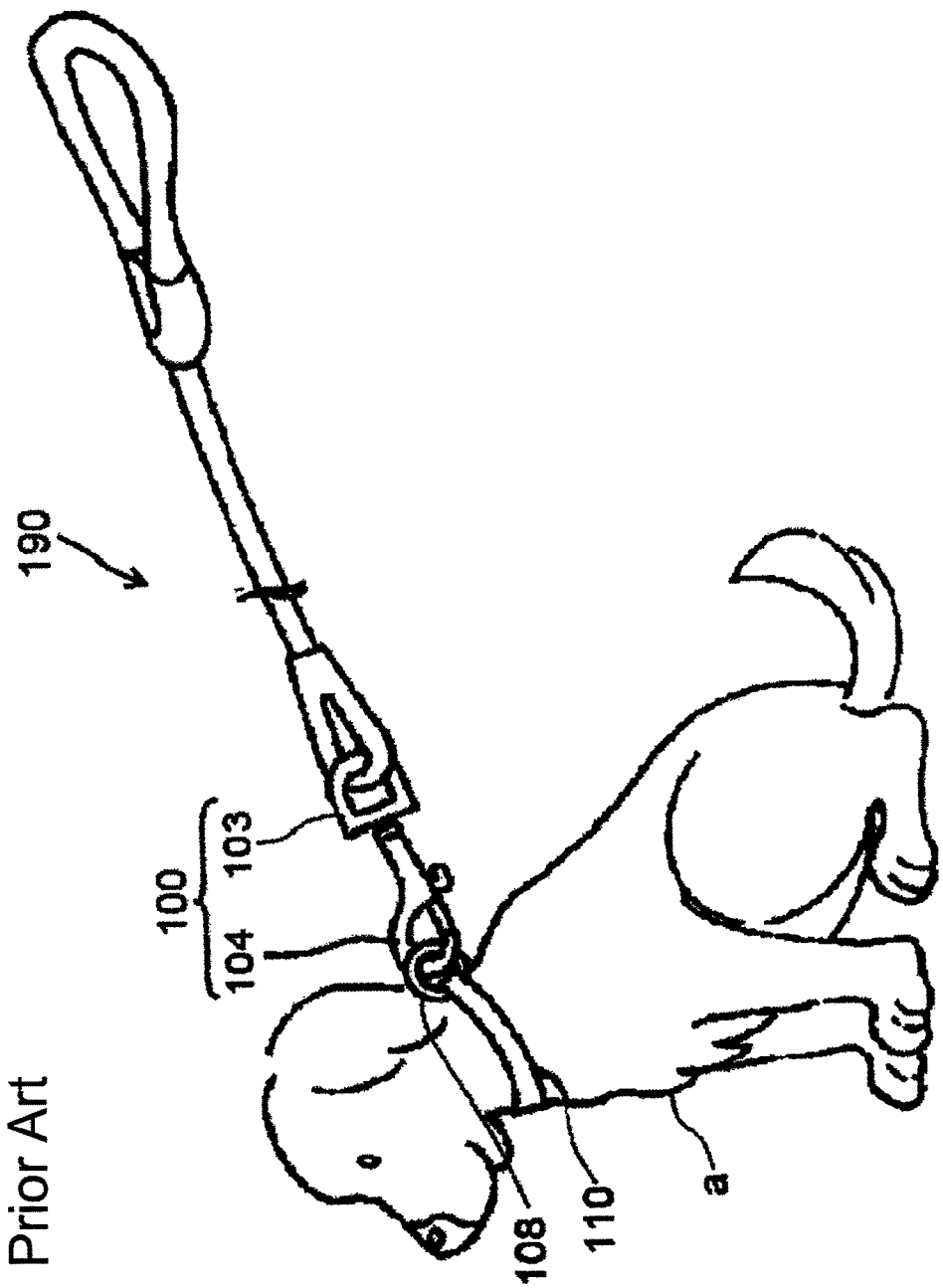
FIG. 35 is a diagram showing a state in which a leash is joined to a collar via a conventional connector for animal.

Herebelow, described with FIG. 33 and FIG. 34 is a connector for animal according to a seventh embodiment of the present invention. A connector SHL7 has a construction similar to that of the above described connector SHL4 (FIG. 20) except that the lock member L4 (FIG. 20) is replaced with a lock member L7. FIG. 33(a) shows the connector SHL7 in a state in which the operating member Kn is locked by the lock member L7 (lock state); and FIG. 33(b) shows the connector SHL7 in a state in which the operation member Kn is unlocked by the lock member L7 (unlock state).

The lock member L7 has a construction similar to that of the lock member L4 (FIG. 20) except that the projection Pr4 (FIG. 20) is replaced with a projection Pr7. Similarly, the half-shell Sh4r (FIG. 20) is replaced with a half-shell Sh7r.

In simple, the projection Pr7 is constructed such that the seat portion Re4 in the above described projection Pr4 is replaced with a seat portion Re7. The seat portion Re7 has a plate member Re7p extending in a direction almost perpendicular to the stem direction Ds and a pair of projection thread parts Re7r and Re7r provided on the plate member Re7p. The seat portion Re7 extends from the upper end portion of the projection Pr7 in a direction to separate from the outer peripheral face of the stem portion SL when installed on the stem portion SL together with the half-shell Sh4. In the shown example, provided on the upper face of the plate member Re7p is a region which is defined by the projection thread parts Re7r and Re7r therebetween and is formed in a plane-view rectangular shape.

Discernible from FIG. 33(a) is the state in which the lower end portion of knob Kna contacts with the region between the pair of projection thread parts Re7r on the plate member Re7p. Since the plate member Re7p can contact with the lower end portion of the operating member Kn with an area wider than the above described seat portion Re1 (FIG. 1), the seat portion Re4 (FIG. 20), the seat portion Re5 (FIG. 26), and the seat portion Re6 (FIG. 30), enabling to receive the lower portion of the operating member Kn more stably.

In FIG. 34, the constructions of half-shell Sh7r and half-shell Sh4 which are components of the lock member L7 are shown. Discernible is the state in which the seat portion Re7 is provided on the upper end portion of the projection Pr7.

INDUSTRIAL APPLICABILITY

The present invention is applicable to a connector for animal.

REFERENCE SIGNS LIST

Ac central axis
Ar rotation axis
Cfr claw member
CL1, CL2, CL3, CL4, CL5, CL6 cylindrical member
Cr, C cushion member
C3r, C3 cushion means
Ctr, Ct tab
Cbr, Cb cushion bit
Ds stem direction
Dr rotation direction
G, Gr, G4, G4r, G5r groove
Gb, Gbr, Gb4, Gb4r, Gb5r bottom face
Gs, Gsr, Gs4, Gs4r side face
GSL groove
H5a, H5b hole
Hi fitting hole
He opening
Ho hook member
HP snap hook member
Kn operating member
Kna Knob
Knb joint member
L1, L2, L3, L4, L5, L6, L7 lock member
Lcr, Lc projection
Pi projection
Pr1, Pr4, Pr5, Pr6, Pr7 projection
Rb rear member
Pe platy member
Re1, Re4, Re5, Re6, Re7 seat portion
Re7p plate member
Re7r projection thread part
PMD major diameter portion
Pr5a, Pr5b projection
S, S3, S3r, S4 slit
Sb slide bar
Se, Ser end face
Sgr, Sg, Sgr', Sg' region
Sh1r, Sh1, Sh2r, Sh2, Sh3r, Sh3, Sh4r, Sh4, Sh5r, Sh5, Sh6r, Sh6, Sh7r half-shell
SHL1, SHL2, SHL3, SHL4, SHL5, SHL6, SHL7 connector
SL stem portion
Sr, Sr4, Sr6 rotation stopper
Srt, Sr4t tab
Sri, Sr4i bit
MG rotation guide means

The invention claimed is:

1. A connector for animal, comprising:
a hook member connectable to an object to be connected;
a stem portion extending from an end portion of the hook member in a first direction;
a slide bar closing and opening the hook member by reciprocating in the first direction;
a lock member rotatably installed around the stem portion with respect to the first direction as a rotation axis; and
an operating member joined to the slide bar and protruding in a second direction perpendicular to the first direction, the operating member including a knob and a joint member connecting the knob to the slide bar,
the lock member including
a cylindrical member with a cylindrical shaped space formed therein for accommodating the stem portion in a rotatable manner, and
a projection extending toward the hook member by a predetermined length from a part of the end portion on a side of the hook member,
wherein the projection becomes opposite to at least a part of the operating member or not by rotating the lock member,
wherein the projection includes a seat portion opposable to the knob, and
wherein the seat portion includes a plate member extending in a direction substantially perpendicular to the first direction, and a pair of projection thread parts provided on the plate member and defining an upper face of the plate member therebetween, such that the knob can be received on the upper face between the pair of projection thread parts.

2. The connector for animal according to claim 1, the lock member comprising a rotation stopper for fixing the position in the rotation direction with respect to the stem portion.

3. The connector for animal according to claim 1, further comprising a contacting member protruding from an inner peripheral face of the cylindrical member to be contactable with the stem portion.

4. The connector for animal according to claim 3, the contacting member comprising a projection.

5. The connector for animal according to claim 3, the contacting member being formed so as to extend in a circumferential direction.

6. The connector for animal according to claim 3, wherein the contacting member elastically contacts with the stem portion.

7. The connector for animal according to claim 1, the projection being slidable in the first direction.

8. The connector for animal according to claim 1, the projection further comprising a rear member opposable to the joint member.

* * * * *